United States Patent
Dixon et al.

(10) Patent No.: US 12,416,066 B2
(45) Date of Patent: *Sep. 16, 2025

(54) PROCESS FOR LEACHING METAL SULFIDES WITH REAGENTS HAVING THIOCARBONYL FUNCTIONAL GROUPS

(71) Applicant: Jetti Resources, LLC, Boulder, CO (US)

(72) Inventors: David Dixon, Delta (CA); Edouard Asselin, Richmond (CA); Zihe Ren, Richmond (CA); Nelson Mora Huertas, Boulder, CO (US)

(73) Assignee: Jetti Resources, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,120

(22) Filed: Nov. 22, 2023

(65) Prior Publication Data
US 2024/0167121 A1    May 23, 2024

Related U.S. Application Data

(63) Continuation of application No. 16/342,934, filed as application No. PCT/CA2017/051250 on Oct. 19, 2017, now Pat. No. 11,859,263.
(Continued)

(51) Int. Cl.
*C22B 3/00*      (2006.01)
*C01G 3/00*      (2006.01)
(Continued)

(52) U.S. Cl.
CPC ............ *C22B 23/043* (2013.01); *C01G 3/003* (2013.01); *C01G 11/003* (2013.01); *C01G 53/01* (2025.01);
(Continued)

(58) Field of Classification Search
CPC ..... C22B 23/043; C22B 3/08; C22B 15/0071; C22B 17/04; C22B 3/20; C22B 3/04;
(Continued)

(56) References Cited

U.S. PATENT DOCUMENTS

| 2,716,600 A | 8/1955 | Frick et al. |
| 2,902,345 A | 9/1959 | Hyde et al. |

(Continued)

FOREIGN PATENT DOCUMENTS

| AP | 5183 | 7/2020 |
| AR | 104304 A1 | 7/2017 |

(Continued)

OTHER PUBLICATIONS

Djamal-Eddine Akretche et al. "Selective leaching of a polymetallic complex ore by sulphuric acid and thiourea mixed with sea water", Hydrometallurgy 38pg. 189-204 (Year: 1995).*
(Continued)

*Primary Examiner* — Sally A Merkling
*Assistant Examiner* — Danielle M. Carda
(74) *Attorney, Agent, or Firm* — Marco Henry Santamaria; Deborah Peacock

(57) ABSTRACT

This application pertains to methods of recovering metals from metal sulfides that involve contacting the metal sulfide with an acidic sulfate solution containing ferric sulfate and a reagent that has a thiocarbonyl functional group, wherein the concentration of reagent in the acidic sulfate solution is sufficient to increase the rate of metal extraction relative to an acidic sulfate solution that does not contain the reagent, to produce a pregnant solution containing the metal ions.

25 Claims, 26 Drawing Sheets

Related U.S. Application Data

(60) Provisional application No. 62/430,333, filed on Dec. 5, 2016, provisional application No. 62/410,348, filed on Oct. 19, 2016, provisional application No. 62/410,331, filed on Oct. 19, 2016, provisional application No. 62/410,351, filed on Oct. 19, 2016.

(51) Int. Cl.
  *C01G 11/00* (2006.01)
  *C01G 53/01* (2025.01)
  *C22B 3/08* (2006.01)
  *C22B 15/00* (2006.01)

(52) U.S. Cl.
  CPC ............ *C22B 3/08* (2013.01); *C22B 15/0071* (2013.01); *C22B 17/04* (2013.01)

(58) Field of Classification Search
  CPC .... C01G 3/003; C01G 11/003; C01G 53/003; C01G 3/10; C01G 49/14; C01G 53/01
  USPC .......................................................... 75/743
  See application file for complete search history.

(56) References Cited

U.S. PATENT DOCUMENTS

| | | |
|---|---|---|
| 3,679,397 A | 7/1972 | Oconnor et al. |
| 3,761,566 A | 9/1973 | Michal |
| 3,884,831 A | 5/1975 | Bloom |
| 4,082,833 A | 4/1978 | Wyndham et al. |
| 4,091,070 A | 5/1978 | Riggs et al. |
| 4,343,773 A | 8/1982 | Miller et al. |
| 4,556,483 A | 12/1985 | Fu et al. |
| 4,561,947 A | 12/1985 | Schulze |
| 4,571,387 A | 2/1986 | Bruynesteyn et al. |
| 4,778,519 A | 10/1988 | Pesic |
| 4,816,235 A | 3/1989 | Pesic |
| 4,913,730 A | 4/1990 | Deschenes et al. |
| 5,104,445 A | 4/1992 | Dubrovsky et al. |
| 5,207,996 A | 5/1993 | Sierakowski et al. |
| 5,260,040 A | 11/1993 | Kenna |
| 5,332,559 A | 7/1994 | Brierley et al. |
| 5,622,615 A | 4/1997 | Young et al. |
| 5,795,465 A | 8/1998 | Arbiter |
| 5,989,311 A | 11/1999 | Han et al. |
| 6,146,444 A | 11/2000 | Kohr |
| 6,569,391 B1 | 5/2003 | Arias |
| 6,746,512 B1 | 6/2004 | Shaw |
| 6,926,753 B2 | 8/2005 | Faine et al. |
| 7,722,840 B2 | 5/2010 | Hackl et al. |
| 7,862,785 B2 | 1/2011 | Seelmann-Eggebert et al. |
| 7,964,015 B2 | 6/2011 | Creasey et al. |
| 8,012,238 B2 | 9/2011 | Kohr et al. |
| 8,070,851 B2 | 12/2011 | Muller et al. |
| 8,118,907 B2 | 2/2012 | Uhrie et al. |
| 8,163,063 B2* | 4/2012 | Manabe .............. C22B 15/0071 75/743 |
| 8,257,671 B2 | 9/2012 | Kuwano et al. |
| 8,277,538 B2 | 10/2012 | Kuwazawa et al. |
| 8,287,623 B2 | 10/2012 | Manabe |
| 8,388,728 B2 | 3/2013 | Hollitt et al. |
| 8,435,793 B2 | 5/2013 | Nomura et al. |
| 8,491,701 B2 | 7/2013 | Uhrie et al. |
| 8,865,119 B2 | 10/2014 | Kuwano et al. |
| 8,911,532 B2 | 12/2014 | Manabe |
| 8,968,442 B2 | 3/2015 | Dixon et al. |
| 8,992,666 B2 | 3/2015 | Sato et al. |
| 9,068,242 B2 | 6/2015 | Ishida et al. |
| 9,290,827 B2* | 3/2016 | Hatano .................... C22B 3/06 |
| 9,624,560 B2 | 4/2017 | Gonzalez et al. |
| 9,683,277 B2 | 6/2017 | Fagerstrom et al. |
| 9,771,631 B2 | 9/2017 | Welham et al. |
| 9,816,155 B2 | 11/2017 | Patio et al. |
| 10,041,143 B2 | 8/2018 | Rautenbach |
| 10,344,353 B2 | 7/2019 | Mujicic et al. |
| 10,370,738 B2 | 8/2019 | Robertson et al. |
| 10,400,308 B2 | 9/2019 | Gutiérrez et al. |
| 10,526,685 B2 | 1/2020 | Brown et al. |
| 10,550,450 B2 | 2/2020 | Kawashiro et al. |
| 10,563,284 B2 | 2/2020 | Kittelty et al. |
| 10,563,287 B2 | 2/2020 | Hackl et al. |
| 10,731,232 B2 | 8/2020 | Sato et al. |
| 10,745,778 B2 | 8/2020 | Bender et al. |
| 10,767,242 B2 | 9/2020 | Robertson et al. |
| 10,781,502 B2 | 9/2020 | Dixon et al. |
| 10,865,460 B2 | 12/2020 | Dixon et al. |
| 10,870,903 B2 | 12/2020 | Dixon et al. |
| 10,876,186 B2 | 12/2020 | Dixon et al. |
| 10,876,187 B2 | 12/2020 | Dixon et al. |
| 10,947,606 B2 | 3/2021 | Rorke |
| 10,954,583 B2 | 3/2021 | Dixon et al. |
| 10,961,604 B2 | 3/2021 | Dixon et al. |
| 11,111,559 B2 | 9/2021 | Palmer et al. |
| 11,236,407 B1 | 2/2022 | Fennel et al. |
| 11,286,540 B2 | 3/2022 | Burley et al. |
| 11,492,681 B2 | 11/2022 | Patino Martinez |
| 11,618,934 B2 | 4/2023 | Lizama et al. |
| 11,859,263 B2* | 1/2024 | Dixon ................... C22B 23/043 |
| 12,018,349 B2 | 6/2024 | Lyons |
| 2002/0157504 A1 | 10/2002 | Beckmann |
| 2004/0091984 A1 | 5/2004 | Hunter |
| 2004/0197249 A1 | 10/2004 | Wan et al. |
| 2005/0269208 A1 | 12/2005 | Dixon et al. |
| 2006/0193762 A1* | 8/2006 | Misra .................. C22B 15/0071 423/42 |
| 2007/0272055 A1 | 11/2007 | Lavine et al. |
| 2008/0026450 A1 | 1/2008 | Ohtsuka et al. |
| 2008/0241024 A1 | 10/2008 | Riekkola-Vanhanen et al. |
| 2008/0286180 A1 | 11/2008 | Jones |
| 2010/0018349 A1 | 1/2010 | Manabe |
| 2010/0021370 A1 | 1/2010 | Nagaraj et al. |
| 2011/0290657 A1 | 12/2011 | Lapidus Lavine et al. |
| 2012/0251417 A1 | 10/2012 | Shimomura et al. |
| 2013/0140186 A1 | 6/2013 | Lapidus et al. |
| 2013/0333524 A1 | 12/2013 | Aghemio Rodriguez |
| 2014/0212346 A1 | 7/2014 | Xia |
| 2014/0335583 A1 | 11/2014 | West et al. |
| 2016/0122847 A1 | 5/2016 | Saavedra Salinas |
| 2016/0145714 A1 | 5/2016 | Liddell et al. |
| 2016/0298209 A1 | 10/2016 | Mujicic et al. |
| 2017/0159153 A1 | 6/2017 | Bender et al. |
| 2017/0335275 A1 | 11/2017 | Alvarez Rodríguez |
| 2017/0335428 A1 | 11/2017 | Gutiérrez et al. |
| 2018/0002781 A1 | 1/2018 | Kawashiro et al. |
| 2018/0135148 A1 | 5/2018 | Dixon et al. |
| 2018/0187287 A1 | 7/2018 | Sato et al. |
| 2018/0223392 A1 | 8/2018 | Wyrsta |
| 2019/0055624 A1 | 2/2019 | Brown et al. |
| 2019/0127822 A1 | 5/2019 | Hackl et al. |
| 2019/0284657 A1 | 9/2019 | Robertson et al. |
| 2019/0345581 A1 | 11/2019 | Kittelty et al. |
| 2020/0048736 A1 | 2/2020 | Dixon et al. |
| 2020/0149131 A1 | 5/2020 | Dixon et al. |
| 2020/0181732 A1 | 6/2020 | Dixon et al. |
| 2020/0181733 A1 | 6/2020 | Dixon et al. |
| 2020/0181734 A1 | 6/2020 | Dixon et al. |
| 2020/0181735 A1 | 6/2020 | Dixon et al. |
| 2020/0181736 A1 | 6/2020 | Dixon et al. |
| 2020/0181737 A1 | 6/2020 | Dixon et al. |
| 2020/0224291 A1 | 7/2020 | Patino Martinez |
| 2020/0407821 A1 | 12/2020 | Lee et al. |
| 2021/0198767 A1 | 7/2021 | Dixon et al. |
| 2021/0376400 A1 | 12/2021 | Bhave et al. |
| 2022/0002838 A1 | 1/2022 | Cortés Cortés |
| 2022/0033932 A1 | 2/2022 | Burley et al. |
| 2022/0033933 A1 | 2/2022 | Fennel et al. |
| 2023/0086259 A1 | 3/2023 | Lyons |
| 2023/0090475 A1 | 3/2023 | Lyons |
| 2023/0203618 A1 | 6/2023 | Chibwana et al. |
| 2023/0227936 A1 | 7/2023 | Ren et al. |
| 2023/0257852 A1 | 8/2023 | Ren et al. |
| 2023/0302462 A1 | 9/2023 | Lizama Moreno et al. |
| 2024/0026493 A1 | 1/2024 | Lyons et al. |
| 2024/0035113 A1 | 2/2024 | Kittelty et al. |

(56) References Cited

U.S. PATENT DOCUMENTS

| | | | |
|---|---|---|---|
| 2024/0141456 A1 | 5/2024 | Dixon et al. |
| 2024/0167121 A1 | 5/2024 | Dixon et al. |
| 2024/0254590 A1 | 8/2024 | Ren et al. |
| 2024/0271249 A1 | 8/2024 | Sorensen et al. |
| 2024/0279770 A1 | 8/2024 | Lagno Sánchez et al. |
| 2024/0295006 A1 | 9/2024 | Ren et al. |
| 2024/0336990 A1 | 10/2024 | Dixon et al. |
| 2024/0336991 A1 | 10/2024 | Dixon et al. |
| 2025/0092487 A1 | 3/2025 | Ren et al. |
| 2025/0179607 A1 | 6/2025 | Ren et al. |
| 2025/0179610 A1 | 6/2025 | Ren et al. |

FOREIGN PATENT DOCUMENTS

| | | |
|---|---|---|
| AR | 109843 A1 | 1/2019 |
| AR | 123458 A2 | 12/2022 |
| AR | 123459 A2 | 12/2022 |
| AR | 123460 A2 | 12/2022 |
| AR | 123462 A2 | 12/2022 |
| AR | 123547 A1 | 12/2022 |
| AR | 125904 A1 | 8/2023 |
| AT | 230037 B | 11/1963 |
| AU | 6304286 A | 3/1987 |
| AU | 588372 B2 | 9/1989 |
| AU | 4184297 A | 3/1998 |
| AU | 2004274823 A1 | 3/2005 |
| AU | 2016347691 A1 | 5/2018 |
| AU | 2016250309 B2 | 2/2019 |
| AU | 2018247307 C1 | 5/2020 |
| AU | 2020200918 B2 | 12/2021 |
| AU | 2022218559 A1 | 9/2022 |
| AU | 2022218577 A1 | 9/2022 |
| AU | 2021204246 B2 | 10/2022 |
| AU | 2017346972 B2 | 1/2023 |
| AU | 2022218579 B2 | 4/2023 |
| AU | 2021343571 A1 | 5/2023 |
| AU | 2021345381 A1 | 5/2023 |
| AU | 2022345087 A1 | 4/2024 |
| AU | 2023200579 A1 | 8/2024 |
| BR | PI0412962 A | 9/2006 |
| BR | 112017020592 A2 | 7/2018 |
| BR | 112019008080 A2 | 7/2019 |
| BR | 112017022091 B1 | 8/2021 |
| CA | 2023119 | 2/1991 |
| CA | 2534737 A1 | 3/2005 |
| CA | 2597937 C | 4/2013 |
| CA | 2924761 A1 | 4/2015 |
| CA | 2976958 | 9/2016 |
| CA | 2973612 A1 | 10/2016 |
| CA | 3032992 A1 | 4/2018 |
| CA | 3052576 A1 | 4/2018 |
| CA | 3052572 C | 8/2020 |
| CA | 3127820 C | 3/2022 |
| CA | 3130427 A1 | 3/2022 |
| CA | 3130430 A1 | 3/2022 |
| CL | 2004000703 A1 | 3/2005 |
| CL | 2007002165 A1 | 2/2008 |
| CL | 2008001423 A1 | 8/2008 |
| CL | 2009000554 A1 | 7/2009 |
| CL | 2010001053 A1 | 12/2010 |
| CL | 2016001188 A1 | 2/2017 |
| CL | 2017002632 A1 | 3/2018 |
| CL | 2019001074 A1 | 10/2019 |
| CL | 2019002080 A1 | 10/2019 |
| CL | 2020000013 A1 | 6/2020 |
| CL | 2021002245 A1 | 3/2022 |
| CL | 2021002246 A1 | 3/2022 |
| CL | 2021002247 A1 | 3/2022 |
| CL | 202300769 | 9/2023 |
| CL | 202300770 | 9/2023 |
| CL | 2023003413 A1 | 6/2024 |
| CN | 1081471 | 2/1994 |
| CN | 1360066 A | 7/2002 |
| CN | 101033508 A | 9/2007 |
| CN | 101818258 A | 9/2010 |
| CN | 103789546 A | 5/2014 |
| CN | 103993171 A | 8/2014 |
| CN | 107532228 A | 1/2018 |
| CN | 107532229 A | 1/2018 |
| CN | 110860277 A | 3/2020 |
| CN | 111850294 A | 10/2020 |
| CN | 110352256 B | 1/2023 |
| CN | 117467852 A | 1/2024 |
| DE | 3407049 A1 | 9/1985 |
| DE | 60001070 | 1/2003 |
| EA | 200800687 A1 | 10/2008 |
| EA | 013700 B1 | 6/2010 |
| EA | 201792285 A1 | 2/2018 |
| EC | 1768938 | 4/2018 |
| EP | 0522978 A1 | 1/1993 |
| EP | 0536914 A1 | 4/1993 |
| EP | 1190105 A1 | 3/2002 |
| EP | 1666613 A1 | 6/2006 |
| EP | 3283661 A1 | 2/2018 |
| EP | 3529387 A1 | 8/2019 |
| EP | 4045693 A2 | 8/2022 |
| EP | 4214343 A1 | 7/2023 |
| FI | 117941 B | 4/2007 |
| FR | 2612200 A1 | 9/1988 |
| GB | 1528061 A | 10/1978 |
| GB | 8622561 | 10/1986 |
| GB | 2180829 | 4/1987 |
| GB | 9910548 | 7/1999 |
| GB | 2349876 | 11/2000 |
| JP | S5135616 A | 3/1976 |
| JP | 9-13127 | 1/1997 |
| JP | 11-506808 | 6/1999 |
| JP | 2010180450 A | 8/2010 |
| JP | 2011161386 A | 8/2011 |
| JP | 2017014555 A | 1/2017 |
| JP | 2018513279 A | 5/2018 |
| JP | 2019039076 A | 3/2019 |
| JP | 2020522606 A | 7/2020 |
| JP | 2020153018 A | 9/2020 |
| JP | 2022001668 A | 1/2022 |
| JP | 2023098950 A | 7/2023 |
| KE | AP/P/2017/010264 | 7/2020 |
| MN | 100004745 | 7/2019 |
| MN | 10-0005216 | 2/2022 |
| MX | 01011646 A | 11/2002 |
| MX | 03006955 A | 2/2005 |
| MX | 2008003249 | 9/2009 |
| MX | 2015002140 A | 10/2015 |
| MX | 2014016019 A | 6/2016 |
| MX | 2017013312 A | 9/2018 |
| MX | 2019004592 A | 10/2019 |
| MX | 2020006857 A | 8/2020 |
| MX | 2023003207 A | 4/2023 |
| PE | 20191271 A1 | 9/2019 |
| PE | 2020-0914 | 9/2020 |
| PE | 10509 | 2/2021 |
| PE | 20230857 A1 | 5/2023 |
| PE | 2024-0715 | 4/2024 |
| PE | 20240830 | 4/2024 |
| PE | 20240831 | 4/2024 |
| PE | 20240832 | 4/2024 |
| PE | 2025-1305 | 5/2025 |
| PH | 12017501886 A1 | 3/2018 |
| RU | 2342446 C2 | 12/2008 |
| SU | 1636463 | 3/1991 |
| VN | 1201704560 | 3/2018 |
| WO | 9808585 | 3/1998 |
| WO | 9814623 A1 | 4/1998 |
| WO | 0036168 A1 | 6/2000 |
| WO | 2000068446 | 11/2000 |
| WO | 03080879 A1 | 10/2003 |
| WO | 2004029306 | 4/2004 |
| WO | 2005028676 A2 | 3/2005 |
| WO | 2006070052 A1 | 7/2006 |
| WO | 2007042604 | 4/2007 |
| WO | 2010037169 A1 | 4/2010 |
| WO | 2012081953 A1 | 6/2012 |
| WO | 2014150710 A1 | 9/2014 |
| WO | 201505955 | 4/2015 |

(56) References Cited

FOREIGN PATENT DOCUMENTS

| | | | |
|---|---|---|---|
| WO | 2015059551 | | 4/2015 |
| WO | 2016026062 A1 | | 2/2016 |
| WO | 2016094956 A1 | | 6/2016 |
| WO | 2016141438 | | 9/2016 |
| WO | WO-2016141438 A1 * | 9/2016 | ............ C22B 3/12 |
| WO | 2016165027 | | 10/2016 |
| WO | 2018072029 A1 | | 4/2018 |
| WO | 2020071763 A1 | | 4/2020 |
| WO | 2021119862 A1 | | 6/2021 |
| WO | 2022056621 A1 | | 3/2022 |
| WO | 2022056622 A1 | | 3/2022 |
| WO | 2022236437 A1 | | 11/2022 |
| WO | 2022245731 A1 | | 11/2022 |
| WO | 2023073568 A1 | | 5/2023 |
| WO | 2024057216 A1 | | 3/2024 |
| WO | 2024081705 A1 | | 4/2024 |
| WO | 2024137042 A1 | | 6/2024 |
| WO | 2024163830 A1 | | 8/2024 |
| ZA | 867144 B | | 4/1988 |
| ZA | 200601834 B | | 9/2007 |

OTHER PUBLICATIONS

Yang, et al., "A Copper and Iron K-edige XANES Study on Chalcopyrite Leached by Mesophiles and Moderate Thermophiles", Minerals Engineering, vol. 48, 2013, 31-35.

Yang, Xiyun, et al., "The interaction of thiourea and formamidine disulfide in the dissoluation of gold in sulfuric acid solutsion", Minerals Engineering, vol. 23, 2010, 698-704.

Zhang, et al., "Catalytic Effect of Polyethylene Glycol on Sulfur Oxidation in Chalcopyrite Bioleaching by Acidithiobacillus Ferrooxidans", Minerals Engineering, vol. 95, 2016, 74-76.

Zhang, et al., "Effects of Triton X-100 on Oxidative Activity of Acidthiobacillus Ferrooxidans and on Chalcopyrite Bioleaching", Journal of Northeaster University (Natural Science), vol. 37, No. 6, 2016, 861-864.

Zhu, Tun, "The redox reaction between thiourea and ferric iron and catalysis of sulphide ores", Hydrometallurgy, vol. 28, No. 3, Apr. 1992, 381-397.

Li, Xiaohua, et al., "Solvometallurgical process for extraction of copper from chalcopyrite and other sulfidic ore minerals", Green Chemistry, vol. 22, issue 2, 10.1039/C9GC02983D., 2020, 417-426.

Solis-Marcial, O.J., et al., "Chalcopyrite leaching in alcoholic acid media", vols. 147-148, DOI: 10.1016/j.hydromet., Apr. 11, 2014.

Tehrani, Mohammad Ebrahim Haji Naghi, et al., "Electrochemical Study and XPS Analysis of Chalcopyrite Dissolution in Sulfuric Acid in the Presence of Ethylene Glycol", Electrochimica Acta, 2021, vol. 369, article No. 137663, 10 pp: DOI:10.1016/j.electacta.2020.137663, 2021, 1-10.

"Castromil Portugal", www.medgoldresources.com (projects.gtk.fi/export/sites/projects/susmin/about/Castromil_cas_study.pdf), Jan. 13, 2015.

"Thioaldehydes", Wikipedia, accessed online Oct. 16, 2020, https://ru/wikipedia.org/wili/thioaldehydes.

"Thioketones", Wikipedia, accessed online Oct. 16, 2020, https://ru/wikipedia.org/wiki/thioketones.

Akretche, Djamal-Eddine, et al., "Selective leaching of a polymetalic complex ore by sulphuric acid and thiourea mixed with sea water", Hydrometallurgy vol. 38, 1995, 189-204.

Ando, et al., "The First Stable Enethiolizable Thioaldehyde via a Zirconocene q2-Thioacyl Complex", J. Am. Chem. Soc, vol. 113, 1991, 7782-7784.

Armstrong, S. K., et al., "Cross-referenced combinatorial libraries for the discovery of metal-complexing ligans: library deconvolution by LC-MS", Analyst, vol. 125, No. 12, 2000, 2206-2215.

Bombicz, et al., "Synthesis, Vibrational Spectra and X-Ray Structures of Copper(I) Thiourea Complexes", Inorganica Chimica Acta, vol. 357, 2004, 513-525.

Bouffard, et al., "Use of Lignosulfonate for Elemental Sulfur Biooxidation and Copper Leaching", Minerals Engineering, vol. 22, 2009, 100-103.

Bowmaker, Graham A., "Crystal Structures and Vibrational Spectroscopy of Copper(I) Thiourea Complexes", Inorganic Chemistry, vol. 48, No. 1, Jan. 5, 2009, 350-368.

Castineiras, et al., "Thione Complexes of Group IIB Dihalides, X-Ray Crystal Structure of Cd(ETTC)212", Polyhedron, vol. 7, No. 24, 1988, 2503-2508.

Chen, et al., "A Study of the Leaching of Gold and Silver by Acidothioureation", Hydrometallurgy, vol. 5, 1980, 207-212.

Deschenes, G., et al., "Leaching of gold from a chalcopyrite concentrate by thiourea", Hydrometallurgy, vol. 20, No. 2, Jan. 1, 1988, 179-202.

Dixon, et al., "Mathematical Modeling of Heap Leaching Under Drip Irrigation", The Southern Institute of Mining and Metallurgy Percolation Leaching: The Status globally and in southern Africa, 2011, 1-29.

Doona, Christopher J., et al., "Equilibrium and redox kinetics of copper(II)-thiourea complexes", Inorganic Chemistry, vol. 35, No. 11, May 22, 1996, 3210-3216.

Duncan, et al., "Leaching of Chalcopyrite with Thiobacillus Ferroxidans: Effect of Surfactants and Shaking", applied Microbiology, vol. 12, No. 2, 1964, 122-126.

Garcia, et al., "Elemtal Sulfur Coarsening Kinetics", Geochemical Transactions, vol. 15, No. 11, 2014.

Garcia, et al., "Growth of Thiobacillus Ferrooxidens on Solid Medium: Effects of Some Surface Active Agents on Colony Formation", J. Gen. Appl. Microbiol., vol. 38, 1992, 279-282.

Ghahremaninezhad, et al., "Electrochemical Evaluation of the Surface of Chalcopyrite during Dissolution in Sulfuric Acid Solution", Electrochimica Acta, vol. 55, 2010, 5041-5056.

Grgorova, B., et al., "Simultaneous determination of thioreau and formamidine disulphide, using reversed-phase high-performance liquid chromatography and a UV detector", Journal of Chromatography A., vol. 368, 1986, 444-449.

Groenewald, et al., "The Dissolution of Gold in Acidic Solutions of Thiourea", Hydrometallurgy, vol. 1, 1976, 277-290.

Hackl, et al., "Passivation of Chalcopyrite During Oxidative Leaching in Sulfate Media", Hydrometallurgy, vol. 39, 1995, 25-48.

Hiroyoshi, et al., "Effects of Several Inhibitors to Thiobacillus Ferroxidans on Ferrous Promoted Chalcopyrite Leaching", Shigento-Sozal, vol. 115, 1999, 172-176.

Hiroyoshi, et al., "Enhancement in Bacterial Leaching of Chalcopyrite by Polyoxyethylene Sorbitan Monolaurate Addition", Shigento-Sozi, vol. 111, 1995.

Itakura, et al., "Branching Mechanism of Intergranular Crack Propagation in Three Dimensions", Physical Review E, vol. 71, 2005, 055102-1-4.

Jansons, "Dithiocarboxylic Acids, Their Esters, and Metal Dithiocarboxylates", Russian Chemical Reviews, vol. 45, No. 11, 1976, 1035-1051.

Kingma, et al., "Autotrophic Growth of Thiobacillus acidophilus in the Presence of a Furace-Active Agent, Tween 80", Applied and Environmental Microbiology, vol. 38, No. 5, 1979, 795-799.

Li, J., et al., "Reaction kinetics for gold dissolution in acid thiourea solution using formamidine disulfide as oxidant", Hydrometallurgy, vol. 63, Elsevier Science B.V., 2002, 215-223.

Lu, Z. Y., et al., "The effect of chloride ions on the dissolution of chalcopyrite in acidic solutions", Hydrometallurgy, vol. 56, No. 2, 2000, 189-202.

Mironov, I V, et al., "Complexation of copper(I) by thiourea in acidic aqueous solution", J Solution Chem, vol. 25, No. 3, Mar. 1996, 315-325.

Montero, et al., "A Solute Transport Model for the Acid Leaching of Copper in Soil Columns", Soil Sci. Soc. Am. J., vol. 58, 1994, 678-686.

Okazaki, et al., "First Isolation of a Stable Aliphatic Thioaldehyde, Tris(trimethlsilyl)ethanethial", J. Am. Chem. Soc., vol. 109, 1987, 279-280.

Okazaki, et al., "Synthesis of 2,4,6-Tri-t-Butylthiobenzaldehyde, the First Stable Thiobenzaldehyde", J. Chem. Soc., Chem Commun., vol. 105, 1982, 1187-1188.

(56) References Cited

OTHER PUBLICATIONS

Oraby, Elsayed A., "Gold Leaching in Thiosulfate Solutions and Its Environmental Effects Compared with Cyanide", Thesis from Curtin University of Technology, 2009.

Orgul, S, et al., "Gold Extraction from Kaymaz Gold Ore by Thiourea Leaching", Proceedings of the XXI International Mineral Processing Congress, Hydro and Biohydrometallurgy, vol. 13, 2000, C6-22-C6-28.

Peng, et al., "Effect of Furfactant Tween-80 on Sulfur Oxidation and Expressions of Sulfur Metabolism Relevant Genes of Acidithiobacillus Ferroxidans", Transactions of Nonferrous Metals Society of China, vol. 22, 2012, 3147-3155.

Piro, et al., "Two Thiourea-Containing Gold(I) Complexes", Acta Cryst., C58, 2002, m252-m255.

Sand, "The Influence of Four Detergents on the Substrate Oxidation by Thiobacillus Ferrooxidans", Environmental Technolog Letters, vol. 6, 1985, 439-444.

Sandoval, et al., "Effect of Nonionic Surfactants on Chalcopyrite Leaching Under Dump Chemical Conditions", Report of Investigations, Bureau of Mines, 1990.

Selim, et al., "Modeling Nonlinear Kinetic Behavior of Copper Adsorption-Desorption in Soil in Physical and Chemical Processes of Water and Solute Transport/Retention in Soil", SSA Special Publication No. 56, 555A, Madison, WI, 2001, 189-212.

Sequeira, C. A.C., et al., "Chemical metathesis of chalcopyrite in acidic solutions", Hydrometallurgy, vol. 92, No. 3, 2008, 135-140.

Torma, et al., "Effects of Surface Active Agents on the Oxidation of Chalcopyrite by Thiobacillus Ferrooxidans", Hydrometallurgy, vol. 1, 1976, 301-309.

Ubaldini, et al., "An innovative thiourea gold leaching process", Hydrometallurgy, vol. 48, 1998, 113-124.

Umland, et al., "Complex Compounds in Analytical Chemistry", Moscow, 1975, 69-72.

Umland, et al., "Coordination compounds in analytical chemistry. Theory and practice", Mir, Moscow, 1975, 127-128.

Vedejx, et al., "2,2-Dimethlypropanethial: A Long-Lived Aliphatic Thioaldehyde", J. Am. Chem. Soc., 1983, 1683-1684.

Velasquez-Yevenes, L., et al., "The dissolution of chalcopyrite in chloride solutions: Part 1. The effect of solution potential", Hydrometallurgy, vol. 103, No. 1, 2010, 108-113.

Watling, H. R., "Chalcopyrite hydrometallurgy at atmospheric pressure: 2. Review of acidic chloride process options", Hydrometallurgy, vol. 146, 2014, 96-110.

Whitehead, J. A., et al., "Application of 1-alkul-3-methylimidazolium ionic liquids in the oxidative leaching of suphidic copper, gold and silver ores", Hydrometallurgy, vol. 88, Elsevier B.V., 2007, 109-120.

Wilson, J. P., et al., "Cuprice Chloride Leaching of Chalcopyrite", JOM, vol. 33, No. 2, 1981, 52-57.

Winand, Rene, "Chloride Hydrometallurgy", Hydrometallurgy, vol. 26, No. 2, 12/1001, 285-316.

Ren, Zihe, et al., "New perspective on the depassivation mechanism of chalcopyrite by ethylene thiourea", Minerals Engineering, vol. 204, 08358, ISSN 0892-6875, https://doi.org/10.1016/j.mineng.2023.108358. (https://www.sciencedirect.com/science/article/pii/S0892687523003722), May 17, 2023, 8 pages.

Zhang, et al., "Enhancing the Leaching of cChalcopyrite Using Acidithiobacillus ferrooxidans under the Induction of Surfactant Triton X-100", Minerals, vol. 1, No. 11, 2019, 1-15.

"Noble Metals", www.britannica.com/science/noble-metal, May 6, 2021, 1 page.

"Tween 20", accessed online at https://pubchem.ncbi.nlm.nih.gov/compound/443314 on Jul. 26, 2024., 2024.

"What is Polysorbate 40?", accessed online at https://www.huanachemical.com/what-is-polysorbitol-40.html on Jul. 26, 2024, 2024.

Benzaazoua, M., et al., "Gold-bearing arsenopyrite and pyrite in refractory ores: analytical refinements and new understanding of gold mineralogy", Mineralogical Magazine, 71(2), oi:10.1180/minmag.2007.071.2.123, 2007, 123-142.

Cerda, C. P., et al., "Effect of Pretreatment on Leaching Primary Copper Sulfide in Acid-Chloride Media", Minerals, vol. 8, No. 1, 2018, 1.

Dabrowski, "The influence of pyrite pre-oxidation on gold recovery by cyanidation", Minerals Engineering, vol. 19, Issue 9, ISSN 0892-6875, https://doi.org/10.1016/j.mineng.2005.09.052., 2006, 883-895.

Deditius, Artur P., et al., "A proposed new type of arsenian pyrite: Composition, nanostructure and geological significance", Geochimica et Cosmochimica Acta, vol. 72, Issue 12, ISSN 0016-7037, https://doi.org/10.1016/j.gca.2008.03.014., 2008, 2919-2933.

Fiscor, "Pinto Valley's Optimization Program Pays Big Dividends", Arizona Mining, 2021, AZ4-AZ8.

Fleet, Michael E., et al., "Gold-bearing arsenian pyrite and marcasite and arsenopyrite from Carlin Trend gold deposits and laboratory synthesis", American Mineralogist 82., 1997, 182-193.

Ghadiri, et al., "Effect of Surfactant on the Growth and Activity of Microorganisms in a Heap Bioleaching System", Minerals Engineering, vol. 139, 2019, 43-51.

Hughes, F A, et al., "Physical and functional properties of some higher alkyl polyglucosides", Journal of the American Oil Chemists' Society, 47(5):162-7. doi: 10.1007/BF02638743. PMID: 5442576., May 1970, 162-167.

Khayati, Gholam, et al., "Extraction of Cu(II) ions from aqueous media using PEG/Sulphate salt aqueous two-phase system", Separation Science and Technology, 51, 10.1080/01496395.2015.1119853., 2016, 601-608.

Krishnamoorthy, et al., "Adsorption Modeling of Catalyzed Heap Leaching", Second Canada-China Nonferrous Metallurgy Forum, Poster Abstract, 2019.

Krishnamoorthy, et al., "Modeling Solute Distribution in a Column", Second Canada-China Nonferrous Metallurgy Forum, Poster, 2019.

Krishnamoorthy, Prashanth, et al., "Modeling the distribution of an adsorbing solute in a catalyzed column", Minerals Engineering, vol. 182, 107556, ISSN 0892-6875, https://doi.org/10.1016/j.mineng.2022.107556. (https://www.sciencedirect.com/science/article/pii/S0892687522001662), Aug. 18, 2021, 15 pages.

Leonida, et al., "Disruptive Metallurgy for Cleaner, Greener Battery Metals", Engineering & Mining Journal, 2021, 34-39.

Mao, Xuhui, et al., "Use of surfactants for the remediation of contaminated soils: A review", Journal of Hazardous Materials, ISSN 0304-3894, https://doi.org/10.1016/j.jhazmat.2014.12.009., 2015, 419-435.

Mora, Nelson, et al., "Implementation of Jetti Resources Catalytic Technology at Pinto Valley Minte to Leach Low-Grade Chalcopyrtie Ore", Hidrometallurgy, Copper 2022, Jetti Resources, USA, Pinto Valley Mining Corporation, USA, Worley, Australia, Nov. 2022, 479-496.

Olvera, et al., "Electrochemical Dissolution of Chalcopyrite in the Presence of Thiourea and Formamidine Disulfide", Hydrometallurgy, vol. 179, May 23, 2018, 110-117.

Quezada, V., et al., "Effect of pretreatment prior to leaching on a chalcopyrite mineral in acid media using NaCl and KNO3", Journal of Materials Research and Technology, vol. 9, No. 5, 2020, 10316-10324.

Rao, Shashi, et al., "Opportunities Offered by Emerging Hydrometallurgical Technologies", Report to the Legislative-Citizen Commission on Minnesota Resources, Natural Resources Research Institute, University of Minnesota Duluth, Report of Investigations NRRI/RI-2022/10., Aug. 2022, 170 pages.

Rebolledo, Monserrat, "Kinetic Study of the Dissolution of Chalcopyrite in the Presence of a Catalyst Under Acidic Sulfate Medium", University of British Columbia. Retrieved from https://open.library.ubc.ca/collections/ubctheses/24/items/1.0349087, Jul. 31, 2017, 129 pages.

Reguly, "New Technologies Speed Low-Carbon Future", The Globe and Mail, 2021, B8.

Ren, "Catalystic Effect of Ethylene Thiourea on the Leaching of Calcopyrite", Hydrometallurgy, vol. 196, 2020, 105410-1-9.

Ren, et al., "Depassivation of Chalcopyrite with Jetti Catalyst", Second Canada-China Nonferrous Metallurgy Forum, Poster, 2019.

(56) References Cited

OTHER PUBLICATIONS

Ren, Zihe, et al., "The Nature of the Passivation Layer on Chalcopyrite Formed During Leaching", Hidrometallurgy, Jetti Services Canada., 429-442.
Ren, Zihe, et al., "The overlooked mechanism of chalcopyrite passivation", Acta Materialia, vol. 26, 118111., Sep. 2022, 236.
Simon, Grigore, et al., "Oxidation state of gold and arsenic in gold-bearing arsenian pyrite", American Mineralogist, vol. 84, doi.org/10.2138/am-1999-7-809., 1999, 1071-1079.
Wang, et al., "Mineralogy and Pretreatment of a Refractory Gold Deposit in Zambia", Minerals, vol. 9, No. 406, 2019, 1-16.
Winarko, Ronny, "Iodine-Assisted Heap Leaching of Chalcopyrite: Laboratory and Modelling Studies", University of British Columbia. Retrieved from https://open.library.ubc.ca/collections/ubctheses/24/items/1.0416283, Jul. 2022.
Xing, et al., "A Review on the Recovery of Noble Metals from Anode Slimes", Mineral Processing and Extractive Metallurgy Review, 2019, 1-14.
Yanez, et al., "Heap Leaching Improvements Using a New Leaching Aid Reagent", 11th International Seminar on Process Hydrometallurgy, Jun. 19, 2019-Jun. 21, 2019, Santiago Chile, 2019.
Zhang, Fuxin, et al., "Geochemical study of gold and arsenic mineralization of the carlin-type gold deposits", Qinling Region, China, Geochemistry, vol. 20, issue 4, 10.1007/bf03166858., Dec. 1, 2001, 333-342.
Aleksei, K, "Hydrothermal pretreatment of chalcopyrite concentrate with copper sulfate solution", Hydrometallurgy, 195., 2020, 105359.
Alkis, S., et al., "Synthesis of ultra-small Si/Ge semiconductor nano-particles using electrochemistry.", Materials Chemistry And Physics, 134(2-3)., 2012, 616-622.
Bartlett, R.W., et al., "Upgrading copper concentrate by hydrothermally converting chalcopyrite to digenite", Metallurgical and Materials Transactions B, 23(3)., 1992, 241-248.
Bender, Jack, et al., "Field Results From Leaching Aid Trials Using BASF'S LixTRA Reagent", Proceedings of ALTA 2019 Nickel-Cobalt-Copper Sessions including Pressure Acid Leaching Forum, ALTA 2019 Nickel-Cobalt-Copper Proceedings, Perth Australia, May 20-22, 2019, p. 415, 55 pages.
Chaiko, C.P., et al., "The FLS Rapid Oxidative Leach (ROL) Process. Part I: Mechano-Chemical Process for Treating Chalcopyrite", 2015.
Zhang, S.H., et al., "Electrochemistry Studies of Semiconductor Properties of Structure Materials in the Nuclear Power Plants by Zinc Injection Technique", Asia-Pacific Power And Energy Engineering Conference (Appeec)., 2011.
Fajardo, Daniel, "Startup chilena Ceibo levanta US$30 millones en EE.UU. para desarrollar tecnología sustentable de extracción de cobre", Jun. 5, 2023, 3 pages.
Kobasko, N., et al., "Mechanism of Surface Compressive Stress Formation by Intensive Quenching", 2005.
Liu, J., et al., "Etching Induced Stepped Nanostructure on Pb(Mg(1-x/2)Mn(x/2)W1/2)O3 Ceramics", Journal of the American Ceramic Society, 99(4)., 2016, 1125-1128.
Lozano, D.E., et al., "X-ray Determination of Compressive Residual Stresses in Spring Steel Generated by High-Speed Water Quenching", Materials (Basel, Switzerland), 12(7)., 2019, 1154.
Miyoshi, Y, et al., "Crystal Structure, Spin Polarization, Solid-State Electrochemistry, and High n-Type Carrier Mobility of a Paramagnetic Semiconductor: Vanadyl Tetrakis(thiadiazole)porphyrazine", Inorganic Chemistry, . 51(1), 2012, 456-462.
Pan, J.-S., et al., "Growth mechanism of relaxor-PbTiO3 single crystals shown by morphology of crystalline grains in ceramics. Journal of Crystal Growth", 284(1)., 2005, 275-280.
Robertson, SW, et al., "A Bacterial Heap Leaching Approach for the Treatment of Low Grade Primary Copper Sulphide Ore", The South African Institute of Mining and Metallurgy, The Third Southern African Conference on Base Metals, 2005, 471-484.
Robertson, SW, et al., "Advances in high-temperature heap leaching of refractory copper sulphide ores", The Journal of The South African Institute of Mining and Metallurgy, vol. 112, Dec. 2012, 1045-1050.
Southwood, M.J., "The acid leaching of nickel and copper from sulphidic ore in the presence of pyrite", Journal of the South African Institute of Mining and Metallurgy, vol. 85, No. 11., Nov. 1985, 395-401.
Todorova M, et al., ", Extending the Concept of Defect Chemistry from Semiconductor Physics to Electrochemistry", Physical Review Applied, 1(1)., 2014.
Todorova, M, et al., "Connecting semiconductor defect chemistry with electrochemistry: Impact of the electrolyte on the formation and concentration of point defects in ZnO", Surface Science, vol. 631, 2015, 190-195.
Uhrie, John L., "Pyrite As A Stockpile Leach-Aid", The Minerals, Metals and Materials Society., 1999, 481-490.
National Center for Biotechnology Information (2024). PubChem Compound Summary for CID 5590, Triton X-100. Retrieved Aug. 1, 2024 from https://pubchem.ncbi.nlm.nih.gov/compound/Triton-X-100., Mar. 25, 2005, 1-43.
Ren, Zihe, et al., (2022) "The Nature of the Passivation Layer on Chalcopyrite Formed During Leaching", Hidrometallurgy, Jetti Services Canada., 429-442.
Fu, et al., "Bioleaching of djurleite using Acidithiobacillus ferrooxidans", Minerals Engineering, vol. 40., 2013, 38-41.
Kodali, et al., "Particle damage and exposure analysis in HPGR crushing of selected copper ores for column leaching", Minerals Engineering, vol. 24, Issue 13., Oct. 2011, 1478-1487.
Rivera-Vasquez, et al., "Rapid atmospheric leaching of enargite in acidic ferric sulfate media", Hydrometallurgy, vol. 152, 2015, 149-158.
Sullivan, John., "Leaching copper from its ores", Journal of Chemical Education 8, No. 5 (1931)., May 1931, 829-847.

* cited by examiner

PROCESS FOR LEACHING METAL SULFIDES WITH REAGENTS HAVING THIOCARBONYL FUNCTIONAL GROUPS

This application is a continuation of U.S. patent application Ser. No. 16/342,934 filed Apr. 17, 2019, which is a 371 of International Application PCT/CA2017/051250 filed Oct. 19, 2017, which claims priority to U.S. patent application Nos. 62/410,331, 62/410,348, and 62/410,351, filed Oct. 19, 2016; and U.S. patent application No. 62/430,333, filed Dec. 5, 2016. The contents of each of these applications is incorporated herein by reference.

BACKGROUND

1. Field of the Disclosure

This disclosure pertains to methods for leaching metals from metal sulfide-containing ores. More particularly it pertains to a hydrometallurgical process for the extraction of base metals from base metal sulfide-containing ores using reagents having a thiocarbonyl functional group. This disclosure further pertains to recovery of reagents having a thiocarbonyl functional group from a pregnant leach solution for recirculation to a hydrometallurgical process for the extraction of base metals from base metal sulfide-containing ores using such reagents. This disclosure yet further pertains to methods for recovering catalysts from spent leaching materials and, in particular, to recovery of reagents having a thiocarbonyl functional group from spent leach materials containing base metal sulfides from which the base metal has been leached.

2. Description of Related Art

Aqueous processing of minerals presents several advantages over pyrometallurgical approaches, particularly when dealing with complex and/or low-grade ores. The main disadvantage of hydrometallurgical processes, when applied to several metal sulfide ores, is the low extraction rates that are observed. It is desirable to develop a process where high metal extractions can be achieved in time scales that are of industrial interest.

Chalcopyrite, for example, is a semiconductor, and therefore corrodes electrochemically in oxidizing solutions. In ferric sulfate media, the overall leaching reaction is as follows:

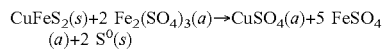

This reaction may be represented as a combination of anodic and cathodic half-cell reactions:

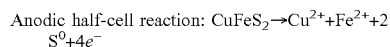

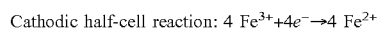

A fundamental problem with chalcopyrite oxidation is that chalcopyrite mineral surfaces become resistant to electrochemical breakdown at solution potentials above a certain level (generally considered to be about 550 to 600 mV vs Ag/AgCl). It is widely held that this results from the formation of some sort of passivating film on the mineral surface that most likely consists of an altered, partially Fe-depleted form of chalcopyrite. It is desirable to provide leaching processes in which such passivation is reduced or avoided.

Some work has been done in extractive hydrometallurgy to recover precious metals such as gold and silver from copper concentrates or chalcopyrite residues after copper extraction. Deschênes and Ghali (Hydrometallurgy 20:129-202) demonstrated the potential application of thiourea in acidic sulfate leaching of sulfide concentrates, such as those containing chalcopyrite, to selectively recover gold and silver. Thiourea is an organosulfur compound having a thiocarbonyl functional group. However, thiourea did not appear to have an effect on the recovery of copper from copper sulfides.

Leaching of metals in the presence of halogens has also been investigated extensively over the past several decades. Use of chloride at elevated temperature can result in high recoveries of copper (Winand, Hydrometallurgy, 27: 285-316) from chalcopyrite. Chloride leaching at room temperature has also been demonstrated to be effective, thus rendering it suitable for heap leaching (WO2015059551). Bromide leaching has mostly been investigated for gold (Li et al. Proceedings of the 3rd Pan American Materials Congress, 2017: 653-660). However, several technologies also demonstrate its beneficial effect in copper extraction from sulfide ores (U.S. Pat. Nos. 5,989,311, 9,290,827). Iodide leaching has also been proven effective under various conditions (U.S. Pat. Nos. 5,989,311, 8,163,063, 8,287,623, and 8,865,119).

SUMMARY

This disclosure relates, at least in part, to the unexpected discovery that several reagents comprising a thiocarbonyl function group (e.g. thiourea) can be used to facilitate the leaching of metal from several metal sulfides (e.g. copper from chalcopyrite) with acidic leach solutions, for example an acidic sulfate leach solution or a halide leach solution. When added in small amounts, such reagents may increase the rate of metal leaching over that observed in its absence.

This disclosure relates to a method of recovering at least one metal from at least one metal sulfide in an ore, the method comprising: contacting the ore with an acidic sulfate solution containing ferric sulfate and a reagent having a thiocarbonyl functional group to produce a pregnant solution containing metal ions; and recovering the at least one metal from the pregnant solution, wherein the at least one metal includes: copper, wherein the at least one metal sulfide includes chalcopyrite, covellite, bornite, enargite, a copper sulfide of the formula $Cu_xS_y$ wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof.

This disclosure relates to a method of recovering at least one metal from at least one metal sulfide in a concentrate, the method comprising: contacting the concentrate with an acidic sulfate solution containing a reagent having a thiocarbonyl functional group to produce a pregnant solution containing metal ions; and recovering the at least one metal from the pregnant solution, wherein the at least one metal includes: copper, wherein the at least one metal sulfide includes chalcopyrite, covellite, bornite, enargite, a copper sulfide of the formula $Cu_xS_y$ wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof.

This disclosure relates to a method of recovering at least one metal from at least one metal sulfide in a material, the method comprising: contacting the material with an acidic sulfate solution containing a reagent having a thiocarbonyl functional group to produce a pregnant solution containing metal ions; and recovering the at least one metal from the pregnant solution, wherein the at least one metal includes: copper, wherein the at least one metal sulfide includes chalcopyrite, covellite, bornite, enargite, a copper sulfide of the formula $Cu_xS$, wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof.

The concentrate, ore, or other material may be provided as coarse particles. The coarse particles may be agglomerated particles.

In the methods described above, the concentration of the reagent in the acidic sulfate solution may be in the range of about 0.2 mM to 100 mM, about 0.2 mM to about 20 mM, about 0.2 mM to about 10 mM, about 0.2 mM to about 5 mM, about 0.2 mM to about 4 mM, about 0.2 mM to about 3 mM, about 0.2 mM to about 2 mM, about 0.2 mM to about 1.5 mM, about 0.2 mM to about 1.0 mM, or about 0.2 mM to about 0.5 mM.

Where the metal is a copper sulfide of the formula $Cu_xS_y$, wherein the x:y ratio is between 1 and 2, the copper sulfide may includes chalcocite, djurleite, digenite, or a combination thereof.

In the methods described above, the reagent may be thiourea (Tu), ethylene thiourea (Etu), thioacetamide (TA), sodium-dimethyldithiocarbamate (SDDC), ethylene trithiocarbonate (ETC), thiosemicarbazide (TSCA), or a combination thereof.

This disclosure yet further relates to a method of recovering at least one metal from at least one metal sulfide in an ore, the method comprising: contacting the ore with an acidic sulfate solution comprising ferric sulfate and formamidine disulfide (FDS) to produce a pregnant solution containing metal ions; and recovering the metal from the pregnant solution, wherein the at least one metal includes: copper, wherein the at least one metal sulfide includes chalcopyrite, covellite, bornite, enargite, a copper sulfide of the formula $Cu_xS$, wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof.

This disclosure yet further relates to a method of recovering at least one metal from at least one metal sulfide in a concentrate, the method comprising: contacting the concentrate with an acidic sulfate solution comprising ferric sulfate and formamidine disulfide (FDS) to produce a pregnant solution containing the metal ions; and recovering the metal from the pregnant solution, wherein the at least one metal includes: copper, wherein the at least one metal sulfide includes chalcopyrite, covellite, bornite, enargite, a copper sulfide of the formula $Cu_xS_y$, wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof.

This disclosure yet further relates to a method of recovering at least one metal from at least one metal sulfide in a material, the method comprising: contacting the material with an acidic sulfate solution comprising ferric sulfate and formamidine disulfide (FDS) to produce a pregnant solution containing the metal ions; and recovering the metal from the pregnant solution, wherein the at least one metal includes: copper, wherein the at least one metal sulfide includes chalcopyrite, covellite, bornite, enargite, a copper sulfide of the formula $Cu_xS$. wherein the x:y ratio is between 1 and 2, or a combination thereof; cadmium, wherein the at least one metal sulfide is greenockite; nickel, wherein the at least one metal sulfide is pentlandite, violarite, or a combination thereof; or a combination thereof.

The concentrate, ore, or other material may be provided as coarse particles. The coarse particles may be agglomerated particles.

The concentration of FDS in the acidic sulfate solution may be in the range of about 0.1 mM to 50 mM, about 0.1 mM to about 15 mM, about 0.1 mM to about 10 mM, about 0.2 mM to about 5 mM, about 0.1 mM to about 2.5 mM, about 0.1 mM to about 2 mM, about 0.1 mM to about 1.5 mM, about 0.1 mM to about 1.0 mM, about 0.1 mM to about 0.5 mM, or about 0.1 mM to about 0.25 mM. Where the metal is a copper sulfide of the formula $Cu_xS_y$, wherein the x:y ratio is between 1 and 2, the copper sulfide may includes chalcocite, djurleite, digenite, or a combination thereof.

The concentration of FDS in the acidic sulfate solution may be sufficient to provide sufficient thiourea to increase the rate of the metal ion extraction relative to an acidic sulfate solution that does not contain the reagent to produce the pregnant leach solution containing the metal ions In the methods described above, wherein the ore may be provided as coarse particles, which may be agglomerated particles. Ferric ions may be used to oxidize the metal sulfide. In the methods described above, the ferric ions may be generated at least in part by bacteria.

The methods may involve a percolation leach. The percolation leach may be a heap leach. The percolation leach may be a vat leach. The leach may be a tank leach.

Recovering metal from the pregnant leach solution may include solvent extraction and electrowinning.

In the methods described above, the acidic sulfate solution may comprise halide ions. The halide ions comprise chloride ions, bromide ions, iodide ions, or a combination thereof. The concentration of chloride in the acidic sulfate solution may be about 20 g/L or less, about 50 g/L or less, about 80 g/L or less, about 20 g/L or less, in a range of about 20 g/L to about 120 g/L, in a range of about 20 g/L to about 80 g/L, or in a range of about 20 g/L to about 50 g/L. The concentration of iodide in the acidic sulfate solution may be about 300 ppm or less, about 100 ppm or less, or in a range of about 100 ppm to about 300 ppm. The concentration of bromide in the acidic sulfate solution may be about 10 g/L or less, about 30 g/L or less, or in a range of about 10 g/L to about 30 g/L.

This disclosure yet further relates to use of a reagent having a thiocarbonyl functional group for extracting at least one base metal from at least one base metal sulfide in a material. The reagent may be, but is not necessarily limited to, thiourea (Tu), ethylene thiourea (ETu), thioacetamide (TA), sodium-dimethyldithiocarbamate (SDDC), ethylene trithiocarbonate (ETC), thiosemicarbazide (TSCA), or combinations thereof. The concentration of the reagent may be in the range of about 0.2 mM to 100 mM, or in the range of about 0.2 mM to about 30 mM.

This disclosure yet further relates to use of formamidine disulfide (FDS) for extracting at least one base metal from at least one base metal sulfide in a material.

The FDS may be at a concentration in the range of about 0.1 mM to 50 mM, or in the range of about 0.1 mM to about 15 mM.

In the uses described above, the at least one base metal may include copper, cadmium, nickel, or a combination thereof. The at least one base metal may comprise: copper, wherein the at least one base metal sulfide is chalcopyrite, covellite, bornite, enargite, a copper sulfide of the formula $Cu_xS_y$, wherein the x:y ratio is between 1 and 2, or a combination thereof; cadmium, wherein the at least one base metal sulfide is greenockite; nickel, wherein the at least one base metal sulfide is pentlandite, violarite, or a combination thereof; or a combination thereof.

The material may be an ore or a concentrate.

Such use may be made in the presence of presence halide ions. The halide ions may include chloride ions, bromide ions, iodide ions, or a combination thereof. The concentration of chloride in the acidic sulfate solution may be about 20 g/L or less, about 50 g/L or less, about 80 g/L or less, about 20 g/L or less, in a range of about 20 g/L to about 120 g/L, in a range of about 20 g/L to about 80 g/L, or in a range of about 20 g/L to about 50 g/L. The concentration of iodide in the acidic sulfate solution may be about 300 ppm or less, about 100 ppm or less, or in a range of about 100 ppm to about 300 ppm. The concentration of bromide in the acidic sulfate solution may be about 10 g/L or less, about 30 g/L or less, or in a range of about 10 g/L to about 30 g/L.

This disclosure yet further relates to a method of recovering a reagent having a thiocarbonyl functional group from a aqueous pregnant leach solution (PLS), wherein the aqueous PLS comprises the reagent and base metal ions, wherein a portion of the reagent is complexed with based metal ions, the method comprising: mixing the PLS with an organic solvent containing a base metal ion extractant to form a mixture; extracting the base metal ions from the PLS into the organic solvent; and separating the mixture into a base metal ion-depleted raffinate comprising the reagent and a base metal ion-enriched organic phase comprising the organic solvent and base metal ions. Extracting the base metal ions from the PLS into the organic solvent may comprise de-complexing reagent from base metal ions to increase the amount of free reagent in the raffinate compared to the PLS. The reagent may be thiourea (Tu), ethylene thiourea (ETu), thioacetamide (TA), sodium-dimethyldithiocarbamate (SDDC), ethylene trithiocarbonate (ETC), thiosemicarbazide (TSCA), or a combination thereof. The raffinate may further comprise formamidine disulfide (FDS), in which case the method may further comprise contacting the raffinate with a reducing agent to reduce FDS to Tu. Contacting the raffinate with a reducing agent to reduce FDS to Tu may comprise reducing FDS to obtain a ratio of Tu:FDS in the range of about 0.5:1 to about 9:1. The reducing agent may be $H_2S$, $SO_2$, or NaSH.

This disclosure yet further relates to a method of recovering FDS from a aqueous pregnant leach solution (PLS), wherein the aqueous PLS comprises the reagent and base metal ions, the method comprising: mixing the PLS with an organic solvent containing a base metal ion extractant to form a mixture; extracting the base metal ions from the PLS into the organic solvent; and separating the mixture into a base metal ion-depleted raffinate comprising FDS and a base metal ion-enriched organic phase comprising the organic solvent and base metal ions.

The base metal ions may include cadmium, nickel, copper, or a combination thereof.

The organic solvent may be an aliphatic solvent, an aromatic solvent, or a combination thereof. The organic solvent may be kerosene, alkyl aromatics, cyclo-paraffins, or a combination thereof.

The base metal ion extractant may be an aldoxime, a ketoxime, or a combination thereof. The base metal ion extract may further comprise an ester modifier, an alkylphenol modifier, or a combination thereof.

The PLS may further comprise Tu complexed to base metal ions, and extracting the base metal ions from the PLS comprises de-complexing Tu from base metal ions to increase the amount of free Tu in the raffinate compared to the PLS.

This disclosure yet further relates a method of recovering at least one base metal from at least one base metal sulfide in a material containing the at least one base metal sulfide, the method comprising: contacting the material with a lixiviant, wherein the lixiviant comprises an acidic sulfate solution containing ferric sulfate and a reagent having a thiocarbonyl functional group, to extract base metal ions from the at least one base metal sulfide to produce a pregnant leach solution (PLS); mixing the PLS with an organic solvent containing a base metal ion extractant to form a mixture; extracting base metal ions from the PLS into the organic solvent; and separating the mixture into a base metal ion-depleted raffinate comprising the reagent and a base metal ion-enriched organic phase comprising the organic solvent and base metal ions.

Extracting the base metal ions from the PLS into the organic solvent comprises de-complexing reagent from base metal ions to increase the amount of free reagent in the raffinate compared to the PLS. The reagent may be, but is not necessarily limited to, thiourea (Tu), ethylene thiourea (ETu), thioacetamide (TA), sodium-dimethyldithiocarbamate (SDDC), ethylene trithiocarbonate (ETC), thiosemicarbazide (TSCA), or combinations thereof. Where the reagent comprises Tu, the raffinate may further comprise formamidine disulfide (FDS), wherein the method further comprises contacting the raffinate with a reducing agent to reduce FDS to Tu. Contacting the raffinate with a reducing agent to reduce FDS to Tu may comprise reducing FDS to obtain a ratio of Tu:FDS in the range of about 0.5:1 to about 9:1. The reducing agent may be $H_2S$, $SO_2$, or NaSH.

This disclosure yet further relates a method of recovering at least one base metal from at least one base metal sulfide in a material containing the at least one base metal sulfide, the method comprising: contacting the material with a lixiviant, wherein the lixiviant comprises an acidic sulfate solution containing ferric sulfate and formamidine disulfide (FDS), to extract base metal ions from the at least one base metal sulfide to produce a pregnant leach solution (PLS); mixing the PLS with an organic solvent containing a base metal ion extractant to form a mixture;

extracting base metal ions from the PLS into the organic solvent; and separating the mixture into a base metal ion-depleted raffinate comprising the reagent and a base metal ion-enriched organic phase comprising the organic solvent and base metal ions. The PLS may further comprise thiourea (Tu) complexed to base metal ions, wherein the method further comprises extracting the base metal ions from the PLS comprises de-complexing Tu from base metal ions to increase the amount of free Tu in the raffinate compared to the PLS. The method may further comprise contacting the raffinate with a reducing agent to reduce FDS to Tu. Contacting the raffinate with a reducing agent to reduce FDS to Tu may comprise reducing FDS to obtain a ratio of Tu:FDS in the range of about 0.5:1 to about 9:1. The reducing agent may be $H_2S$, $SO_2$, or NaSH.

The organic solvent may be an aliphatic solvent, an aromatic solvent, or a combination thereof. The organic solvent may include kerosene, alkyl aromatics, cyclo-paraffins, or a combination thereof. The base metal ions may include cadmium, nickel, or copper. The base metal ion extractant may be an aldoxime, a ketoxime, or a combination thereof.

The base metal ions may include cadmium, nickel, copper, or a combination thereof.

The base metal ion extractant may be an aldoxime, a ketoxime, or a combination thereof. The base metal ion extract may further comprise an ester modifier, an alkylphenol modifier, or a combination thereof.

The lixiviant and/or the PLS may comprise halide ions. The halide ions may include chloride ions, bromide ions, iodide ions, or a combination thereof. The concentration of chloride in the lixiviant or PLS may be about 20 g/L or less, about 50 g/L or less, about 80 g/L or less, about 20 g/L or less, in a range of about 20 g/L to about 120 g/L, in a range of about 20 g/L to about 80 g/L, or in a range of about 20 g/L to about 50 g/L. The concentration of iodide in the lixiviant or PLS may be about 300 ppm or less, about 100 ppm or less, or in a range of about 100 ppm to about 300 ppm. The concentration of bromide in the lixiviant or PLS may be about 10 g/L or less, about 30 g/L or less, or in a range of about 10 g/L to about 30 g/L.

The methods may further comprise recirculating a portion of the raffinate comprising the reagent having a thiocarbonyl functional group to the lixiviant. The lixiviant comprising the portion of the raffinate that is recirculated from solvent extraction may be supplemented with fresh reagent having a thiocarbonyl functional group to obtain desired concentration of reagent having a thiocarbonyl functional group in the lixiviant.

This disclosure yet further relates a method of recovering a reagent comprising a thiocarbonyl functional group sequestered in leach materials comprising at least one base metal sulfide, the method comprising rinsing the leach materials with a wash solution comprising base metal ions to produce a pregnant wash solution (PWS) comprising the reagent. The method may further comprise: mixing the PWS with an organic solvent containing a base metal ion extractant to form a mixture; extracting the base metal ions from the PWS into the organic solvent; and separating the mixture into a base metal ion-depleted solution comprising the reagent and a base metal ion-enriched solution comprising the organic solvent and base metal ions. Extracting the base metal ions from the PWS into the organic solvent comprises de-complexing reagent from base metal ions to increase the amount of free reagent in the base metal ion-depleted solution compared to the PWS. The organic solvent may include an aliphatic solvent, an aromatic solvent, or a combination thereof. The organic solvent may comprise kerosene, alkyl aromatics, cyclo-paraffins, or a combination thereof. The reagent may include, but is not necessarily limited to, thiourea (Tu), ethylene thiourea (ETu), thioacetamide (TA), sodium-dimethyldithiocarbamate (SDDC), ethylene trithiocarbonate (ETC), thiosemicarbazide (TSCA), or a combination thereof. Where the reagent comprises Tu, the base metal ion-depleted solution further comprises FDS, wherein the method may further comprise contacting the base metal ion-depleted solution with a reducing agent to reduce FDS to Tu. Contacting the base metal ion-depleted solution with a reducing agent to reduce FDS to Tu comprises reducing FDS to obtain a ratio of Tu:FDS in the range of about 0.5:1 to about 9:1. The reducing agent may be $H_2S$, $SO_2$, or NaSH.

The organic solvent may be an aliphatic solvent, an aromatic solvent, or a combination thereof. The organic solvent may include kerosene, alkyl aromatics, cyclo-paraffins, or a combination thereof. The base metal ions may include cadmium, nickel, or copper. The base metal ion extractant may be an aldoxime, a ketoxime, or a combination thereof.

The base metal ions may include cadmium, nickel, copper, or a combination thereof.

The base metal ion extractant may be an aldoxime, a ketoxime, or a combination thereof. The base metal ion extract may further comprise an ester modifier, an alkylphenol modifier, or a combination thereof.

The concentration of base metal ions in the wash solution may be at least 100 ppm, at least 400 ppm, or at least 1000 ppm.

The method may further include, prior to rinsing the leach materials with the wash solution, rinsing the leach materials with an acidic solution. The acidic solution may have a pH of about 1.8.

The disclosure further relates to a method of recovering at least one base metal from a material containing at least one base metal sulfide, the method comprising: recovering a reagent comprising a thiocarbonyl functional group sequestered in leach materials comprising at least one base metal sulfide according to a method as described above; mixing the recovered agent with an acidic sulfate solution containing ferric sulfate to form a lixiviant; contacting the material with the lixiviant to extract base metal ions from the at least one base metal sulfide to produce a pregnant leach solution (PLS) comprising base metal ions. The acidic sulfate solution, prior to mixing with the recovered agent, may comprise a pre-existing reagent comprising a thiocarbonyl function group, pre-existing FDS, or a combination thereof. The pre-existing reagent is thiourea (Tu), thioacetamide (TA), sodium-dimethyldithiocarbamate (SDDC), ethylene trithiocarbonate (ETC), thiosemicarbazide (TSCA), or a combination thereof. The method may further comprising: mixing the PLS with an organic solvent containing a base metal ion extractant to form a mixture; extracting base metal ions from the PLS into the organic solvent, and separating the mixture into a base metal ion-depleted raffinate comprising the reagent and a base metal ion-enriched solution comprising the organic solvent and base metal ions. Extracting the base metal ions from the PLS into the organic solvent comprises de-complexing reagent from base metal ions to increase the amount of free reagent in the raffinate compared to the PLS. Where the reagent is Tu, the raffinate may further comprise FDS, wherein the method further may further comprise contacting the raffinate with a reducing agent to reduce FDS to Tu. Contacting the raffinate with a reducing agent to reduce FDS to Tu may comprise reducing FDS to obtain a ratio of Tu:FDS in the range of about 0.5:1 to about 9:1. The reducing agent is $H_2S$, $SO_2$ or NaSH.

The organic solvent may be an aliphatic solvent, an aromatic solvent, or a combination thereof. The organic solvent may include kerosene, alkyl aromatics, cyclo-paraffins, or a combination thereof. The base metal ions may include cadmium, nickel, or copper. The base metal ion extractant may be an aldoxime, a ketoxime, or a combination thereof.

The base metal ions may include cadmium, nickel, copper, or a combination thereof.

The base metal ion extractant may be an aldoxime, a ketoxime, or a combination thereof. The base metal ion extract may further comprise an ester modifier, an alkylphenol modifier, or a combination thereof.

The lixiviant and/or the PLS may comprise halide ions. The halide ions may include chloride ions, bromide ions, iodide ions, or a combination thereof. The concentration of chloride in the lixiviant or PLS may be about 20 g/L or less, about 50 g/L or less, about 80 g/L or less, about 20 g/L or less, in a range of about 20 g/L to about 120 g/L, in a range of about 20 g/L to about 80 g/L, or in a range of about 20 g/L to about 50 g/L. The concentration of iodide in the lixiviant or PLS may be about 300 ppm or less, about 100 ppm or less, or in a range of about 100 ppm to about 300 ppm. The concentration of bromide in the lixiviant or PLS may be about 10 g/L or less, about 30 g/L or less, or in a range of about 10 g/L to about 30 g/L.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
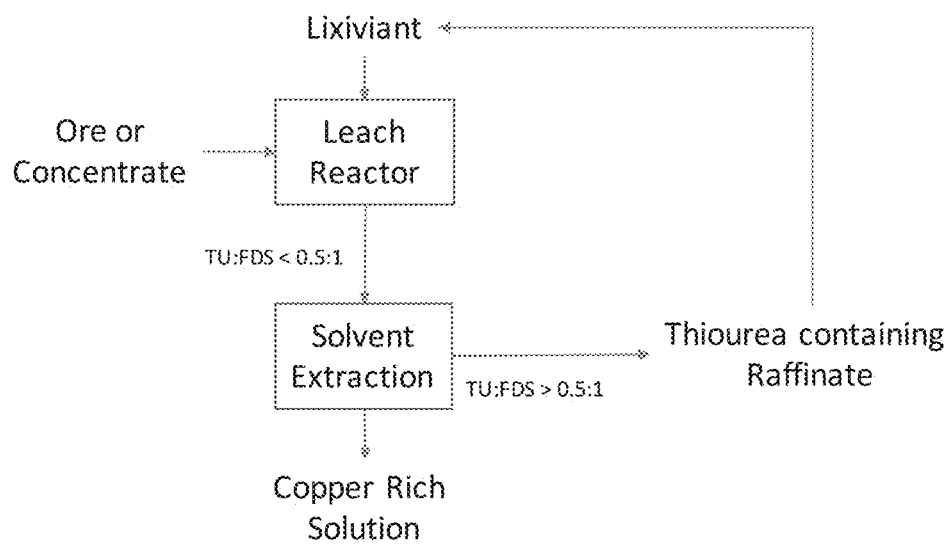
FIG. 1 is a flow diagram of the recovery of a leach process according to embodiments of the invention.
Figure 2:
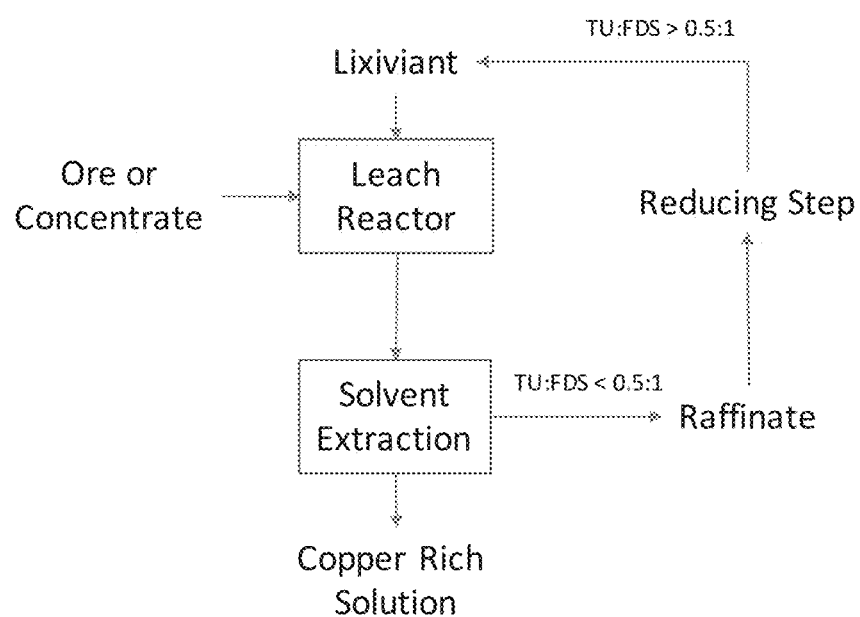
FIG. 2 is a flow diagram of the recovery of a leach process according to embodiments of the invention that involves a reducing step prior to recirculation of the raffinate to the lixiviant.

This disclosure relates to methods of recovering base metals from base metal sulfide minerals, and relates in particular to the unexpected discovery that various reagents having a thiocarbonyl functional group, e.g. thiourea ("Tu", also known as thiocarbamide), can be used to facilitate the leaching of base metals from base metal sulfides in various minerals with acidic sulfate leach solutions, even in the presence of halide species. Such reagents can increase the rate of metal sulfide leaching.

Further aspects of this disclosure relate to the recovery of reagents having a thiocarbonyl functional group from the pregnant leach solution ("PLS") for recirculation to the leach solution (i.e. the lixiviant). Such recirculation may provide an advantage of reducing the amount of fresh reagent that must be added to the lixiviant over time.

The skilled person will understand that an equilibrium exists between Tu and formamidine disulfide (FDS) in solution. The equilibrium between FDS and Tu in solution can be described by the following equation:

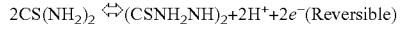
2CS(NH$_2$)$_2$ ⇌ (CSNH$_2$NH)$_2$+2H$^+$+2e$^-$(Reversible)

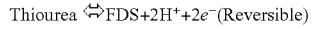
Thiourea ⇌ FDS+2H$^+$+2e$^-$(Reversible)

Tu provides a stronger effect on enhancing leaching of base metals from materials containing base metal sulfides. For example, copper leaches more quickly from sulfide ores/concentrates in the presence of TU than FDS or the TU-Cu complex. Therefore the leaching process will be enhanced by the recirculation of a solution with higher free TU to the leach. Accordingly, more particular aspects of this disclosure relate to the addition of a reducing agent to raffinate comprising Tu (Tu) and formamidine disulfide (FDS) to bias the equilibrium in favor of Tu prior to recirculation to the leach solution.

This disclosure also pertains to methods for recovering catalysts from spent leaching materials. More particularly it pertains to recovery of reagents having a thiocarbonyl functional group from depleted leach materials containing base metal sulfides from which the base metal has been leached.

"Base metal" as used herein refers to non-ferrous metals excluding precious metals. These may include copper, lead, nickel, and cadmium. These may further include zinc, aluminum, tin, tungsten, molybdenum, tantalum, cobalt, bismuth, cadmium, titanium, zirconium, antimony, manganese, beryllium, chromium, germanium, vanadium, gallium, hafnium, indium, niobium, rhenium and thallium.

Such methods may be particularly useful in the recovery of metal from low grade ores that do not contain the base metal sulfide mineral in high proportions. The method involves contacting the base metal sulfide mineral with an acidic sulfate solution containing the reagent having a thiocarbonyl functional group.

The skilled person further understands that just because a reagent having a thiocarbonyl functional group may be useful in extracting a base metal from a metal sulfide, or mineral containing such metal sulfide, does not mean that such reagent will be useful in the extraction of the same metal from other metal sulfides comprising the metal.

Minerals

Chalcopyrite (CuFeS$_2$)

The leaching of chalcopyrite is accomplished in acidic ferric sulfate solution according to the following reaction formula:

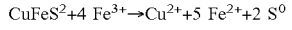
CuFeS$^2$+4 Fe$^{3+}$→Cu$^{2+}$+5 Fe$^{2+}$+2 S$^0$

Covellite (CuS)

Leaching of covellite in ferric sulfate solution proceeds according to the following reaction formula:

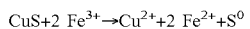
CuS+2 Fe$^{3+}$→Cu$^{2+}$+2 Fe$^{2+}$+S$^0$

Chalcocite (Cu$_2$S)

Leaching of chalcocite in ferric solution proceeds according to the following formula:

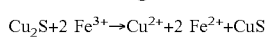
Cu$_2$S+2 Fe$^{3+}$→Cu$^{2+}$+2 Fe$^{2+}$+CuS

The skilled person understands that that "chalcocite" ores frequently contain a mixture of minerals with the formula Cu$_x$S$_y$, where the x:y ratio is between 1 and 2. Additional minerals within this formula include digenite and djurleite.

Bornite (Cu$_5$FeS$_4$)

Bornite is an important copper mineral that usually coexists with chalcopyrite. The leaching process of bornite in ferric solution is described in two stages:

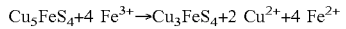
Cu$_5$FeS$_4$+4 Fe$^{3+}$→Cu$_3$FeS$_4$+2 Cu$^{2+}$+4 Fe$^{2+}$

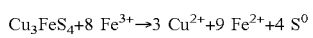
Cu$_3$FeS$_4$+8 Fe$^{3+}$→3 Cu$^{2+}$+9 Fe$^{2+}$+4 S$^0$

Enargite (Cu$_3$AsS$_4$)

Unlike the other copper minerals mentioned above (chalcopyrite, covellite, charcocite and bornite), the copper in enargite is mainly Cu(II) instead of Cu(I). The difference in copper's oxidation state will also influence its leaching kinetics under catalyzed conditions. Previous study showed that the leaching of enargite at atmospheric pressure is extremely slow. The dissolution of enargite in ferric sulfate media can take various paths. Two of them are described as follows:

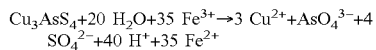

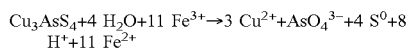

Greenockite (CdS)

Cadmium metal and compounds are mainly used for alloys, coatings, batteries and plastic stabilizers. There are no mines specifically for cadmium extraction. Cadmium sulfide is usually associated with zinc sulfides and is recovered as a byproduct of zinc leaching from roasted sulfide concentrates.

Violarite (FeNi$_2$S$_4$)

Violarite is a nickel (III) sulfide mineral that is usually associated with primary pentlandite nickel sulfide ores.

Reagents

A person skilled in the art will understand that any compound having a thiocarbonyl functional group could be potentially used in accordance with the technology disclosed herein. The skilled person also understands that reagents having a thiocarbonyl functional group include, but are not limited to Tu, ethylene thiourea (ETu), thioacetamide (TA), sodium-dimethyldithiocarbamate (SDDC), ethylene trithiocarbonate (ETC) and thiosemicarbazide (TSCA).

A non-exhaustive list of additional compounds having a thiocarbonyl functional group is: isothiourea; N—N' substituted thioureas, of which ETu (also known as 2-Thioxoimidazolidine or N,N'-Ethylenethiourea) is an example; 2,5-dithiobiurea; dithiobiuret; Thiosemicarbazide purum, Thiosemicarbazide; Methyl chlorothiolformate; Dithiooxamide; Thioacetamide; 2-Methyl-3-thiosemicarbazide; 4-Methyl-3-thiosemicarbazide; Vinylene trithiocarbonate purum; Vinylene trithiocarbonate; 2-Cyanothioacetamide; Ethylene trithiocarbonate; Potassium ethyl xanthogenate; Dimethylthiocarbamoyl chloride; dimethyldithiocarbamate; S,S'-Dimethyl dithiocarbonate; Dimethyl trithiocarbonate; N,N-Dimethylthioformamide; 4,4-Dimethyl-3-thiosemicarbazide; 4-Ethyl-3-thiosemicarbazide; O-Isopropylxanthic acid; Ethyl thiooxamate; Ethyl dithioacetate; Pyrazine-2-thiocarboxamide; Diethylthiocarbamoyl chloride; diethyldithiocarbamate; Tetramethylthiuram monosulfide; Tetramethylthiuram disulfide;

Pentafluorophenyl chlorothionoformate; 4-Fluorophenyl chlorothionoformate; O-Phenyl chlorothionoformate; O-Phenyl chlorothionoformate; Phenyl chlorodithioformate; 3,4-Difluorothiobenzamide; 2-Bromothiobenzamide; 3-Bromothiobenzamide; 4-Bromothiobenzamide; 4-Chlorothiobenzamide; 4-Fluorothiobenzamide; Thiobenzoic acid; Thiobenzamide; 4-Phenylthiosemicarbazide; O-(p-Tolyl) chlorothionoformate; 4-Bromo-2-methylthiobenzamide; 3-Methoxythiobenzamide; 4-Methoxythiobenzamide; 4-Methylbenzenethioamide; Thioacetanilide; Salicylaldehyde thiosemicarbazone; Indole-3-thiocarboxamide; S-(Thiobenzoyl)thioglycolic acid; 3-(Acetoxy)thiobenzamide; 4-(Acetoxy)thiobenzamide; methyl N'-[(e)-(4-chlorophenyl)methylidene]hydrazonothiocarbamate; 3-Ethoxythiobenzamide; 4-Ethylbenzene-1-thiocarboxamide; tert-Butyl 3-[(methylsulfonyl)oxy]-1-azetanecarboxylate;

Diethyldithiocarbamic acid; 2-(Phenylcarbonothioylthio) propanoic acid; 2-Hydroxybenzaldehyde N-ethylthiosemicarbazone; (1R,4R)-1,7,7-Trimethylbicyclo[2.2.1]heptane-2-thione; Tetraethylthiuram disulfide; Tetraethylthiuram disulfide; 4'-Hydroxybiphenyl-4-thiocarboxamide; 4-Biphenylthioamide; Dithizone; 4'-Methylbiphenyl-4-thiocarboxamide; tetraisopropylthiuram disulfide; Anthracene-9-thiocarboxamide; Phenanthrene-9-thiocarboxamide; Sodium dibenzyldithiocarbamate; and 4,4'-Bis(dimethylamino)thiobenzophenone. Such agents are ready available from, for example, Sigma Aldrich.

Each of Tu, ETu, TA, SDDC, ETC and TSCA feature a thiocarbonyl functional group having a sulfur that 1) bears a partial negative charge, 2) bears negative electrostatic potential surface, and 3) has an empty π*-antibonding orbital as its lowest unoccupied molecular orbital (LUMO). Accordingly, the skilled person may reasonably expect that other reagents, including those additional reagents listed above, that share such criteria and are sufficiently soluble in water may be useful in the performance of the methods disclosed herein (provided that they do not complex with the metal or iron oxidant to form precipitates). It will be within the purview of the skilled person to identify potentially useful reagents and test them to determine efficacy with any particular ore, if any at all.

For example, Tu has a thiocarbonyl functional group with the sulfur bearing a partial charge of −0.371 as calculated using Gaussian 09 software, a negative electrostatic potential around the Sulfur, and π*-antibonding orbital as its LUMO. Hence, Tu satisfies all three criteria and has demonstrated catalytic effect.

TA has a similar structure as Tu, but with a CH$_3$ side chain instead of NH$_2$. It has a thiocarbonyl functional group with the sulfur bearing a partial charge of −0.305 as calculated using Gaussian 09 software, which is slightly lower than that for Tu, a negative electrostatic potential around the sulfur, and a π*-antibonding orbital as its LUMO. Accordingly, TA also satisfies all three criteria and has demonstrated catalytic effect.

ETC differs from Tu and TA as it does not contain any thioamide group. It has a thiocarbonyl functional group with the two sulfur atoms σ-bonded to carbon as the side chain. The sulfur in the thiocarbonyl group bears a partial charge of −0.122 as calculated using Gaussian 09 software, which is much lower than Tu, a negative electrostatic potential around the Sulfur, and π*-antibonding orbital as its LUMO. Accordingly, ETC also satisfies all three criteria and has demonstrated catalytic effect.

In comparison, urea has a carbonyl functional group with a C=O bond instead of C=S. The oxygen in the C=O bond bears a partial charge of −0.634 as calculated using Gaussian 09 software, and a negative electrostatic potential around it, which is very similar to the sulfur atom in Tu. However, its LUMO does not contain π*-antibonding. Accordingly, urea is not predicted to have a catalytic effect in metal leaching.

Carbon disulfide (CS$_2$) contains two thiocarbonyl functional groups. Although the sulfur atoms of each functional group contain a π*-antibonding orbitals as their LUMO, they bear a partial positive charge of +0.012 as calculated using Gaussian 09 software. Therefore, CS$_2$ is not predicted to have catalytic effect.

Of course, the reagent should also be water soluble. ETC, for example, is only sparingly soluble in water, which may explain why it appears less effective than Tu in leaching copper from chalcopyrite.

Preferentially, the reagent will not form complexes/precipitate with Fe$^{2+}$/Fe$^{3+}$ ions. TSCA, for example, is able to form a red-color complex with Fe$^{3+}$ in solution, which may explain why it is less effective than Tu in leaching copper from chalcopyrite.

The reagent also should not complex/precipitate with target metal ions such as $Cu^+$, $Cu^{2+}$, $Cd^{2+}$, or $Ni^{2+}$. Dithiooxamide forms an insoluble complex with copper ions and therefore cannot be used for the leaching of copper sulfide minerals, whereas TA complexes with $Cd^{2+}$ ions to form an insoluble complex and therefore cannot be used for leaching cadmium sulfide minerals such as greenockite.

Again, the skilled person will appreciate that not all compounds comprising a thiocarbonyl functional group will be useful in increasing the rate of metal extraction from a metal sulfide. Furthermore, the skilled person will appreciate that a reagent that works to increase the rate of extraction of metal from one metal sulfide may not be useful to increase the rate of extraction of a metal from a different metal sulfide. Again, it will be within the purview of the skilled person to identify potentially useful reagents and test them to determine efficacy with any particular ore, concentrate, or other material, if any at all.

Formamidine Disulfide (FDS)

Formamidine disulfide (FDS) is generated by oxidation of Tu. In the presence of an oxidant such as ferric sulfate, Tu will oxidize partially to formamidine disulfide (FDS) according to the following half-cell reaction:

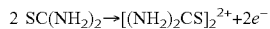

FDS contains no thiocarbonyl functional group but a sulfur-sulfur sigma bond instead. An equilibrium exists between FDS and Tu in a ferric sulfate solution, such that a leach solution prepared with FDS rather than Tu will provide the Tu necessary for catalysis of the metal sulfide leach. That is, a molecule of FDS will dissociate into two molecules of Tu upon dissolution in the ferric sulfate leach solution. Accordingly, a leaching solution employing Tu as the reagent having the thiocarbonyl functional group may be effectively be prepared using either Tu or FDS.

The skilled person will understand that, due to this equilibrium, the concentration of Tu (and FDS) may fluctuate over time. Accordingly, "concentration" or "Tu equivalent" as used herein to refer to the concentration of Tu in the leach solution, relates to the amount of Tu present in the solution as if all FDS in the solution was dissociated into Tu (i.e ignoring interconversion between the two forms). Similarly, "concentration" as used herein to refer to the concentration of FDS in the leach solution relates to the amount of FDS present in the solution as if all Tu in the solution was converted into FDS (i.e ignoring interconversion between the two forms).

"Initial concentration" is used herein to refer to the initial concentration of the reagent at the time the leach solution is applied to the ore sample. However, the skilled person will understand that the concentration of the reagent may diminish over time (e.g. through precipitation or decay) as the solution percolates through the column or the heap. Accordingly, the skilled person will appreciate that the processes disclosed herein should work to increase the rate of metal extraction from the metal sulfide provided that the concentration of the reagent is within a suitable range during some portion of the percolation through the ore. Accordingly, "contacting" material (e.g. ore or concentrate, or any other material comprising a base metal sulfide) as used herein refers to contact of the material at any point in the leach process. For greater certainty, "contacting" is not limited to the initial action by which lixiviant and/or reagent is applied to the material to be leached, but rather is includes contact between lixiviant and/or reagent at any point during the leach process.

In the presence of FDS and ferric sulfate (or another suitable oxidant), the anodic dissolution of a copper sulfide mineral such as chalcopyrite may proceed according to the following two reactions, with oxidation of the chalcopyrite by either FDS or ferric, respectively:

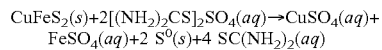

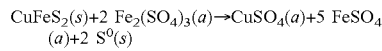

After chalcopyrite is oxidized, and the copper is leached from the concentrate, it is desirable to recover the copper from the pregnant leach solution.

The methods disclosed herein involve two basic steps, namely, leaching and metal recovery, e.g. solvent extraction (SX) and electrowinning (EW), collectively SX-EW. The leaching process may be carried out as a percolation leach (such as a heap leach), a vat leach, or a tank leach as is known in the field.

For the purposes of this disclosure, the words "containing" and "comprising" are used in a non-limiting sense to mean that items following the word are included, but items not specifically mentioned are not excluded. A reference to an element by the indefinite article "a" does not exclude the possibility that more than one of the elements is present, unless the context clearly requires that there be one and only one of these elements.

A "percolation leach", as used herein, refers to the selective removal of a mineral by causing a suitable solvent to seep into and through a mass or pile of material containing the desired soluble mineral, e.g. a column leach or a heap leach.

A "column leach", as used herein, refers to leaching through the use of a long narrow column in which ore sample and solution are in contact for measuring the effects of typical variables encountered in actual heap leaching.

A "heap leach", as used herein, is a process through which metals are extracted from the ore in which they are found, i.e. without beneficiation. A heap leach is often chosen for its efficiency and cost-effectiveness. After being removed from the ground, ore is typically sent through a crusher to break the ore down into smaller particles (although heap ores can be "run-of-mine" in which the ore is leached in an "as-blasted" state with no further crushing). Heap ores may be the product of primary, secondary, or tertiary crushing. Traditionally, the crushed particles are then "heaped", or "stacked" into a large pile.

A persistent cause of failure of heap leach operations is the presence of excess fines in the materials placed on the pad. Excess fines results in a low permeability material and thus the seepage rate of the lixiviant is too slow, or ore-solution contact is insufficient, for economic pad operations. Accordingly, the efficiency of a heap leach may be increased by agglomeration after crushing. "Agglomeration", as used herein, refers to a technique that binds together material fines or particles to create a larger product. Agglomeration may be achieved by different methods known in the art. Typically, heap leach agglomeration is performed in a drum agglomerator with sulfuric acid and no binder, or on conveyor belts with acid sprayed onto the ore at drop points.

The heap is irrigated with a solution that is dependent upon the type of ore being extracted. Acid for the leach will preferably be generated by bacteria using processes known in the art. Alternatively, additional acid could be added as necessary.

The irrigated solution is allowed to percolate through the ore, and drain to the bottom of the heap. The ore pile sits over an impermeable layer, such as plastic sheet, which collects the pregnant leach solution as it drains through and directs it to a collection pond. Once the solution is collected, it is pumped to a recovery plant to extract the copper by solvent extraction and electrowinning (SX-EW).

Applying the methods disclosed herein to a heap leach, ore containing an appropriate sulfide mineral is leached selectively in the presence of the acid sulfate and the reagent having a thiocarbonyl functional group. The concentration of the reagent having a thiocarbonyl functional group in the leach solution may be about 30 mM or perhaps even higher. The skilled person will understand that it is only necessary that the reagent concentration be within a range sufficient to increase the leach rate of the metal sulfide.

Moreover, while reagent concentrations of about 100 mM or less are sufficiently low to facilitate the leaching of metal from a particular metal sulfide, 100 mM concentrations may not be economically feasible at the present time. Accordingly, it may be preferable to use lower concentrations of reagent that are feasible from economic and operational points of view, e.g. about 90 mM or less, about 80 mM or less, about 70 mM or less, about 60 mM or less, about 50 mM or less, about 40 mM or less, about 30 mM or less, about 20 mM or less, about 10 mM or less, about 5 mM or less, about 4 mM or less, about 3 mM or less, about 2 mM or less, about 1.5 mM or less, about 1 mM or less, about 0.9 mM or less, about 0.8 mM or less, about 0.7 mM or less, about 0.6 mM or less, about 0.5 mM or less, about 0.4 mM or less, 0.3 mM or less, or about 0.2 mM.

Accordingly, the concentration of the reagent in the acidic sulfate solution may in the range of about 0.2 mM to about 0.3 mM, about 0.2 mM to about 0.4 mM, about 0.2 mM to about 0.5 mM, about 0.2 mM to about 0.6 mM, about 0.2 mM to about 0.7 mM, about 0.2 mM to about 0.8 mM, about 0.2 mM to about 0.9 mM, about 0.2 mM to about 1.0 mM, about 0.2 to about 1.5 mM, about 0.2 to about 2.0 mM, about 0.2 to about 2.5 mM, about 0.2 to about 3 mM, about 0.2 to about 4 mM, about 0.2 to about 5 mM, about 0.2 to about 10 mM, about 0.2 to about 20 mM, about 0.2 to about 30 mM, about 0.2 to about 40 mM, about 0.2 to about 50 mM., about 0.2 to about 60 mM., about 0.2 to about 70 mM, about 0.2 to about 80 mM, about 0.2 to about 90 mM, or about 0.2 to 100 mM.

The leaching process may be run at temperatures between 0° C. (i.e. the freezing point of water) and 80° C. However, the process would typically be carried out at ambient temperature and atmospheric pressure.

In some situations, it may be necessary or preferable to run the leach with a lixiviant comprising a halide. A halide may include chloride, bromide, or iodide. For example, it may be necessary to perform the leach with brackish water, sea water, or a brine. Accordingly, the leaching process disclosed herein may be performed with a leach solution comprising chloride at a concentration of as much as 120 g/L. The concentration of chloride in the acidic sulfate solution may in the range of about 1 g/L to about 10 g/L, about 1 g/L to about 20 g/L, about 1 g/L to about 30 g/L, about 1 g/L to about 40 g/L, about 1 g/L to about 50 g/L, about 1 g/L to about 60 g/L, about 1 g/L to about 700 g/L, about 1 g/L to about 80 g/L, about 1 g/L to about 120 g/L, about 1 g/L to about 90 g/L, about 1 g/L to about 100 g/L, about 1 g/L to about 110 g/L, or about 1 g/L to about 120 g/L. In specific embodiments, the concentration of chloride in the acidic sulfate solution is in the range of about 20 g/L to about 120 g/L, 20 g/L to about 80 g/L, or 20 g/L to about 50 g/L.

Alternatively, the leaching process disclosed herein may be performed with a leach solution comprising bromide at a concentration of as much as 30 g/L. The concentration of bromide in the acidic sulfate solution may in the range of about 1 g/L to about 10 g/L, about 1 g/L to about 20 g/L, or about 1 g/L to about 30 g/L. In specific embodiments, the concentration of chloride in the acidic sulfate solution is in the range of about 10 g/L to about 30 g/L.

Alternatively, the leaching process disclosed herein may be performed with a leach solution comprising iodide at a concentration of as much as 300 ppm. The concentration of chloride in the acidic sulfate solution may in the range of about 1 g/L to about 10 ppm, about 1 ppm to about 20 ppm, about 1 ppm to about 30 ppm, about 1 ppm to about 40 ppm, about 1 ppm to about 50 ppm, about 1 ppm to about 60 ppm, about 1 ppm to about 70 ppm, about 1 ppm to about 80 ppm, about 1 ppm to about 90 ppm, about 1 ppm to about 100 ppm, about 1 ppm to about 110 ppm, about 1 ppm to about 120 ppm, about 1 ppm to about 130 ppm, about 1 ppm to about 140 ppm, about 1 ppm to about 150 ppm, about 1 ppm to about 160 ppm, about 1 ppm to about 170 ppm, about 1 ppm to about 180 ppm, about 1 ppm to about 190 ppm, about 1 ppm to about 200 ppm, about 1 ppm to about 210 ppm, about 1 ppm to about 220 ppm, about 1 ppm to about 230 ppm, about 1 ppm to about 240 ppm, about 1 ppm to about 250 ppm, about 1 ppm to about 260 ppm, about 1 ppm to about 270 ppm, about 1 ppm to about 280 ppm, about 1 ppm to about 290 ppm, or about 1 ppm to about 300 ppm. In specific embodiments, the concentration of chloride in the acidic sulfate solution is in the range of about 100 ppm to about 300 ppm.

Solvent Extraction

Following the leaching process, copper can be extracted from the leach solution. After a solid-liquid separation, i.e. drainage of the pregnant leach solution containing the copper from the heap, the pregnant solution is preferably subjected to conventional solvent extraction and electrowinning to produce pure copper cathodes according to the following overall reaction:

$$\text{SX-EW: } CuSO_4(a) + H_2O(l) \rightarrow Cu(s) + H_2SO_4(a) + \tfrac{1}{2} O_g(g)$$

Reagents having a thiocarbonyl functional group in the pregnant leach solution should not present any problem in the electrowinning operation and, as a matter of fact, may even be useful as a leveling agent. Raffinate containing Tu may then be recirculated to the heap for further leaching. The recirculated leach solution may also be supplemented with Tu to arrive at the desired initial Tu concentration for the leach.

PLS recovered from heap leaching will contain iron and copper ions. It is known that reagents comprising thiocarbonyl functional can form various stable complexes with copper ions (Doona and Stanbury, Inorg Chem 35:3210-3216; Mironov and Tsvelodub, J Solution Chem 25:315-325; Bowmaker et al.,Inorg Chem 48:350-368). Extractants commonly used for copper solvent extraction (SX), such as hydroxyoximes and aldoximes, are strong complexing agents for copper ions. The solvent extractants can change the equilibrium between copper ions and thiocarbonyl ligands, releasing the thiocarbonyl ligands from the copper complexes. As the free thiocarbonyl ligands enter the raffinate solution, they can be returned to the heap and continue to catalyze the leaching.

Accordingly, PLS recovered from the leach through solid-liquid separation is then mixed with an organic solvent containing a base metal ion extractant to form a mixture. The skilled person will be able to select an appropriate solvent depending on the metal ion to be extracted. The organic solvent may be an aliphatic solvent, an aromatic solvent, or a combination thereof. The organic solvent may include kerosene, alkyl aromatics, cyclo-paraffins, or a combination thereof.

The skilled person will also be able to select an appropriate extractant. The base metal ion extractant may be an aldoxime, a ketoxime, or a combination thereof. The base metal ion extractant may further include an ester modifier, analkylphenol modifier, or a combination thereof.

During the solvent extraction, base metal cations are decomplexed from the reagent, thus liberating the reagent, and allowing the base metal cations to be extracted from the PLS into the organic solvent. The free reagent remains in the aqueous phase. Separation of the organic solvent from the aqueous phase results in a base metal ion-depleted raffinate comprising the free reagent, and a base metal ion-enriched organic phase comprising the organic solvent and base metal ions.

The base metal ion-enriched solution can then be processed to recover the base metal. The raffinate on the other hand, can be recirculated for use in the lixiviant.

The retention of the free reagent in the aqueous phase during solvent extraction to produce the raffinate comprising the free reagent can be accomplished with halides, e.g. chloride, bromide, or iodide, present in the PLS at concentrations as discussed above.

As discussed above, the skilled person will understand that an equilibrium exists between Tu and FDS, such that the proportion of FDS and TU-Cu complexes to Tu in the PLS is higher than that in the lixiviant. Since Tu has a stronger effect on enhancing leaching of base metals from the sulfide ores/concentrates than FDS or the TU-Cu complex, increasing the proportion of free Tu in the raffinate prior to recirculation to the leach, e.g. by decomplexing Tu from the base metal ions in the PLS or by adding a reducing agent to bias the equilibrium in favor of Tu, may enhance the leaching process.

Figure 5:
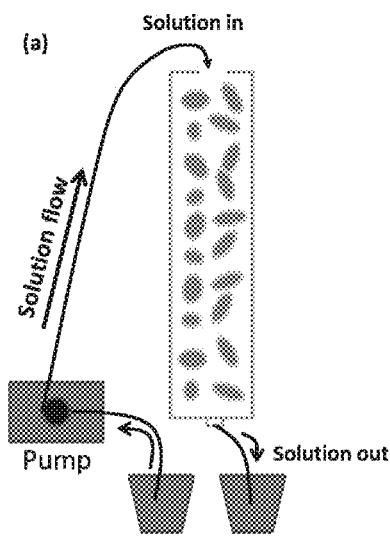
FIG. 5 is a schematic diagram for the leaching column used in respect of the leaching experiments pertaining to FIGS. 4, 5, and 6.

Referring to FIG. 5, a method for recovering a base metal from a base metal sulfide is shown at 500. The method begins by contacting material comprising at least one base metal sulfide, e.g. ore or concentrate, with a lixiviant. The lixiviant comprises an acidic sulfate solution and a reagent having a thiocarbonyl function group as described above to extract base metal ions from the at least one base metal sulfide to produce a pregnant leach solution (PLS) comprising reagent and base metal ions. A portion of the reagent is complexed with base metal ions. The leach may take place in a reactor (i.e. a reaction vessel), or in a heap that does not involve a reactor.

Figure 6:
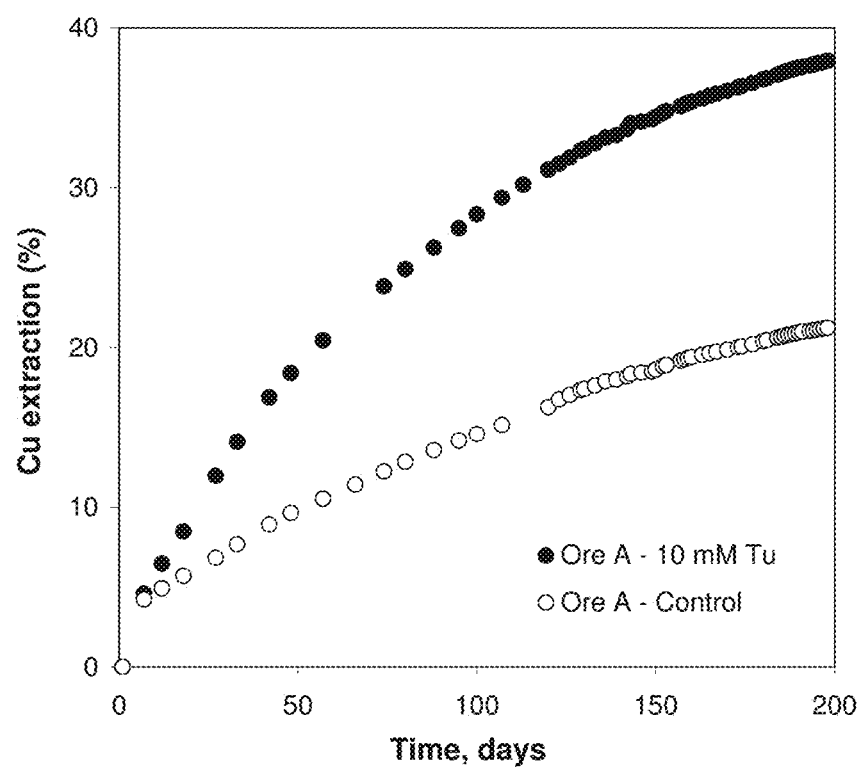
FIG. 6 is a graph showing the effect of thiourea concentration on the leaching of copper from Ore A in column leach experiments.

Referring to FIG. 6, in particular embodiments in which the reagent is Tu, the raffinate is blended with a reducing agent prior to returning the raffinate to the leach in order to bias the equilibrium between FDS and Tu from FDS to Tu. The skilled person will be able to select an appropriate reducing agent. For example, the reducing agent may be $H_2S$, NaSH, or Zinc. The reducing agent may be added to obtain a ratio of Tu:FDS in the range of about 0.5:1 to about 9:1.

EXAMPLES

To facilitate the extraction of metal ions from the minerals listed above, reagents having a thiocarbonyl functional group were added to acidic ferric sulfate solutions as catalysts. In the experiments disclosed herein, it was found that the reagents that contain thiocarbonyl functional groups have positive catalytic effect on the extraction of the minerals. Among all the reagents, Tu consistently provided the highest catalytic performance. Accordingly, Tu was the most heavily studied reagent of those identified. However, the results of experiments with other reagents having thiocarbonyl functional groups are provided to compare their catalytic effects. FDS, which does not contain a thiocarbonyl functional group but has comparable catalytic effect as Tu, was studied as a special case due to its equilibrium with Tu. Leaching reactions were carried out at atmospheric pressure on a variety of ore compositions, reagent concentrations, ferric concentrations, and under various other conditions, as described below.

Example 1 Extraction of Copper from Chalcopyrite Using Thiourea

Example 1.1

The effect of Tu on the electrochemical behavior of a chalcopyrite electrode was studied in a conventional 3-electrode glass-jacketed cell. A $CuFeS_2$ electrode was using as working electrode, a saturated calomel electrode (SCE) was used as reference, and a graphite bar was used as counter-electrode. The $CuFeS_2$ electrode was polished using 600 and 1200 grit carbide paper. All experiments were conducted at 25° C. using a controlled temperature water bath. The electrolyte composition was 500 mM $H_2SO_4$, 20 mM $Fe_2SO_4$ and 0-100 mM Tu. Before starting any measurement, solutions were bubbled with $N_2$ for 30 minutes to reduce the concentration of dissolved $O_2$. Open circuit potential (OCP) was recorded until changes of no more than 0.1 mV/min were observed. After a steady OCP value was observed, electrochemical impedance spectroscopy (EIS) was conducted at OCP using a 5 mV a.c. sinusoidal perturbation from 10 kHz to 10 mHz. Linear polarization resistance (LPR) tests were also conducted using a scan rate of 0.05 mV/s at ±15 mV from OCP.

Linear potential scans were conducted at electrode potentials ±15 mV from the OCP measured at each Tu concentration. All scans showed a linear behavior within the electrode potential range analyzed. An increase in the slope of the experimental plots was observed with increasing Tu concentration. The slope of these curves was used to estimate the value of the polarization resistance ($R_{ct}$) at each concentration. These values were then used to estimate the values of the dissolution current density using equation 1:

$$i_{dissol} \approx \frac{RT}{nFR_{ct}} \qquad \text{Eq. (1)}$$

Figure 3:
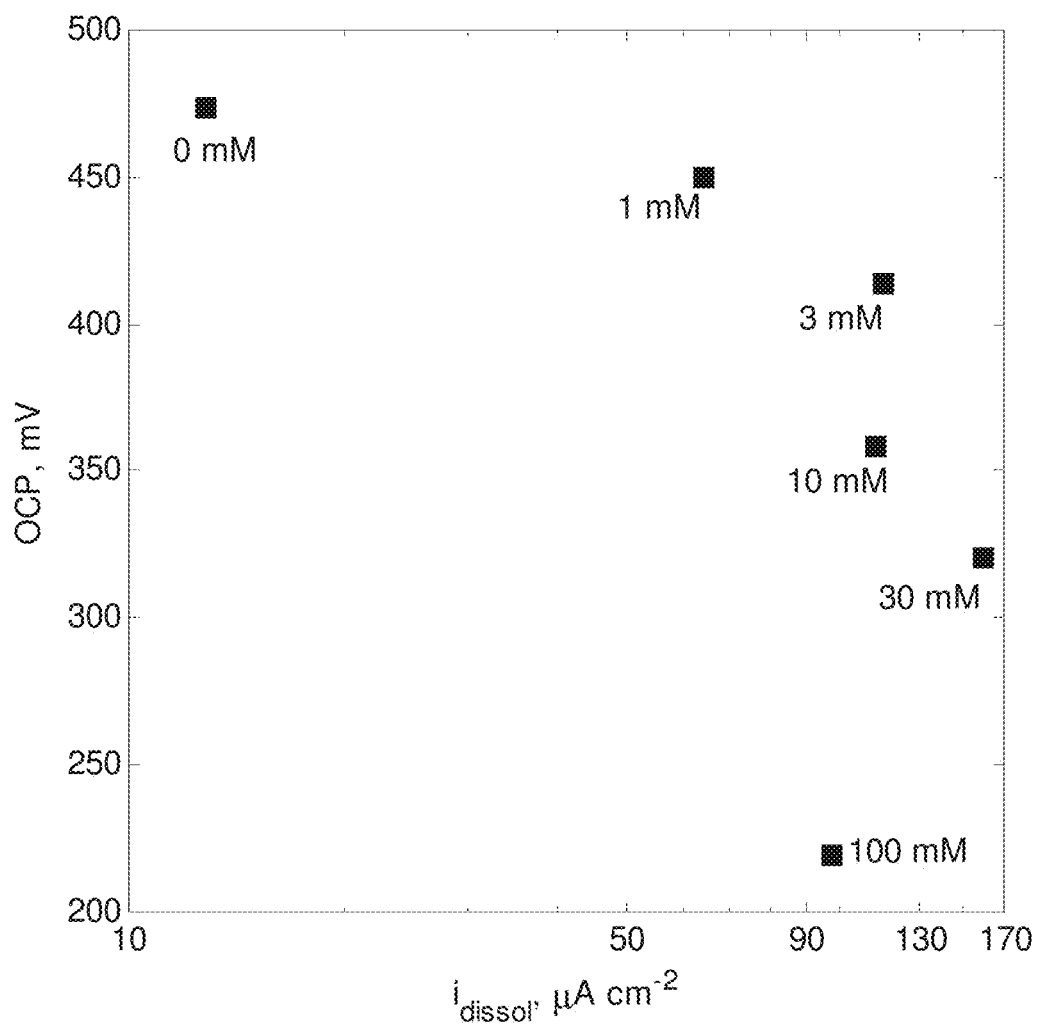
FIG. 3 is a plot showing the effect of thiourea concentration on mixed potential and dissolution current density (idissol) of the $CuFeS_2$ electrode.

FIG. 3 shows the effect of Tu on the dissolution current density and mixed potential of the $CuFeS_2$ electrode, and indicates that a maximum dissolution current density was achieved when Tu concentration is 30 mM. Increasing Tu concentration to 100 mM resulted in a decrease in the current density and mixed potential of the $CuFeS_2$ electrode. Moreover, after immersing the $CuFeS_2$ electrode in the 100 mM Tu solution, a copper-like film was observed on the surface of the electrode, which film could only be removed by polishing the electrode with carbide paper.

Example 1.2

Figure 4:
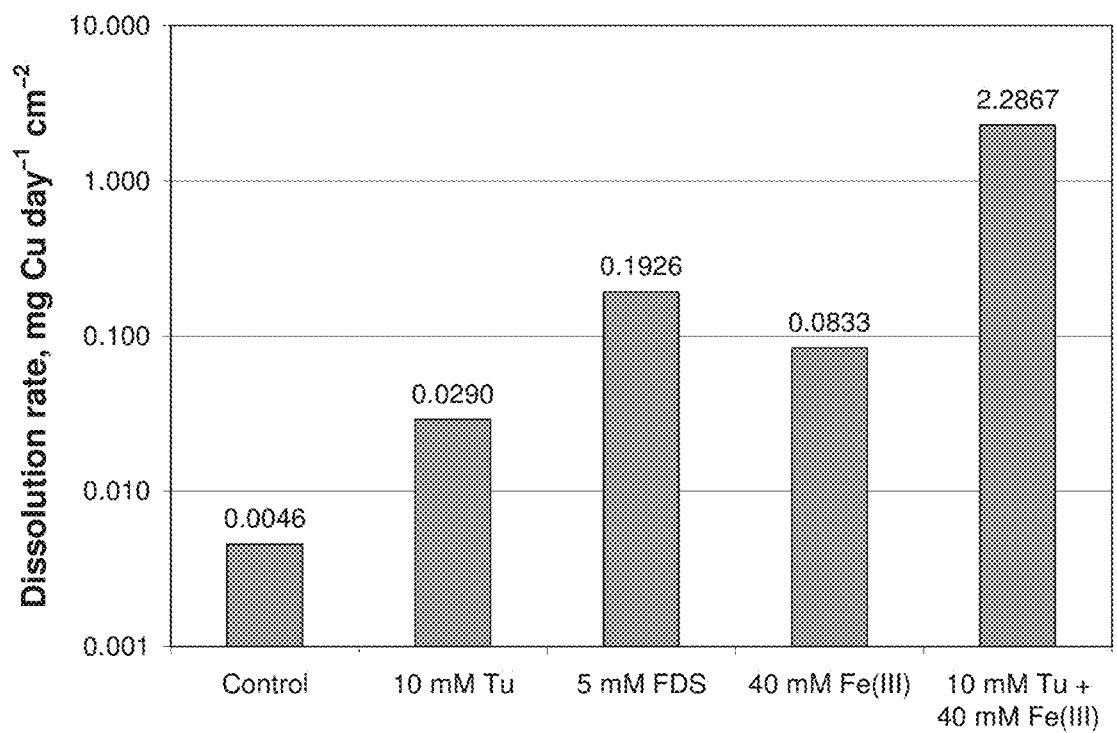
FIG. 4 is a bar graph showing electrochemical dissolution rates of a $CuFeS_2$ electrode in sulfuric acid solution at pH 2 and 25° C. with varying initial concentrations of thiourea, formamidine disulfide (FDS), and Fe(III)

FIG. 4 is a bar graph showing the effect of initial Tu or FDS concentration on the electrochemical dissolution of a chalcopyrite electrode in sulfuric acid solution at pH 2 and 25° C. A concentration of 10 mM Tu in the leach solution resulted in a six fold increase in dissolution rate compared to no Tu, and a concentration of 5 mM FDS resulted in a six fold increase relative to 10 mM Tu. A concentration of 10 mM Tu in leach solution also containing 40 mM Fe(III) resulted in a thirty fold increase in dissolution rate compared to 40 mM Fe(III) alone.

Example 1.3

A column leach of different acid-cured copper ores was conducted with Tu added to the leach solution. A schematic description of the column setup is shown in FIG. 5. The column diameter was 8.84 cm, the column height was 21.6 cm, and the column stack height was 15.9 cm. The irrigation rate was 0.77 mL/min or 8 L/m$^2$/h. The pregnant leach solution emitted from these columns was sampled for copper every 2 or 3 days using Atomic Absorption Spectroscopy (AAS).

The specific mineralogical composition of these ores are provided in Table 1. The Cu contents of Ore A, Ore B, and Ore C were 0.52%, 1.03%, and 1.22% w/w, respectively. Prior to leaching, ore was "acid cured" to neutralize the acid-consuming material present in the ore. That is, the ore was mixed with a concentrated sulfuric acid solution composed of 80% concentrated sulfuric acid and 20% de-ionized water and allowed to sit for 72 hours. For one treatment using Ore C, Tu was added to the sulfuric acid curing solutions.

The initial composition of the leaching solutions included 2.2 g/L Fe (i.e. 40 mM, provided as ferric sulfate) and pH 2 for the control experiment, with or without 0.76 g/L Tu (i.e. 10 mM). The initial load of mineral in each column was 1.6 to 1.8 kg of ore. The superficial velocity of solution through the ore column was 7.4 L m$^{-2}$ h$^{-1}$. The pH was adjusted using diluted sulfuric acid. These two columns were maintained in an open-loop or open cycle configuration (i.e. no solution recycle) for the entire leaching period.

Figure 7:
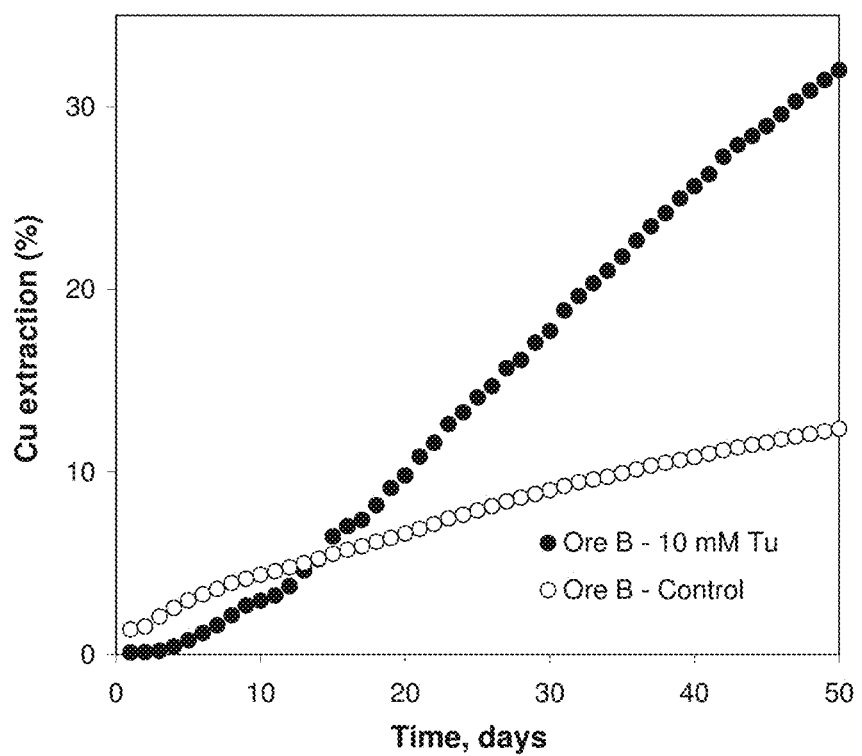
FIG. 7 is a graph showing the effect of thiourea concentration on the leaching of copper from Ore B in column leach experiments.
Figure 8:
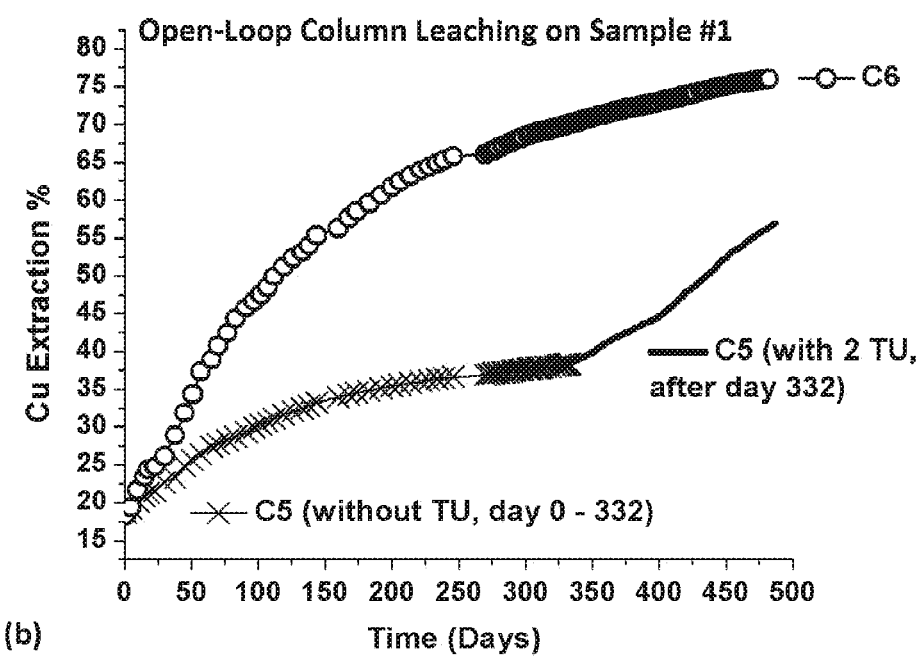
FIG. 8 is a graph showing the effect of thiourea concentration on the leaching of copper from Ore C in column leach experiments.

The results of leaching tests on the Ore A, Ore B and Ore C are shown in FIGS. 6, 7, and 8, respectively. The presence of Tu in the lixiviant clearly has a positive effect on the leaching of copper from the chalcopyrite. On average, the leaching rate in the presence of Tu was increased by a factor of 1.5 to 2.4 compared to the control tests in which the leach solutions did not contain Tu. As of the last time points depicted in FIGS. 6 to 8, copper extractions for columns containing Ore A, Ore B, and Ore C leached with a solution containing sulfuric acid and ferric sulfate alone, without added Tu, were 21.2% (after 198 days), 12.4% (after 50 days), and 40.6% (after 322 days), respectively. With 10 mM of added Tu, these extractions were 37.9%, 32.0%, and 72.3%, respectively.

Referring to FIG. 8, 2 mM Tu was added to the leach solution originally containing no Tu from day 322 onward, after which the leach rate increased sharply. From day 332 to day 448, the copper leached from this column increased from 40% to 58%, and rapid leaching was maintained throughout that period.

Figure 9:
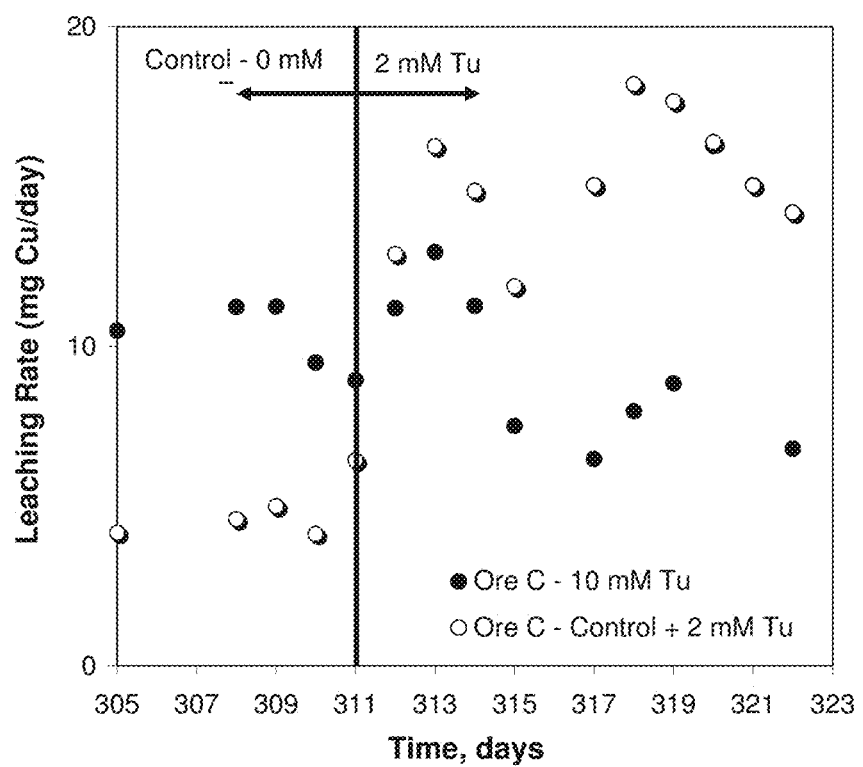
FIG. 9 is a graph showing the effect of thiourea concentration on the leaching rate of copper from Ore C in column leach experiments.

The averages for the last 7 days reported in FIG. 9 indicate that the leaching rate for acid-cured Ore C leached in the presence of 10 mM Tu is 3.3 times higher than for acid-cured Ore C leached in the absence of Tu, and 4.0 times higher than acid-cured and Tu-cured Ore C leached in the absence of Tu.

Figure 10:
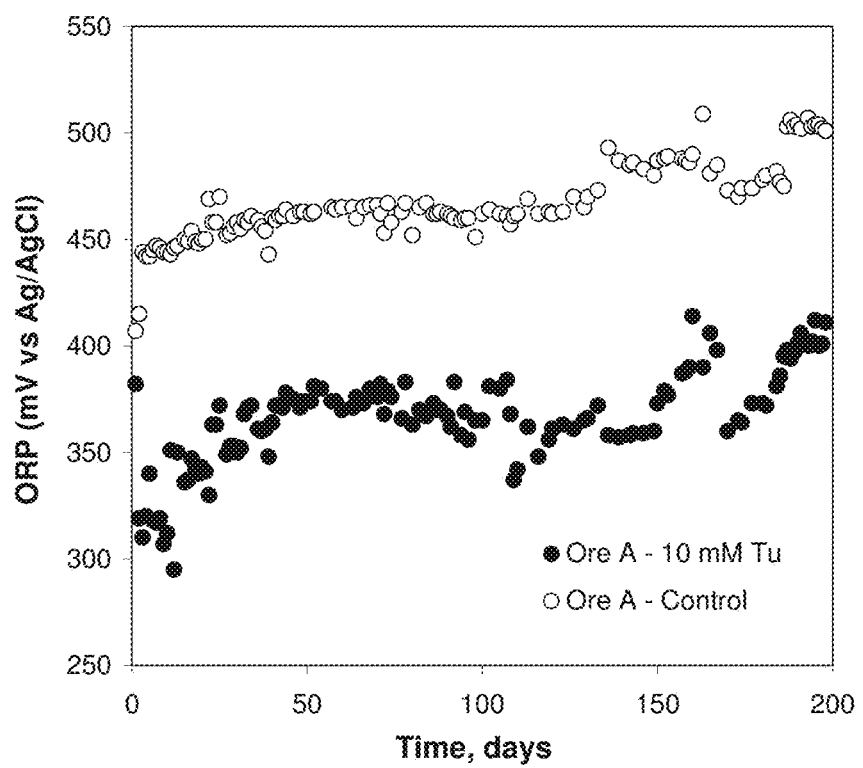
FIG. 10 is a graph showing the effect of thiourea concentration on ORP over time.

FIG. 10 shows the effect of Tu on solution potential. All potentials are reported against a Ag/AgCl (saturated) reference electrode. The solution potential of the leach solutions containing Tu was generally between 75 and 100 mV lower than the solution potential of leach solution that did not include Tu. Lower solution potentials are consistent with Tu working to prevent the passivation of chalcopyrite.

Example 1.4 Bottle Roll Leaching

"Bottle roll" leaching experiments in the presence of various concentrations of Tu were conducted for coarse Ore A and Ore B. The tests were conducted using coarsely crushed (100% passing ½ inch) ore.

Prior to leaching, the ore was cured using a procedure similar to what was performed on the ore used in the column leaching experiments. The ore was mixed with a concentrated sulfuric acid solution composed of 80% concentrated sulfuric acid and 20% de-ionized water and allowed to settle for 72 hours to neutralize the acid-consuming material present in the ore. For several experiments, different concentrations of Tu were added to the ore using the sulfuric acid curing solutions.

The bottles used for the experiments were 20 cm long and 12.5 cm in diameter. Each bottle was loaded with 180 g of cured ore and 420 g of leaching solution, filling up to around one third of the bottle's volume.

The leaching solution from each bottle was sampled at 2, 4, 6 and 8 hours, and then every 24 hours thereafter. Samples were analyzed using atomic absorption spectroscopy (AAS) for their copper content.

The conditions for the bottle roll experiments are listed in Table 2. Experiments #1 to #6 were conducted using only the original addition of Tu into the bottles. For experiments #7 to #11, Tu was added every 24 hours to re-establish the Tu concentration.

A positive effect of Tu on copper leaching was observed. For the coarse ore experiments, a plateau was not observed until after 80 to 120 hours. Tu was added periodically to the coarse ore experiments, yielding positive results on copper dissolution.

Figure 11:
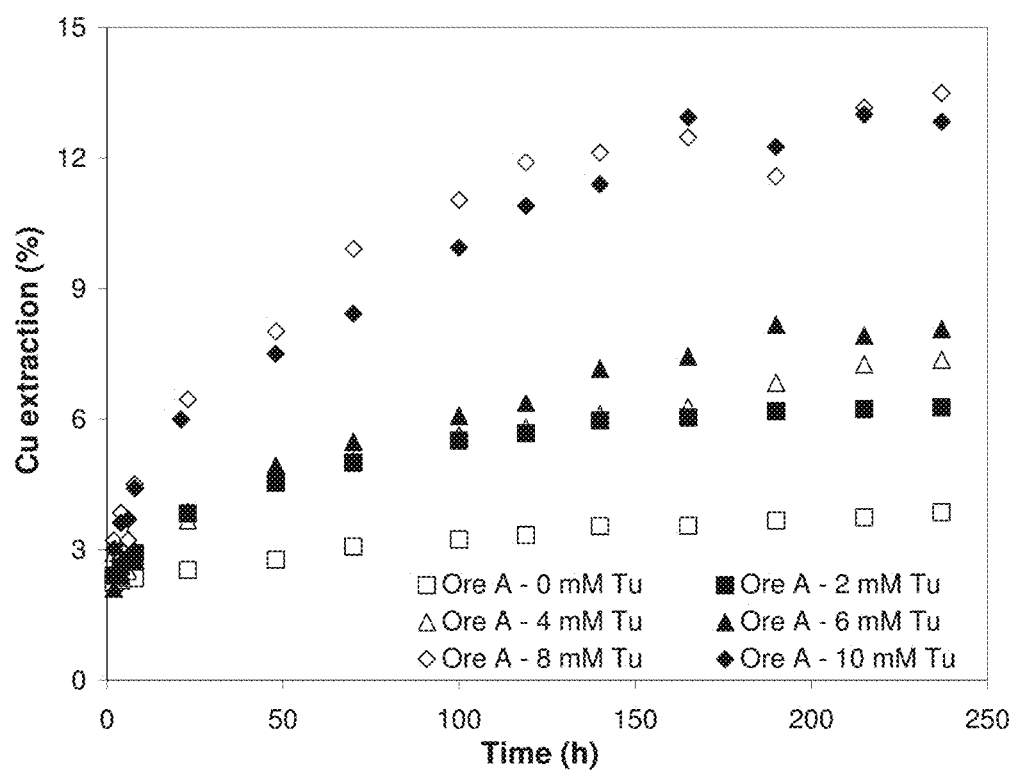
FIG. 11 is a graph showing the effect of thiourea concentration on copper dissolution for coarse Ore A in bottle roll experiments.

The effect of different concentrations of Tu in the leach solution on the leaching of coarse ore (experiments #1 to #11 as described in Table 2) is shown in FIGS. 11 and 10.

For ore B, Tu was periodically added every 24 hours to re-establish the thiouruea concentration in the system and thus better emulate the conditions in the column leach experiments. As may be observed from FIG. 9, 8 mM and 10 mM Tu yielded higher copper dissolution results than the other Tu concentrations tested for ore A. A plateau in dissolution is not observed until after approximately 120 hours, which varied with Tu concentration as shown in FIG. 11.

TABLE 1

| Mineral | Ideal Formula | Ore A | Ore B | Ore C |
|---|---|---|---|---|
| Actinolite | $Ca_2(Mg,Fe^{2+})_5Si_8O_{22}(OH)_2$ | — | 1.8 | — |
| Biotite | $K(Mg,Fe^{2+})_3AlSi_3O_{10}(OH)_2$ | — | 4.2 | — |
| Calcite | $CaCO_3$ | — | 19.3 | — |
| Chalcopyrite | $CuFeS_2$ | 1.4 | 3.5 | 2.6 |
| Clinochlore | $(Mg,Fe^{2+})_5Al(Si_3Al)O_{10}(OH)_8$ | — | 15.0 | — |
| Diopside | $CaMgSi_2O_6$ | — | 3.5 | — |
| Galena | $PbS$ | — | — | 0.1 |
| Gypsum | $CaSO_4 2H_2O$ | — | 1.2 | — |
| Hematite | $\alpha\text{-}Fe_2O_3$ | — | 0.2 | — |
| K-feldspar | $KAlSi_3O_8$ | 17.9 | 10.8 | — |
| Kaolinite | $Al_2Si_2O_5(OH)_4$ | 2.3 | — | 2.3 |
| Magnetite | $Fe_3O_4$ | — | 0.8 | — |
| Molybdenite | $MoS_2$ | <0.1 | — | — |

TABLE 1-continued

| Mineral | Ideal Formula | Ore A | Ore B | Ore C |
|---|---|---|---|---|
| Muscovite | $KAl_2AlSi_3O_{10}(OH)_2$ | 21.9 | 6.0 | 41.6 |
| Plagioclase | $NaAlSi_3O_8$—$CaAlSi_2O_8$ | 13.6 | 25.4 | — |
| Pyrite | $FeS_2$ | 2.3 | — | 8.0 |
| Quartz | $SiO_2$ | 40.0 | 8.3 | 44.4 |
| Rutile | $TiO_2$ | 0.5 | — | 0.9 |
| Siderite | $Fe^{2+}CO_3$ | — | 0.1 | — |
| Total | | 100 | 100 | 100 |

Figure 12:
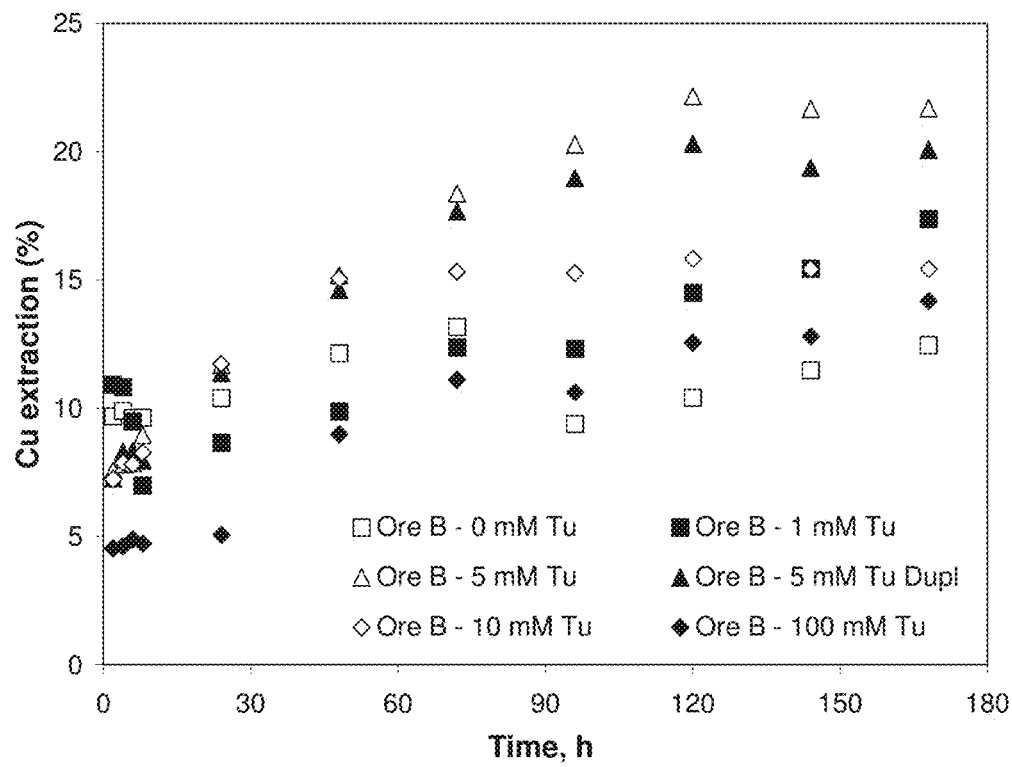
FIG. 12 is a graph showing the effect of thiourea concentration on copper dissolution for coarse Ore B in bottle roll experiments.

As may be observed from FIG. 12, 5 mM Tu yielded higher copper dissolution results than the other Tu concentrations tested for ore B. As with ore A, a plateau in dissolution is not observed until after approximately 80 to 120 hours, which varied with Tu concentration as shown in FIG. 12. Periodic addition of Tu resulted in increased copper dissolutions and produced a delay in the dissolution plateau.

Interestingly, solutions containing 100 mM Tu did not appear to be much more effective on copper extraction than those containing no Tu, and even worse at some time points. This is consistent with the results of Deschênes and Ghali, which reported that solutions containing ~ 200 mM Tu (i.e. 15 g/L) did not improve copper extraction from chalcopyrite. Tu is less stable at high concentrations and decomposes. Accordingly, it is possible that, when initial Tu concentrations are somewhat higher than 30 mM, sufficient elemental sulfur may be produced by decomposition of Tu to form a film on the chalcopyrite mineral and thereby assist in its passivation. It is also possible that, at high Tu dosages, some copper precipitates from solution (e.g. see FIG. 17) to account for some of the low extraction results.

Example 2 Extraction from Chalcopyrite, Covellite, Chalcocite, Bornite, Enargite, Pentlandite, Violarite, and Greenockite Using Thiourea The catalytic effect of Tu was further demonstrated in stirred reactor tests. All reactors contained 1.9 L of ferric sulfate solution at pH 1.8 and total iron concentration of 40 mM. 1 g of mineral samples was used in each reactor test. These experimental conditions were designed to maintain an unlimited supply of oxidant.

In order to demonstrate the catalytic effect on chalcopyrite, 100% pure synthetic chalcopyrite was used instead of chalcopyrite concentrate which contains various impurities. The chalcopyrite was synthesized via a hydrothermal approach. CuCl, $FeCl_3$ and Tu were first mixed with a molar ratio of 1:1:2 and dissolved in 150 mL DI water. The solution was transferred to a Teflon-lined reaction vessel and heated up to 240° C. for 24 hours. At the end of the reaction, the precipitated powder was washed with acidic water (pH=1) and dried in air at room temperature. XRD analysis in showed that the synthetic chalcopyrite was free of any impurities compared with chalcopyrite mineral concentrate. This synthetic chalcopyrite was used in all the tests carried out in stirred reactors as disclosed herein.

TABLE 2

List of bottle roll leaching experiments involving Ore A and Ore B.

| Experiment | Brief description of experimental conditions |
|---|---|
| #1 | Coarse ore A, 0 mM Tu in solution, 40 mM ferric in solution, acid curing, no Tu replenishment |

TABLE 2-continued

List of bottle roll leaching experiments involving Ore A and Ore B.

| Experiment | Brief description of experimental conditions |
|---|---|
| #2 | Coarse ore A, 2 mM Tu in solution, 40 mM ferric in solution, acid curing, no Tu replenishment |
| #3 | Coarse ore A, 4 mM Tu in solution, 40 mM ferric in solution, acid curing, no Tu replenishment |
| #4 | Coarse ore A, 6 mM Tu in solution, 40 mM ferric in solution, acid curing, no Tu replenishment |
| #5 | Coarse ore A, 8 mM Tu in solution, 40 mM ferric in solution, acid curing, no Tu replenishment |
| #6 | Coarse ore A, 10 mM Tu in solution, 40 mM ferric in solution, acid curing, no Tu replenishment |
| #7 | Coarse ore B, 0 mM Tu in solution, 40 mM ferric in solution, acid curing |
| #8 | Coarse ore B, 1 mM Tu in solution, 40 mM ferric in solution, acid curing, periodic addition of Tu to replenish 1 mM concentration in solution |
| #9 | Coarse ore B, 5 mM Tu in solution, 40 mM ferric in solution, acid curing, periodic addition of Tu to replenish 5 mM concentration in solution |
| #10 | Coarse ore B, 10 mM Tu in solution, 40 mM ferric in solution, acid curing, periodic addition of Tu to replenish 10 mM concentration in solution |
| #11 | Coarse ore B, 100 mM Tu in solution, 40 mM ferric in solution, acid curing, periodic addition of Tu to replenish 100 mM concentration in solution |

The covellite mineral used in the experiment disclosed herein was also synthesized via a hydrothermal approach. CuCl and Tu were mixed with a molar ratio of 1:1 and dissolved in 150 mL DI water. The solution was transferred to a Teflon-lined reaction vessel and heated up to 220° C. for 24 hours. The synthesized CuS was acid-washed and dried in air. XRD analysis showed that it had 100% purity with no interference of other species.

The chalcocite mineral sample used in the experiments disclosed herein was 100% pure natural mineral.

The bornite mineral used in the experiments disclosed herein was obtained from Butte, Montana with copper content of 58.9% based on ICP-AES. XRD analysis showed that the mineral contains 76.8% bornite, 8.1% chalcopyrite, 6.3% pyrite, 5.8% tennatite and 3.0% enargite. The copper content calculated from XRD was 55.6%, which is relatively consistent with the chemical assay.

The enargite mineral used in the experiments disclosed herein was in the form of an enargite concentrate, which contained approximately 70% enargite (34% copper) according to XRD analysis.

The Greenockite mineral used in this experiment was synthesized via a hydrothermal approach. $CdCl_2$ and Tu were mixed with a molar ratio of 1:1 and dissolved in 100 mL DI water. The solution was transferred to a Teflon-lined reaction vessel and heated up to 150° C. for 24 hours. The synthesized CdS was acid-washed and dried in air. XRD analysis showed that it has 100% purity with no interference of other species.

The violarite used in the experiments disclosed herein was natural violarite mineral that contains 15.8% Ni according to ICP-AES. XRD analysis showed that the mineral had approximately 42% violarite and 13.1% $NiSO_4 \cdot 6H_2O$.

Figure 13:
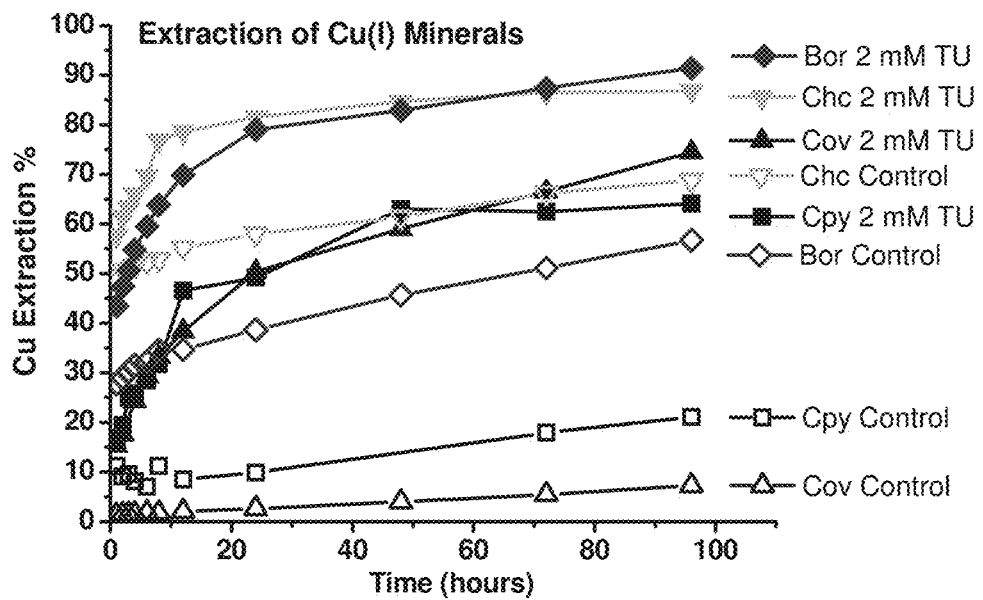
FIG. 13 is a graph showing the effect of Tu addition on various minerals that contain Cu(I). Diamonds pertain to bornite, triangles refer to covellite, inverted triangles pertain to chalcocite, and squares pertain to chalcopyrite. Open symbols refer to control treatments without Tu, whereas solid symbols refer to minerals treated solutions having an initial Tu concentration of 2 mM.

The sulfur on thiocarbonyl groups contains a lone electron pair and a filled x-orbital which can be used for donor-acceptor type bonding with a transition metal, together with a π*-antibonding orbital that could potentially accept the back-donation of electrons from the filled d-orbitals on the transition metal. Accordingly, without wanting to be bound by theory, it is suspected that the interaction between the surface ion and the thiocarbonyl functional group, especially back donation from metal to ligand, is responsible for the catalytic effect. Moreover, it is suspected that the catalytic effect should be more pronounced for the transition metals with higher d-electron numbers, with the catalytic effect being most pronounced for minerals with $d^{10}$ electronic configuration FIG. 13 shows that Tu catalyzes the leaching of common copper sulfide minerals, including chalcopyrite, covellite, chalcocite, and bornite, which all contain Cu(I). After 96 hours of leaching, chalcopyrite extraction reaches 64.1% with 2 mM of Tu compared to 21.1% without Tu; covellite extraction reaches 74.4% with 2 mM of Tu compared to 7.2% without Tu; chalcocite extraction reaches 85.6% with 2 mM of Tu compared to 65.1% without Tu; bornite extraction reaches 91.4% with 2 mM of Tu compared to 56.7% without Tu.

Figure 14:
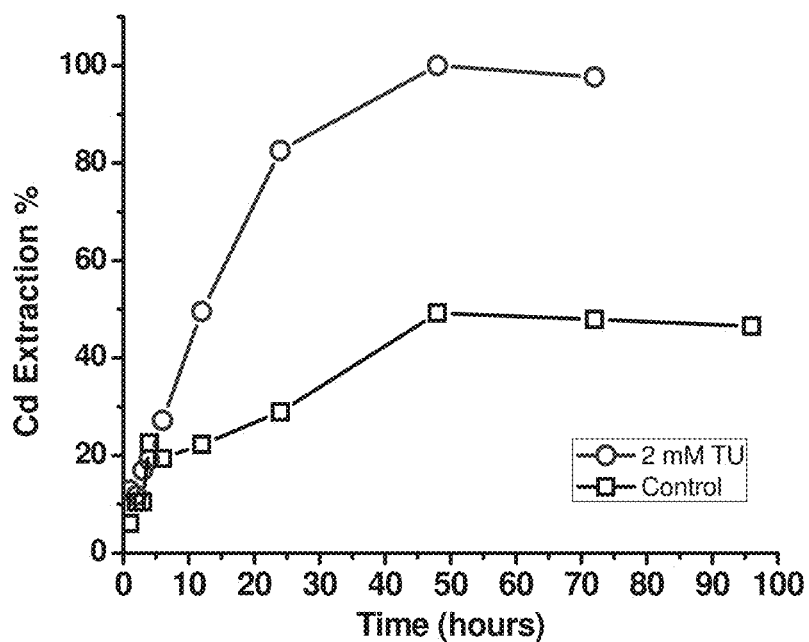
FIG. 14 is a graph showing the effect of Tu on cadmium extraction from greenockite.

Like Cu(I), Cd(II) also contains the $d^{10}$ electronic configuration. FIG. 14 shows that leaching of CdS mineral is significantly enhanced with the addition of Tu. With Tu, the extraction of cadmium reaches 100% at 48 hours whereas extraction in the noncatalyzed reaction plateaued at 47% after 96 hours.

Figure 15:
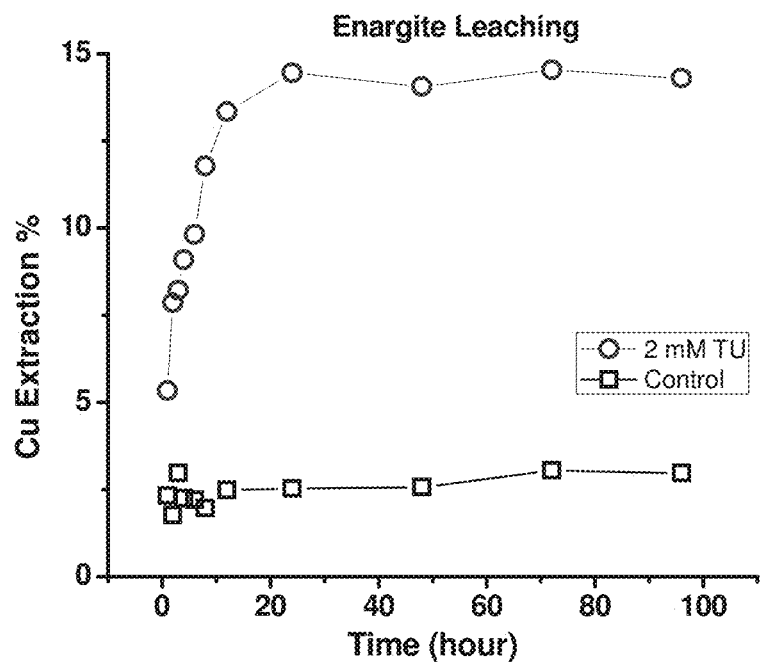
FIG. 15 is a graph showing the effect of Tu on copper extraction from enargite.

The copper ion in the enargite mineral has fewer d-electrons than other primary and secondary sulfides, and thus it may be expected that the catalytic effect should be slower than that for Cu(I) minerals. Nevertheless, the results shown in FIG. 15 clearly demonstrate that leaching with a leach solution comprising an initial concentration of 2 mM Tu increases the leach rate of copper from enargite compared to a control without Tu, which did not show any significant extraction after 96 hours of leaching.

Figure 16:
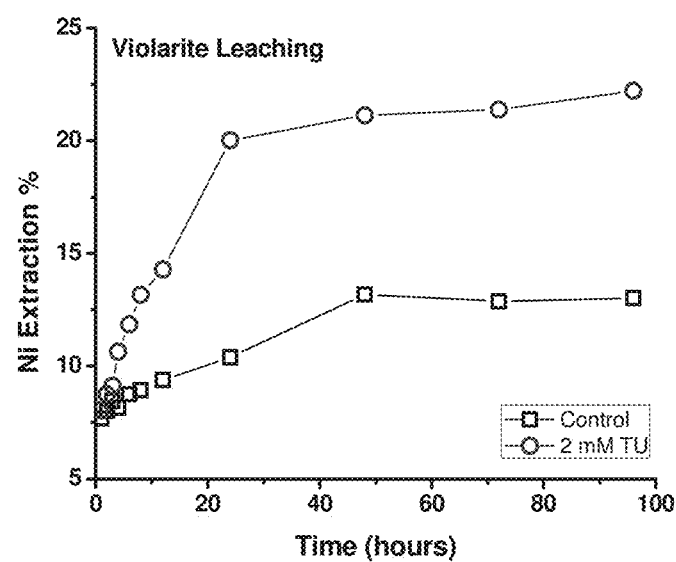
FIG. 16 is a graph showing the effect of Tu on nickel extraction from violarite.

Minerals that contain transition metal ions with $d^7$ electronic configuration, such as Ni(III), may also undergo catalyzed leaching with the addition of Tu. Similar to Cu(II), as Ni(III) is the highest stable oxidation state with 7 d-electrons, the catalytic effect is not expected to be as dramatic as for $d^{10}$ minerals. Referring to FIG. 16, leaching with a leach solution comprising an initial concentration of 2 mM Tu increases the leach rate of nickel from violarite compared to a control without Tu.

Results of leaching experiments referred to in Example 2 are summarized in Table 3, in which the extraction percentages under non-catalyzed and catalyzed conditions (with an initial Tu concentration of 2 mM) are compared.

TABLE 3

Comparisons of reactor leaching for various minerals under uncatalyzed and 2 mM Tu catalyzed conditions

| Mineral | 96-Hour Extraction (No Tu) | 96-Hour Extraction (2 mM Tu) |
| --- | --- | --- |
| Chalcopyrite, $CuFeS_2$ | 21.1% | 64.1% |
| Covellite, CuS | 6.8% | 74.4% |
| Chalcocite, $Cu_2S$ | 65.1% | 85.5% |
| Bornite, $Cu_5FeS_4$ | 56.7% | 91.4% |
| Greenokite, CdS | 46.5% | 100.0% |
| Enargite, $Cu_3AsS_4$ | 2.1% | 10.0% |
| Violarite, $FeNi_2S_4$ | 13.0% | 22.2% |

Example 3 Reagent Dosage

Figure 17:
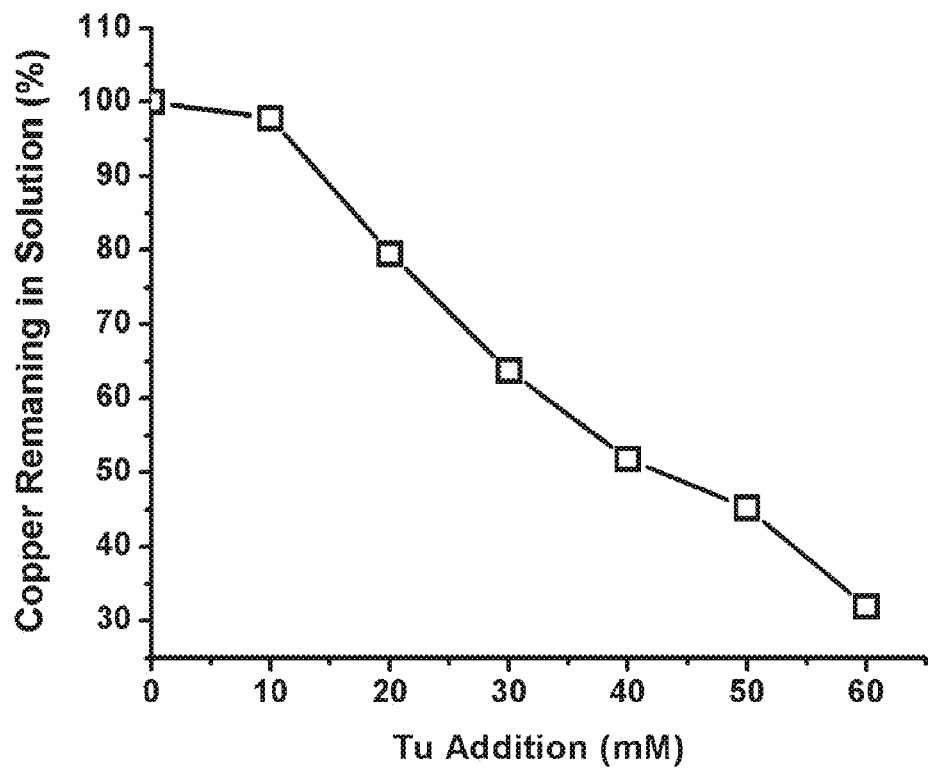
FIG. 17 is a graph showing the percentage of Cu ions remaining in solution after various amounts of Tu addition.

Optimum dosage of reagent may increase the efficiency of leaching. First, at certain concentrations, the reagent may form an insoluble complex with the metal ion of interest and precipitate. For example, Tu can form an insoluble complex with Cu(I) ions at a 3:1 molar ratio. A precipitation test was performed to examine the concentration range at which Cu-Tu complex precipitation may occur. 20 mL of Cu solution was divided into several identical portions followed by the addition of various Tu dosage (i.e. 0 to 60 mM). The solution was stirred for 24 hours, and the Cu remaining in the solution phase was analyzed by AAS. The results are shown in FIG. 17, plotted as the percentage of Cu remaining.

Second, heap leaching of metal sulfides is based on a bioleaching mechanism, an excessive amount of reagent may be detrimental to bioleaching microbes. For example, bacteria commonly used for bioleaching, such as *Acidithiobacillus ferrooxidans* and *Acidithiobacillus thiooxidans*, have very slow growth in a solution containing 10 mM Tu, and cannot survive at 100 mM Tu.

Third, with respect to Tu specifically, ferric reacts with Tu and converts it to FDS (see *Hydrometallurgy* 28, 381-397 (1992)). Although the reaction is reversible under certain conditions, a high concentration of FDS tends to decompose irreversibly into cyanamide and elemental sulfur (see *J Chromatogr* 368, 444-449).

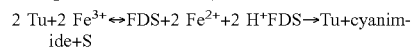

Therefore, over-addition of Tu in the lixiviant may cause the loss of $Fe^{3+}$ and Tu due to oxidation and decomposition. The irreversible decomposition of FDS has been observed when adding 4 mM of Tu into a 40 mM ferric sulfate solution at pH 1.8.

To further investigate the effect of Tu dosage on copper extraction, stirred reactor tests were performed using 1 g of synthetic chalcopyrite in 1.9 L of 40 mM ferric sulfate solution at pH 1.8 with various initial Tu concentrations. The treatments were run for 172 hours to approach maximum extraction. The results are presented in FIGS. 18A and 18B, and shows that, for 1 g of chalcopyrite, higher Tu dosage results in faster leaching kinetics among the Tu concentrations tested.

Figure 18A:
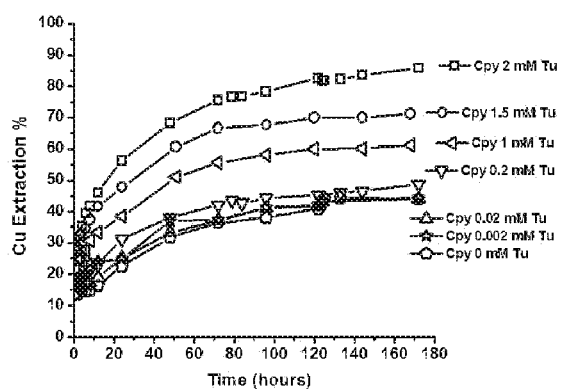
FIGS. 18A and 18B are graphs showing extraction of Cu from chalcopyrite under various Tu dosages.
Figure 18B:
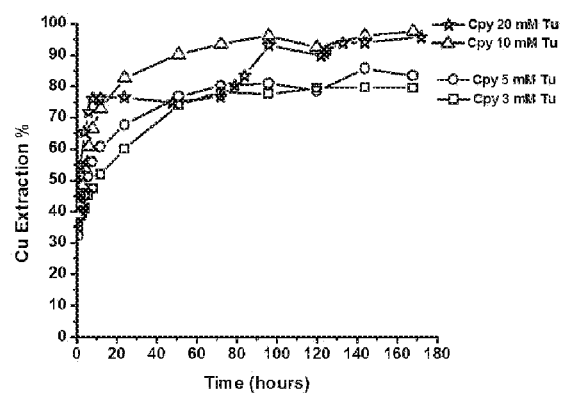

For Tu dosages of 5 mM and under, the initial 40 mM ferric sulfate solution can be considered as a sufficient supply of oxidant. However, for higher dosages such as 10 mM and 20 mM of Tu, extra ferric (in 1:1 ratio with Tu) had to be added to the solution to allow the oxidation of Tu to FDS. For 10 mM Tu, an extra 10 mM of $Fe^{3+}$ was added at time zero. For 20 mM Tu, an extra 20 mM of $Fe^{3+}$ was added at 72 hours, which led to the continuation of extraction as shown in FIGS. 18A and 18B.

Figure 19:
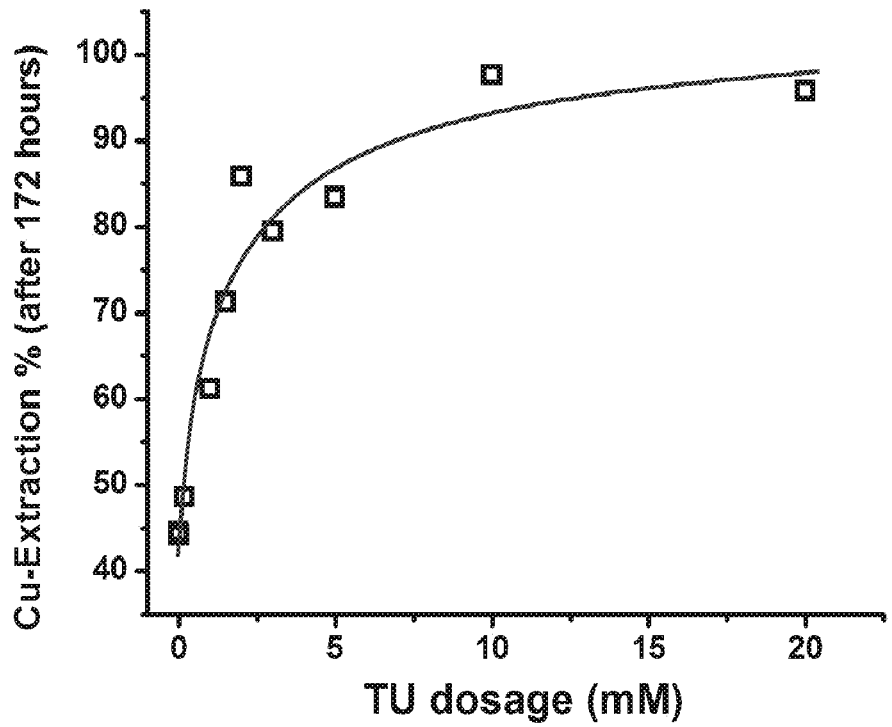
FIG. 19 is a graph showing the relationship between Tu dosage and Cu extraction after 172 hours.
Figure 20:
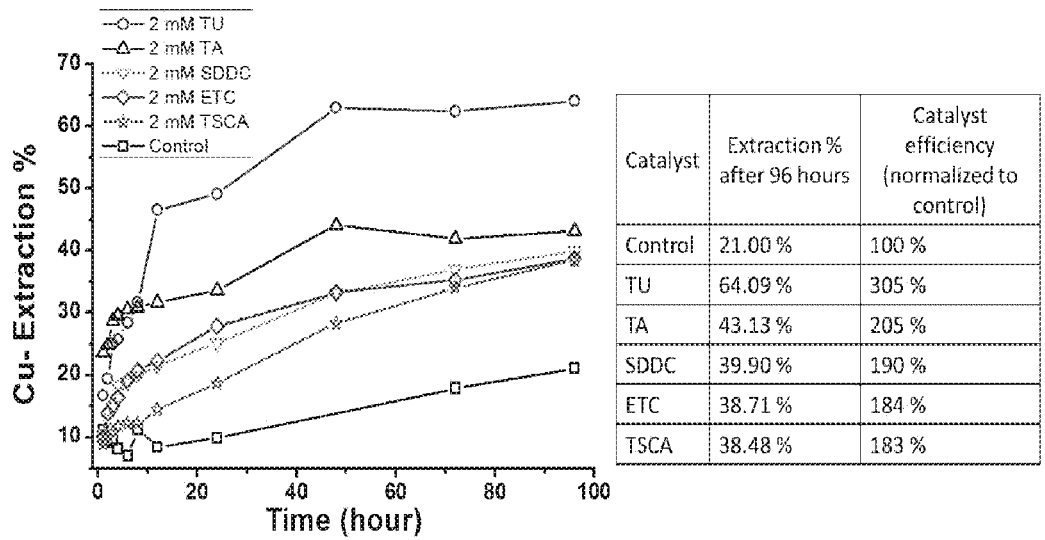
FIG. 20 is a graph showing leaching of copper from chalcopyrite in stirred reactor tests using reagents comprising thiocarbonyl functional groups. Circles pertain to Tu, triangles pertain to TA, inverted triangles pertain to SDDC, diamonds pertain to ETC, stars pertain to TSCA, and squares pertain to controls.
Figure 21:
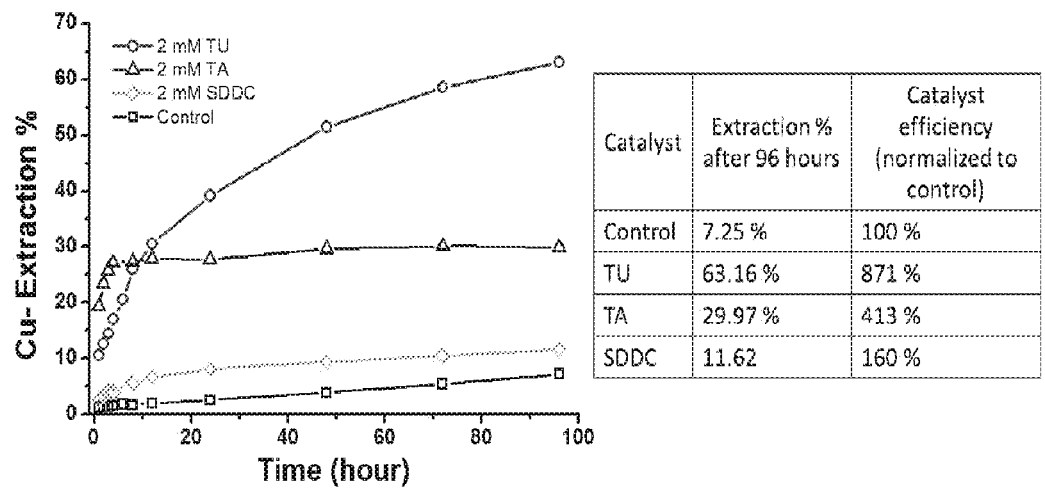
FIG. 21 is a graph showing leaching of copper from covellite in stirred reactor tests using reagents comprising thiocarbonyl functional groups. Circles pertain to Tu, triangles pertain to TA, diamonds pertain to SDDC, and squares pertain to controls.
Figure 22:
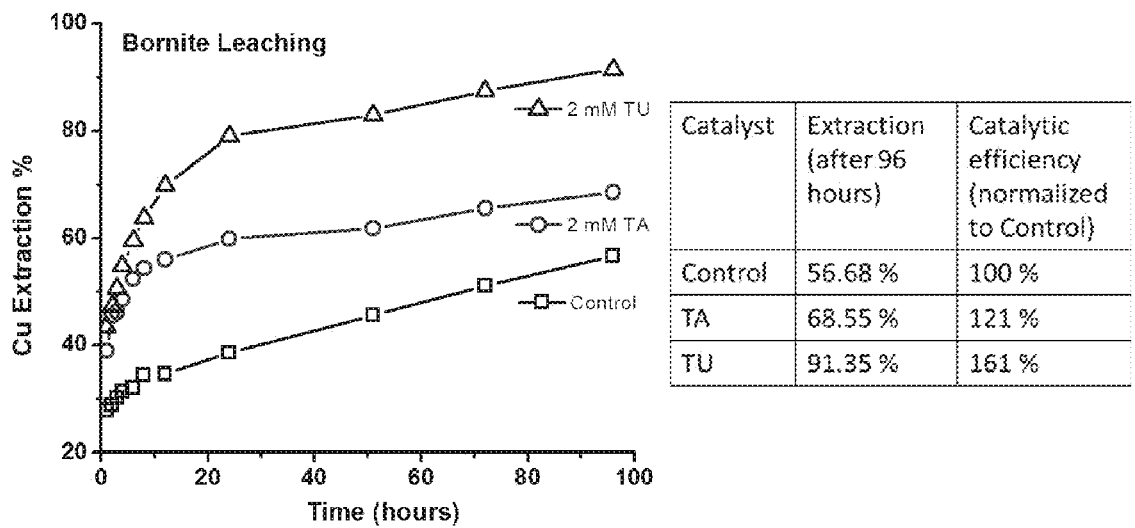
FIG. 22 is a graph showing leaching of copper from bornite in stirred reactor tests using reagents comprising thiocarbonyl functional groups. Triangles pertain to Tu, circles pertain to TA, and squares pertain to controls.
Figure 23:
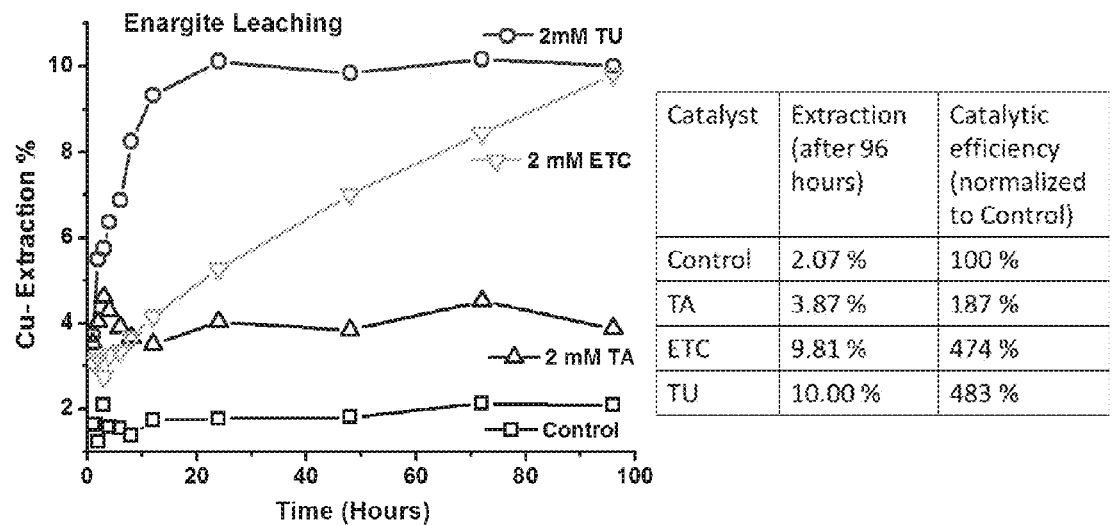
FIG. 23 is a graph showing leaching of copper from enargite in stirred reactor tests using reagents comprising thiocarbonyl functional groups. Circles pertain to Tu, triangles pertain to TA, inverted triangles pertain to ETC, and squares pertain to controls.

The Tu dosage vs. Cu extraction at 172 hours is plotted in FIG. 19. An initial Tu dosage up to 5 mM appears to have the most pronounced effect on the dissolution of Cu.

As indicated above, in previous shakeflask tests with acidic solutions (pH 1.8) containing various concentrations of $Fe^{3+}$ and $Cu^{2+}$ ions, slight precipitation occurred upon the addition of 4 mM of Tu due to the decomposition of FDS. Accordingly, concentrations of Tu concentration below 4 mM may avoid such precipitation. A series of shakeflask tests were performed on solutions containing initial concentrations of 2 mM Tu and various concentrations in a matrix containing $Fe^{3+}$ (0-100 mM) and $Cu^{2+}$ (0-50 mM) in order to identify concentration ranges of $[Fe^{3+}]$ and $[Cu^{2+}]$ that do not result in Cu complex precipitation. The results showed that no precipitation and no loss of Cu from the solution phase resulted using 2 mM of Tu in this wide range of Fe and Cu matrix concentrations.

Example 4 Alternative Reagents

The catalytic effect of several other reagents having a thiocarbonyl functional group was examined on the leaching of synthetic chalcopyrite, covellite, bornite, and enargite. Experiments were carried out in stirred reactors containing 40 mM ferric sulfate solution at pH 1.8. 1 g of chalcopyrite or covellite was added to the reactors along with an initial concentration of 2 mM of various thiocarbonyl reagents including Tu, TA, SDDC, ETC and TSCA. The Cu extraction curves for chalcopyrite, covellite, bornite, and enargite using all or a subset of the above reagents are shown in FIGS. 20, 21, 22, and 23.

From FIGS. 20 to 23, it is clear that each of these further reagents that have a thiocarbonyl functional group show a beneficial effect in the ferric sulfate leaching of each of chalcopyrite, covellite, bornite and enargite.

Figure 24:
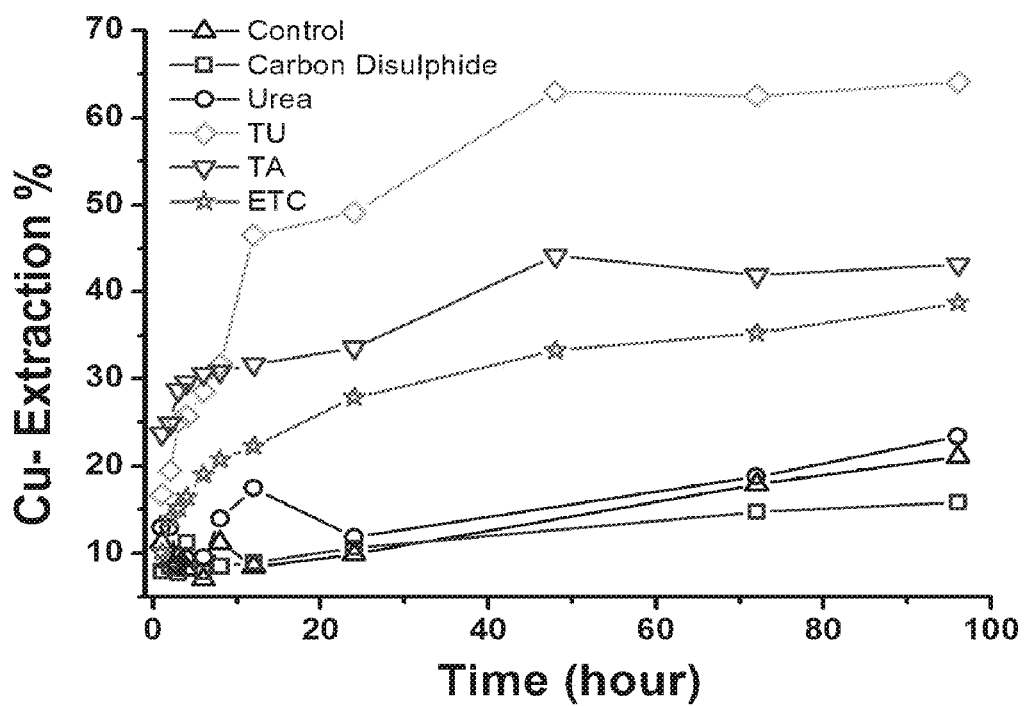
FIG. 24 is a graph showing the leaching of copper from chalcopyrite in stirred reactor tests using reagents comprising thiocarbonyl functional groups, urea, and carbon disulfide. Circles pertain to urea, triangles pertain to controls, inverted triangles pertain to TA, diamonds pertain to Tu, stars pertain to ETC, and squares pertain to carbon disulfide.

FIG. 24 summarizes the results of further stirred reactor tests on chalcopyrite that additionally investigate urea and carbon disulfide. These results confirm that, as expected, neither urea nor carbon disulfide are effective reagents.

Example 5 FDS

The catalytic effect of leaching solutions prepared with FDS on chalcopyrite, bornite, covellite, and chalcocite leaching was determined in stirred reactor tests. All reactors contained 1.9 L of ferric sulfate solution at pH 1.8 and total iron concentration of 40 mM. 1 g of mineral samples was used in each reactor test. An initial FDS concentration of 1 mM or an initial Tu concentration of 2 mM Tu was used.

Figure 25A:
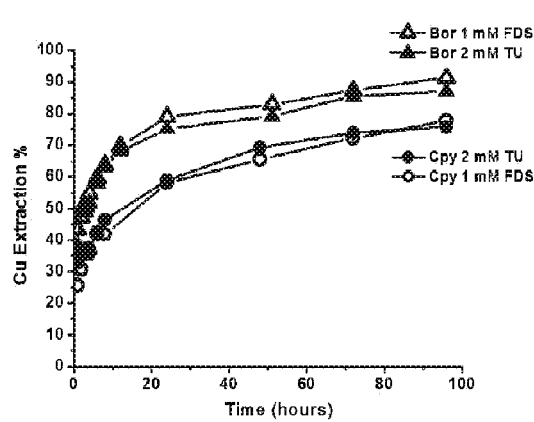
FIG. 25A is a graph comparing the leaching of copper from chalcopyrite (circles) or bornite (triangles) using leaching solutions with either an initial concentration of 2 mM Tu (solid symbols) or an initial concentration of 1 mM FDS (open symbols)
Figure 25B:
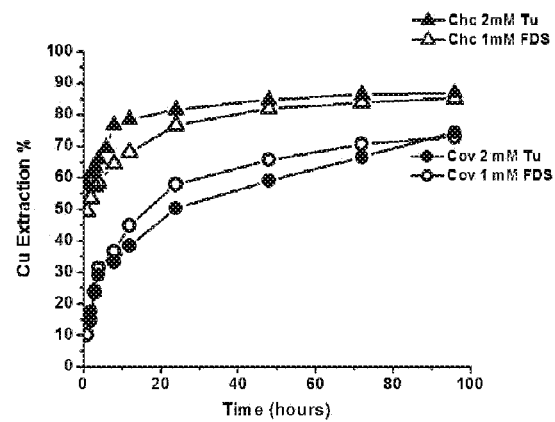
FIG. 25B is a graph comparing the leaching of copper from covellite (circles) or chalcocite (triangles) using leaching solutions with either an initial concentration of 2 mM Tu (solid symbols) or an initial concentration of 1 mM FDS (open symbols)

The results from stirred reactor tests shown in FIGS. 25A and 25B demonstrate that FDS has comparable efficiency to Tu in the leaching of each of chalcopyrite, bornite, covellite, and chalcocite after 96 hours.

Example 6 Stepwise Closed Loop Bioleaching with Tu

A closed loop bioleach with Tu was conducted. 7 kg of ore contain approximately 0.25% Cu content, mainly in the form of $CuFeS_2$ was leached at a flow rate of 1 L/day at an aeration rate of approximately 300 mL/min.

The ore was pre-treated with sulfuric acid to leach oxides (e.g. chalcanthite and basic copper salts) using sulfuric acid. After the acid leaching period finished, residual solutions were collected and replaced by a ferrous sulfate solution with nutrients (40 mM $FeSO_4$, 0.4 g/L magnesium sulfate heptahydrate and 0.04 g/L potassium dihydrogen phosphate, with pH adjusted to 1.6-1.8). The ferrous and nutrients solution was flushed through the column to establish a good habitat for bacterial growth. Inoculation of bacteria showed an increase in the ORP from 274 mV to 550 mV within 48 hours. The solution used in this step and future steps was kept circulating through the column, forming a self-sustaining closed-loop system.

At this stage, the remaining copper source is mainly $CuFeS_2$. After the bacteria had survived in the column, Tu was progressively added to the leaching solution. As discussed above Tu is converted to FDS at a molar ratio of 2:1 in the presence of 40 mM $Fe^{3+}$. Operating potential (ORP) was used as the indicator for bacterial activity, and HPLC was used to monitor FDS content. From day 0 to day 50, the leaching solution included 40 mM $Fe^{3+}$ with inoculated bacteria (with no Tu addition). From day 90 to day 98, a total of 1.878 g of Tu was progressively added, upon which the HPLC analysis on the effluent showed that the FDS was being maintained at approximately 1.5 mM, and no more Tu was added.

Figure 26:
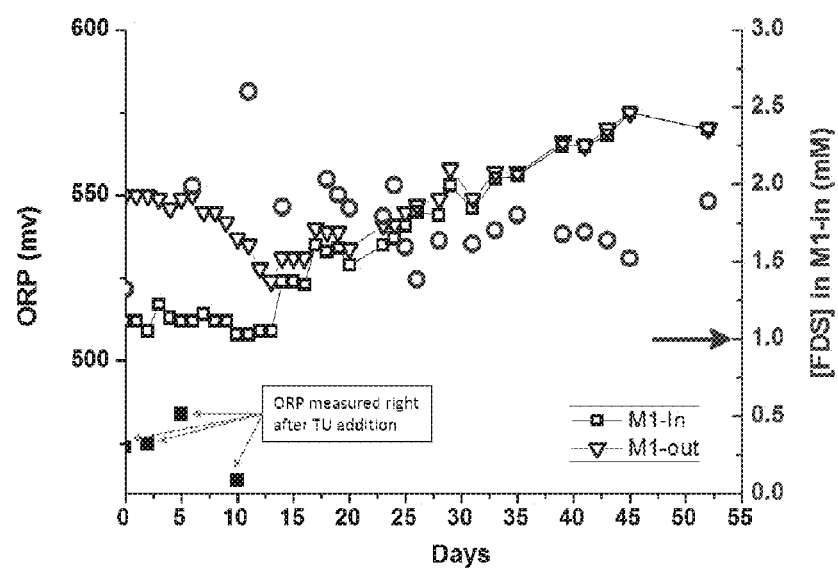
FIG. 26 is a graph monitoring bacterial activity and FDS content with ORP and HPLC.

As shown in FIG. 26, the ORP of the effluent was always equal to or higher than the influent, indicating that bacteria were actively oxidizing $Fe^{2+}$ to $Fe^{3+}$. The FDS contents were analyzed by HPLC, showing that approximately 1.5 mM of FDS (equivalent to 3 mM of Tu added) existing in the solution phase without any precipitation being observed. Therefore, it appears that 1.5 mM FDS (3 mM Tu equivalent) may be used in the solution without precipitation of ferric.

Figure 27:
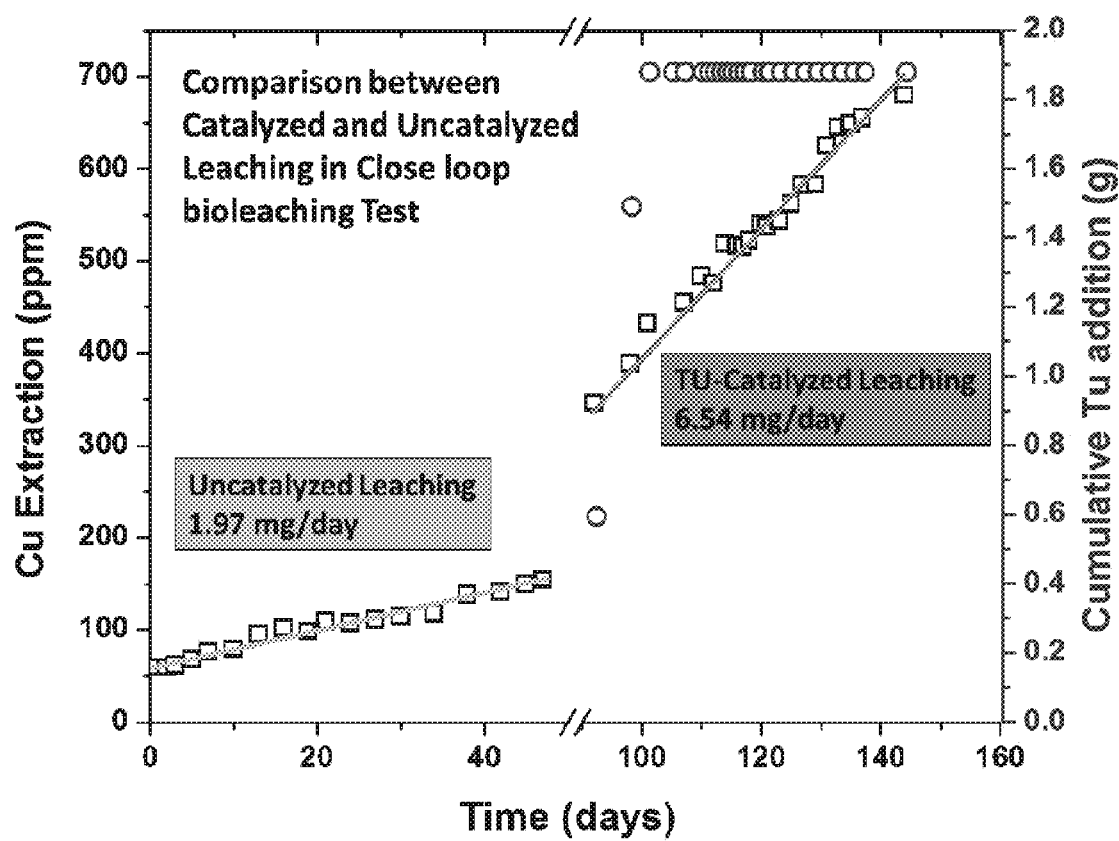
FIG. 27 is a graph showing the bioleaching of $CuFeS_2$ using only $Fe^{3+}$ (day 0-50) and using $Fe^{3+}$+Tu (day 90-150) in closed loop experiments.

The results of closed loop leaching test are shown in FIG. 27. From day 0 to day 50, bacteria were able to maintain high activity and oxidize $Fe^{2+}$ to $Fe^{3+}$. However, with the constant flow rate (1 L/day), the leaching rate was only 1.97 mg Cu/day for the first 50 days. Addition of Tu starting on day 90 increased the Cu extraction rate to 6.54 mg/day, which remained constant after day 98. This indicates that the reagent did not undergo decomposition and remained effective in the closed-loop system.

Example 7 Extraction from Chalcopyrite in the Presence of Chloride Using a Reagent Having a Thiocarbonyl Functional Group Example 7.1

The effect of chloride on the ability of Tu to facilitate leaching from a copper sulfide was tested in stirred reactors. Each reactor contained 1 g of 100% pure synthetic chalcopyrite in 2 L of ferric sulfate solution at pH 1.7, with a total ferric concentration of 40 mM. Experimental reactors included Tu at an initial concentration of 2 mM, and a chloride concentration of 20 g/L, 50, g/L, 80 g/L, or 120 g/L. Reactors comprising no Tu, no chloride, and no Tu or chloride were included as controls. A further reactor containing 2 mM Tu and 80 g/L chloride with 200 ppm Cu was also included. These experimental conditions were designed to maintain an unlimited supply of oxidant.

Figure 28:
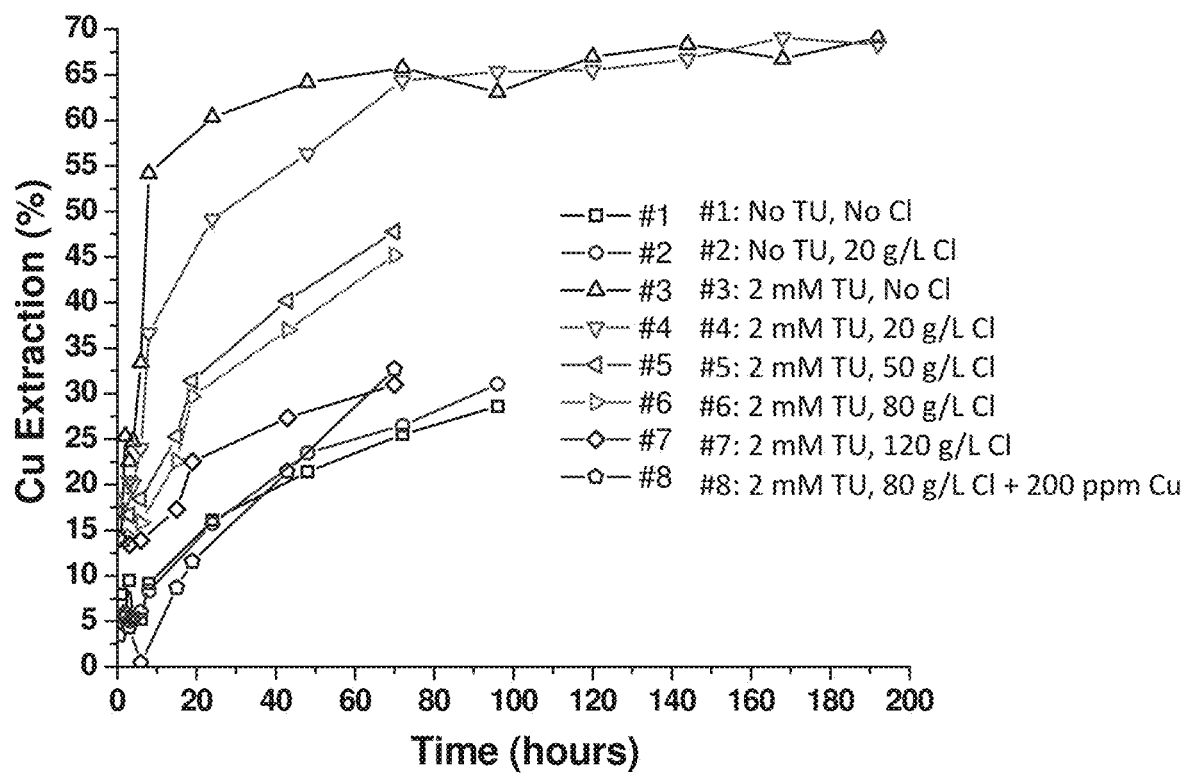
FIG. 28 is a graph showing the leaching of copper from chalcopyrite in the presence of Tu with varying concentrations of chloride.

As shown in FIG. 28, the presence of Tu has a positive effect on copper extraction from chalcopyrite in the presence chloride at a concentration as high as 120 g/L. While the amount of copper extracted decreased with increasing concentration of chloride, the extraction of copper was nevertheless higher in the presence Tu compared with the absence of Tu. For example, the extraction of copper was greater in solutions comprising Tu and 120 g/L chloride than solutions comprising no Tu and only 20 g/L.

Example 7.2

The effect of chloride on the ability of Tu or ETu to facilitate leaching from a copper sulfide was tested in stirred reactors. Each reactor contained 1 g of chalcopyrite concentrate that has 21.6% copper per litre of ferric sulfate solution at pH 1.7, with a total ferric concentration of 40 mM. Experimental reactors included Tu or ETu at an initial concentration of 0 or 2 mM, and a chloride concentration of 0 g/L, 20 g/L, 80 g/L, or 200 g/L. Solution composition is listed in Table 4.

TABLE 4

Solution composition for test of compatibility of reagents having a thiocarbonyl function group with chloride

| Solution # | [Fe] g/L | [Cl] g/L | [Tu] mM | [ETu] mM |
|---|---|---|---|---|
| 1 | 2.2 | 0 | 0 | 0 |
| 2 | 2.2 | 20 | 0 | 0 |
| 3 | 2.2 | 80 | 0 | 0 |
| 4 | 2.2 | 200 | 0 | 0 |

TABLE 4-continued

Solution composition for test of compatibility of reagents having a thiocarbonyl function group with chloride

| Solution # | [Fe] g/L | [Cl] g/L | [Tu] mM | [ETu] mM |
|---|---|---|---|---|
| 5 | 2.2 | 0 | 2 | 0 |
| 6 | 2.2 | 20 | 2 | 0 |
| 7 | 2.2 | 80 | 2 | 0 |
| 8 | 2.2 | 0 | 0 | 2 |
| 9 | 2.2 | 20 | 0 | 2 |
| 10 | 2.2 | 200 | 0 | 2 |

Figure 29A:
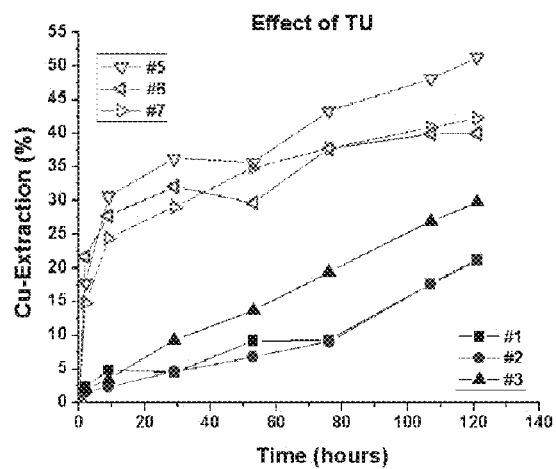
FIG. 29A is a graph showing the leaching of copper from chalcopyrite in the presence of Tu with varying concentrations of chloride.
Figure 29B:
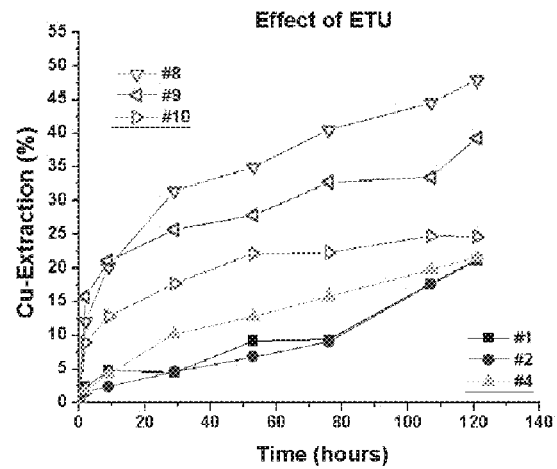
FIG. 29B is a graph showing the leaching of copper from chalcopyrite in the presence of ETu with varying concentrations of chloride.

As shown in FIGS. 29A and 29B, the presence of Tu or ETu has a positive effect on copper extraction from chalcopyrite in the presence chloride at a concentration as high as 200 g/L. While the amount of copper extracted decreased with increasing concentration of chloride, the extraction of copper was nevertheless higher in the presence of Tu compared with the absence of Tu. For example, the extraction of copper was greater in solutions comprising Tu and 120 g/L chloride than solutions comprising no Tu and only 20 g/L chloride.

Example 8 Extraction from Chalcopyrite in the Presence of Bromide Using Reagents Having a Thiocarbonyl Functional Group The effect of bromide on the ability of a reagent having a thiocarbonyl functional group to facilitate leaching from a copper sulfide was tested in stirred reactors over 180 h. Each reactor contained 1 g of chalcopyrite concentrate that has 21.6% copper per litre of ferric sulfate solution at pH 1.7, with a total ferric concentration of 40 mM. Experimental reactors included Tu or ETu at an initial concentration of 2 mM and a bromide concentration of 10 g/L or 30 g/L (supplied in the form of potassium bromide). Reactors comprising neither Tu nor ETu were included as controls. The reactors were stirred at room temperature. Solution compositions are listed in Table 5.

TABLE 5

Solution composition for test of compatibility of reagents having a thiocarbonyl function group with bromide

| Solution # | pH | [Fe] g/L | [Br] g/L | [TU] mM | [ETU] mM |
|---|---|---|---|---|---|
| 1 | 1.7 | 2.2 | 0 | 0 | 0 |
| 2 | 1.7 | 2.2 | 10 | 0 | 0 |
| 3 | 1.7 | 2.2 | 30 | 0 | 0 |
| 4 | 1.7 | 2.2 | 10 | 2 | 0 |
| 5 | 1.7 | 2.2 | 30 | 2 | 0 |
| 6 | 1.7 | 2.2 | 10 | 0 | 2 |
| 7 | 1.7 | 2.2 | 30 | 0 | 2 |

Figure 30A:
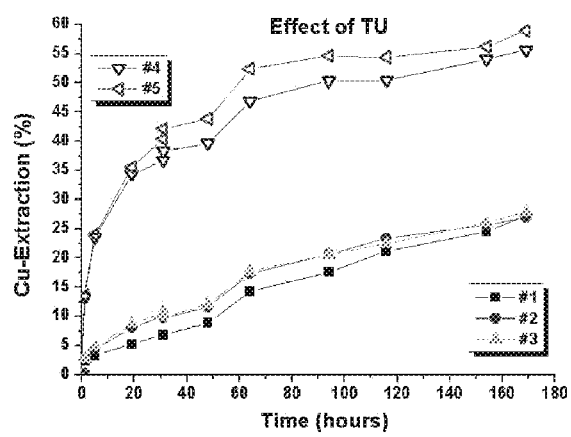
FIG. 30A is a graph showing the leaching of copper from chalcopyrite in the presence of Tu with varying concentrations of bromide.
Figure 30B:
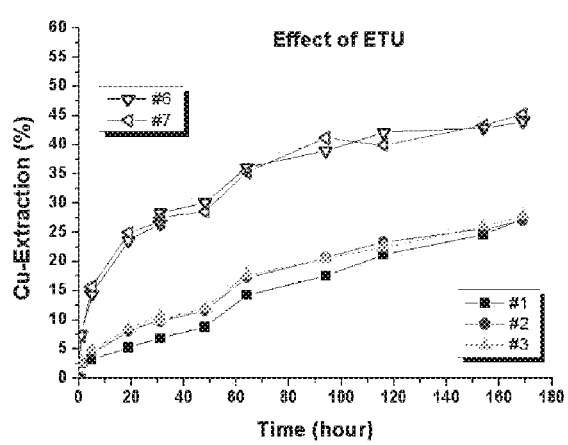
FIG. 30B is a graph showing the leaching of copper from chalcopyrite in the presence of ETu with varying concentrations of bromide.

As shown in FIGS. 30A and 30B, both Tu and ETu had a positive effect on copper extraction from chalcopyrite in the presence bromide at an initial concentration as high as 30 g/L.

Example 9 Extraction from Chalcopyrite in the Presence of Iodide Using Reagents Having a Thiocarbonyl Functional Group The ability of a reagent having a thiocarbonyl functional group to facilitate leaching from a copper sulfide in the presence of iodide was tested in stirred reactors over 180 h. Each reactor contained 1 g of chalcopyrite concentrate that has 21.6% copper per litre of ferric sulfate solution at pH 1.7, with a total ferric concentration of 40 mM. Experimental reactors included Tu or ETu at an initial concentration of 2 mM and an iodide concentration of 100 ppm or 300 ppm (supplied in the form of potassium iodide). Reactors comprising neither Tu nor ETu were included as controls. The reactors were stirred at room temperature in a sealed condition. Solution compositions are listed in Table 3.

TABLE 6

Solution composition for sealed reactor tests of compatibility of reagents having a thiocarbonyl function group with iodide

| Solution # | pH | [Fe] g/L | [I] ppm | [TU] mM | [ETU] mM |
|---|---|---|---|---|---|
| 1 | 1.7 | 2.2 | 0 | 0 | 0 |
| 2 | 1.7 | 2.2 | 100 | 0 | 0 |
| 3 | 1.7 | 2.2 | 100 | 2 | 0 |
| 4 | 1.7 | 2.2 | 100 | 0 | 2 |
| 5 | 1.7 | 2.2 | 300 | 0 | 0 |
| 6 | 1.7 | 2.2 | 300 | 2 | 0 |
| 7 | 1.7 | 2.2 | 300 | 0 | 2 |

Figure 31A:
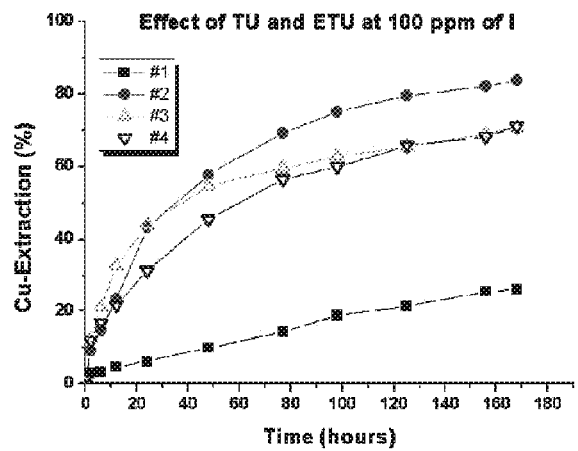
FIG. 31A is a graph showing the leaching of copper from chalcopyrite with Tu or ETu in the presence of 100 ppm of iodine in a sealed reactor.
Figure 31B:
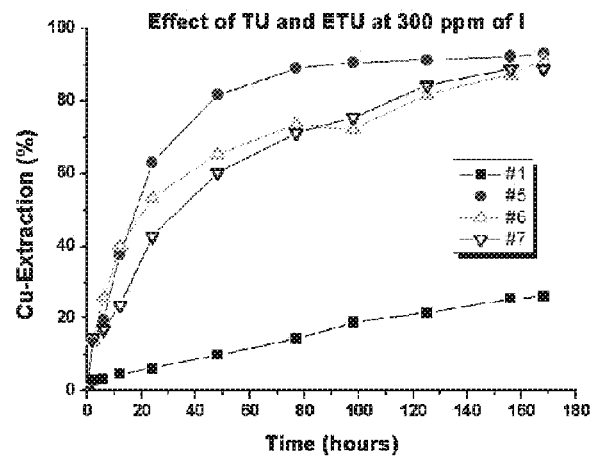
FIG. 31B is a graph showing the leaching of copper from chalcopyrite with Tu of ETu in the presence of 300 ppm iodine in a sealed reactor.

As shown in FIGS. 31A and 31B, addition of thiocarbonyl compounds (TU and ETU here as examples) to an iodide medium results in slightly slower kinetics than the pure iodide leaching in sealed reactor tests. Previous study suggests that complexation can occur between metal, iodide, and thiocarbonyl species (Bowmaker et al., Inorganic Chemistry, 48:350-368). Therefore the slower leaching kinetics are possibly due to the iodide entering those complexes and therefore not being as available for catalysis.

Given the equilibrium between iodine, iodide and triiodide

$$I_2 + I^- \leftrightarrow I_3^- \quad K_{eq} \approx 700 \text{ to } 770$$

and the fact that ferric ion can oxidize iodide to iodine by the following reaction

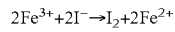
$$2Fe^{3+} + 2I^- \rightarrow I_2 + 2Fe^{2+}$$

the total iodine (in this case, iodide+iodine) can only be accurately detected by in-situ oxidation prior to ICP-AES detection. Accordingly, only conventional ICP-AES was performed, and the results were normalized.

Figure 32A:
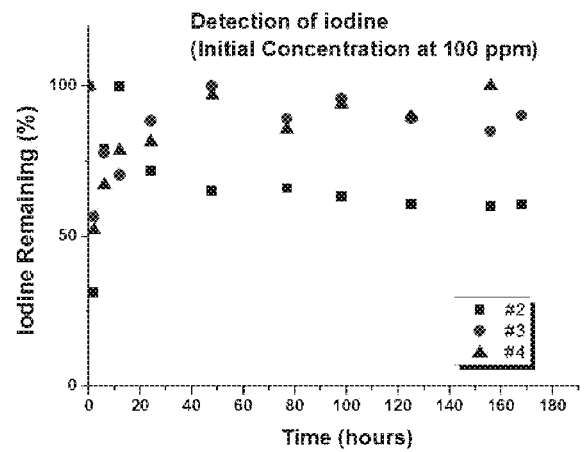
FIG. 32A is a plot showing the concentration of iodine in a sealed reactor over time in the presence or absence of Tu and ETu at 100 ppm of iodine.
Figure 32B:
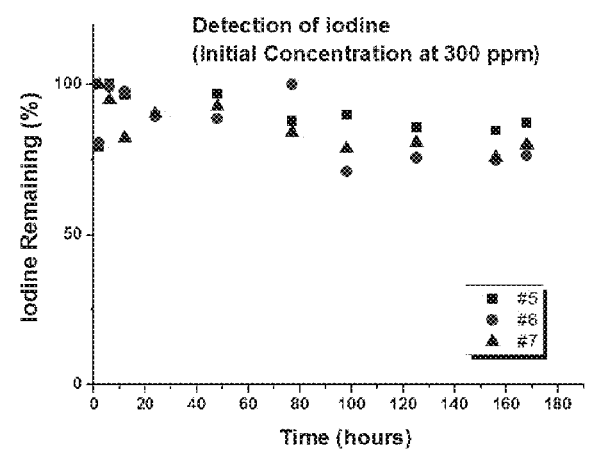
FIG. 32B is a plot showing the concentration of iodine in a sealed reactor over time in the presence of absence of TU and ETU at 300 ppm iodine.

Referring to FIGS. 32A and 32B, analysis of the solutions in the sealed reactors indicates that most of the iodide remains in solution. In a practical, open-air setting, however, iodide is expected to be oxidized to iodine by ferric, with the iodine being lost from the lixiviant due to its volatility. Accordingly, the retention of iodide in simulated open air conditions was tested in the presence or absence of a reagent having a thiocarbonyl functional group. Two parallel open-surface evaporation tests were performed to demonstrate this phenomenon. Both vessels were placed under shade with the solution surface directly exposed to the air. Solution was kept stagnant (without agitation). The residual iodide was measured over a period of 72 hours. The solution compositions are listed in Table 7.

TABLE 7

Solution composition for the effect of thiocarbonyl compound on iodine (open surface, stagnant solution)

| Solution # | pH | [Fe] g/L | [I] ppm | TU [mM] |
|---|---|---|---|---|
| 1 | 1.7 | 2.2 | 200 | 0 |
| 2 | 1.7 | 2.2 | 200 | 2 |

Figure 33:
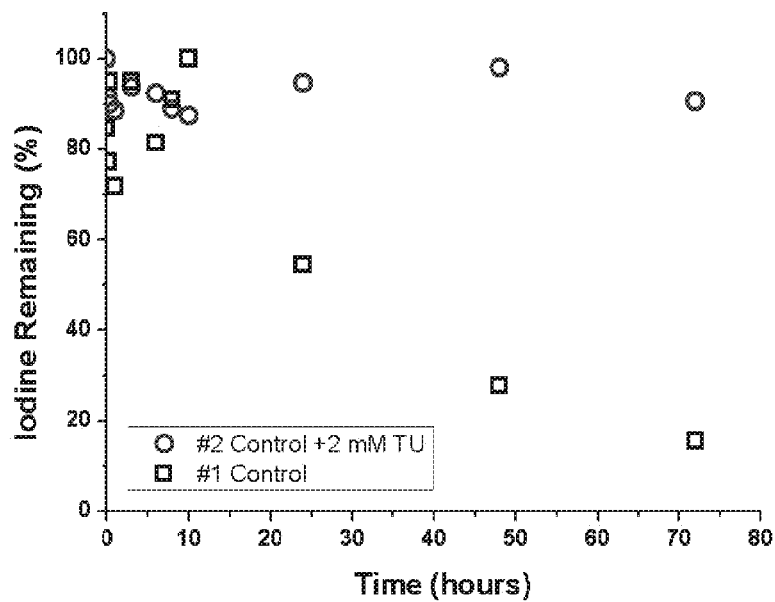
FIG. 33 is a plot showing the concentration of iodine in an open air reactor over time in the presence or absence of Tu.

Referring to FIG. 33, the results indicate that that when iodide enters acidic ferric sulfate solution, it rapidly turns into $I_2$ and evaporates from the aqueous phase. In the presence of a reagent having a thiocarbonyl functional group, i.e. Tu, the total iodide concentration remained stable over the period of the test.

Accordingly, the ability of a reagent having a thiocarbonyl functional group to facilitate leaching from a copper sulfide in the presence of iodide was tested again in stirred reactors in open air conditions over 83 h. Each 2 L reactor contained 1 g of chalcopyrite concentrate that has 21.6% copper in 1 L of ferric sulfate solution at pH 1.7, with a total ferric concentration of 40 mM. Experimental reactors included Tu or ETu at an initial concentration of 2 mM and an iodide concentration of 100 ppm or 300 ppm (supplied in the form of potassium iodide). Reactors comprising neither Tu nor ETu were included as controls. The reactors were stirred at room temperature in a sealed condition. Solution compositions are listed in Table 8.

TABLE 8

Solution composition for TU-I compatibility tests in unsealed reactors

| Solution # | pH | [Fe] g/L | [I] ppm | [TU] mM | [ETU] mM |
|---|---|---|---|---|---|
| 1 | 1.7 | 2.2 | 100 | 0 | 0 |
| 2 | 1.7 | 2.2 | 100 | 2 | 0 |
| 3 | 1.7 | 2.2 | 100 | 0 | 2 |
| 4 | 1.7 | 2.2 | 300 | 0 | 0 |
| 5 | 1.7 | 2.2 | 300 | 2 | 0 |
| 6 | 1.7 | 2.2 | 300 | 0 | 2 |

Figure 34A:
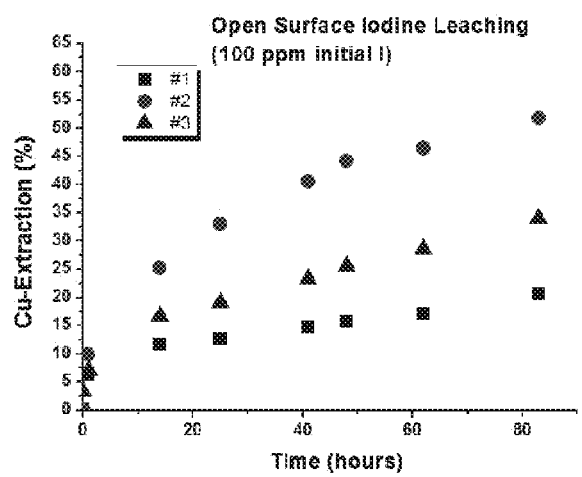
FIG. 34A is a graph showing the leaching of copper from chalcopyrite with Tu or ETu in the presence of 100 ppm of iodine in an unsealed (i.e. open air) reactor.
Figure 34B:
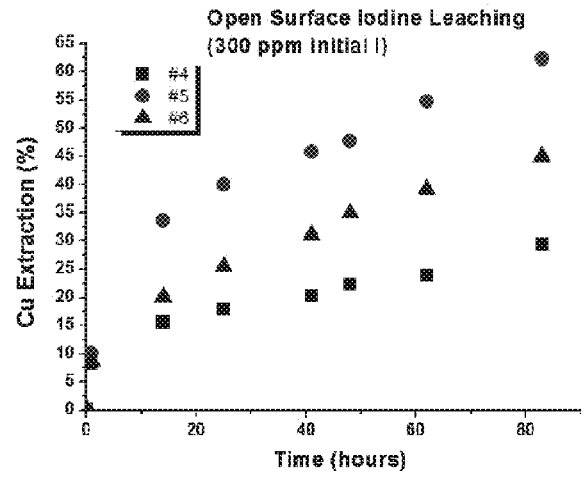
FIG. 34B is a graph showing the leaching of copper from chalcopyrite with Tu or ETu in the presence of 300 ppm of iodine in an unsealed (i.e. open air) reactor.

As shown in FIGS. 34A and 34B, both Tu and ETu had a positive effect on copper extraction from chalcopyrite in the presence iodide at an initial concentration as high as 300 ppm. While the amount of copper extracted increased with increasing concentration of iodide, the extraction of copper was nevertheless higher in the presence Tu and ETu compared with the absence thereof.

Figure 35A:
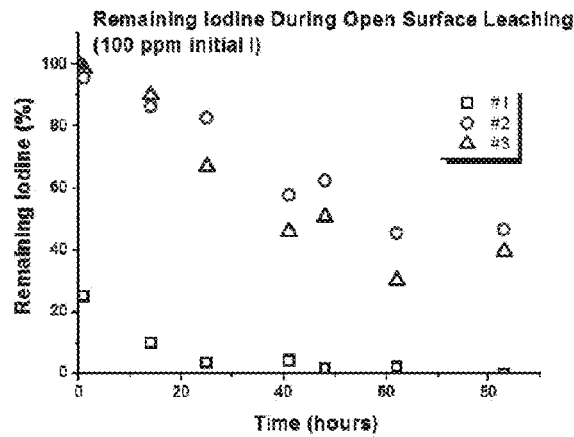
FIG. 35A is a plot showing the concentration of iodine in an unsealed (i.e. open air) reactor over time in the presence or absence of Tu and ETu at 100 ppm of iodine.
Figure 35B:
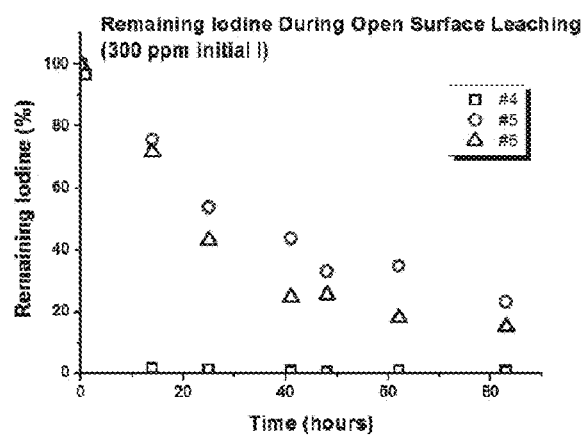
FIG. 35B is a plot showing the concentration of iodine in an unsealed (i.e. open air) reactor over time in the presence or absence of Tu and ETu at 300 ppm of iodine.

The iodide concentration was also monitored during the course of leaching. The results presented in FIGS. 35A and 35B reveal that, under open-air conditions, iodide was rapidly lost from the aqueous phase. The amount of iodide in the solution decreased over time in each treatment, likely due to the volatility of iodine generated by oxidation of iodide by ferric. However, the decrease in iodide over time was significantly less for solutions containing Tu or ETu. Accordingly, reagents having a thiocarbonyl functional group may be useful in maintaining the stability of iodide in solution.

In general, reagents having a thiocarbonyl function group are compatible with leaching systems having a halide component. They facilitate copper extraction in chloride and bromide leaching environments. In the iodide system, while such reagents may not facilitate extraction under sealed conditions, under real operating conditions such as heap leaching, such reagents may increase the stability of the iodide species in solution.

Example 10 Recovery of a Thiocarbonyl Functional Group from a PLS

It is desirable to recover the reagent from the PLS for recirculation to the leach. However, it was initially unclear if it would be possible to effectively recover the reagents from the PLS. Reagents having a thiocarbonyl functional group are organics that may dissolve in the organic solvent used for solvent extraction. Such could potentially have the undesirable effect of removing all catalyst from the aqueous phase, thereby increasing cost by eliminating the possibility of catalyst recycle to the leach. This could also compromise or even destroy the effectiveness of the solvent extraction.

Reagents having a thiocarbonyl functional group are complexing agents for copper. This could prevent the reagents from being extracted efficiently from the copper complexes in solvent extraction.

Reagents having a thiocarbonyl functional group are also surface-active agents. They could interact with solvent extraction organics, causing a two-phase interlayer (also know as "crud"), which could compromise solvent extraction performance and recover.

Accordingly, tests were conducted to determine if the reagents having a thiocarbonyl functional group could be recovered from the PLS for recirculation to the lixiviant.

Example 10.1

A PLS from a chalcopyrite ore column leached with an acidic ferric sulfate solution containing Tu was mixed with an organic solvent containing a copper extractant for a specified period of time. The organic solvent was a mineral oil distillate comprising aliphatic hydrocarbons including naphthenic, paraffinic and isoparaffinic components (Exxsol™ D80). The copper extractant was a weak ester-modified aldoxime (Acorga® M5910). The copper extractant content in the organic solvent was 6% v/v. The PLS to organic solvent ratio during mixing was 5:1 v/v. The PLS contained 2.5 mM equivalent of free Tu.

After mixing, the organic solvent and aqueous phases were separated, and samples from the aqueous phase were analysed for reagent content. The feed PLS contained 2.5 mM equivalent of free Tu.

Table 9 shows the free Tu equivalent in the raffinate obtained after contacting the PLS with the organic solvent comprising the copper extractant for 2, 4 and 10 minutes. The table also shows the amounts of Tu and FDS in the PLS and the amounts of copper that remained in the aqueous phase (i.e the raffinate).

The results obtained indicate that:
 the catalytic reagent (in the form of TU and FDS) is recovered from the PLS into the raffinate free of copper; and
 increasing the mixing time of the organic solvent and PLS increases the proportion of Tu to FDS in the raffinate compared with the PLS.

TABLE 9

| | | | Concentration in Aqueous Phase | | |
|---|---|---|---|---|---|
| Sample | Contact time minutes | Copper remaining in Aqueous Phase | Free TU mM | FDS mM | Total TU Equivalent* mM |
| PLS | 0 | 100% | 0.5 | 1.0 | 2.5 |
| Contact time A | 2 | 35% | 0.6 | 1.0 | 2.6 |
| Contact time B | 4 | 7% | 0.9 | 0.85 | 2.6 |
| Contact time C | 10 | 5% | 1.0 | 0.8 | 2.6 |

Example 10.2

Synthetic solutions with different concentrations of ferric, cupric, chloride, bromide, iodide and Tu were prepared in acidic sulfate media (pH=1.7) to simulate pregnant leaching solutions. Treatments involving halogen species were included to simulate the PLS obtained from different halogen leaching systems. The compositions of the solutions are listed in Table 10.

TABLE 10

Synthetic PLS solution composition

| Solution # | pH | Iron (g/L) | Copper (g/L) | Cl (g/L) | Br (g/L) | I (ppm) | Tu (mM) |
|---|---|---|---|---|---|---|---|
| 1 | 1.7 | 1 | 1 | 0 | 0 | 0 | 1 |
| 2 | 1.7 | 1 | 1 | 1 | 0 | 0 | 1 |
| 3 | 1.7 | 1 | 1 | 0 | 1 | 0 | 1 |
| 4 | 1.7 | 1 | 1 | 0 | 0 | 100 | 1 |

The TU equivalent was then determined before and after solvent extraction of the synthetic PLS solutions with Acorga M5910 to form a synthetic raffinate. Elemental analysis was performed using ICP-AES. Thiocarbonyl compounds were analyzed using HPLC. Zinc dust was added to the synthetic PLS and synthetic raffinate prior to analysis as a reducing agent to convert all FDS species back into TU in order to facilitate accurate determination of Tu equivalent recovered.

$$2H^+ + FDS + Zn \rightarrow Zn^{2+} + 2TU$$

Figure 36:
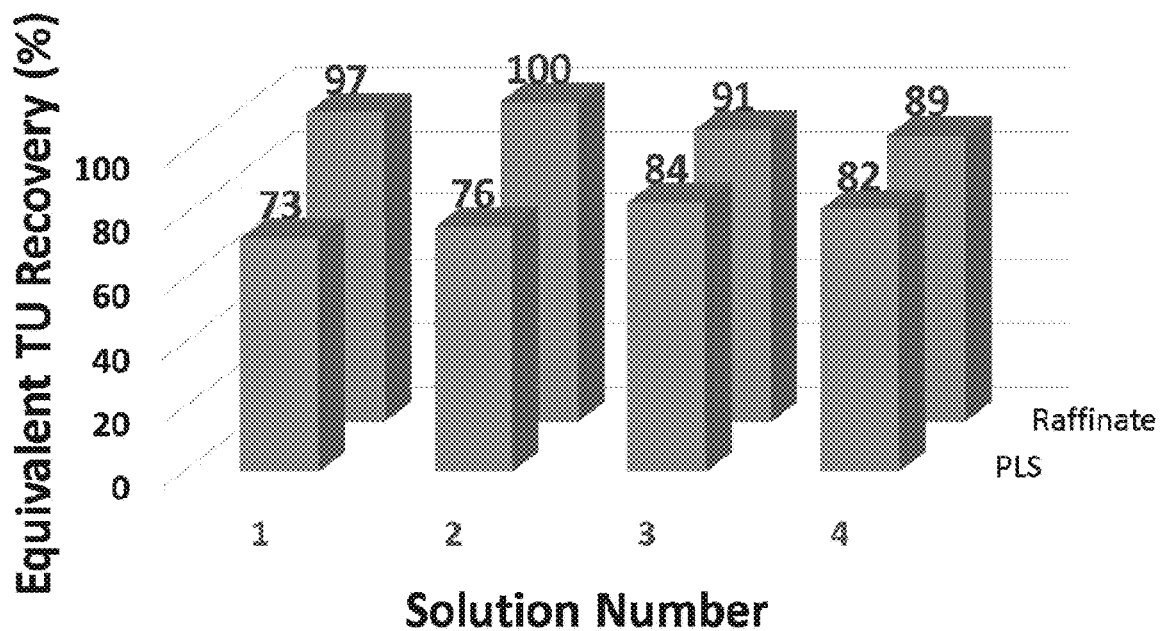
FIG. 36 is a bar diagram showing free Tu equivalents in a simulated PLS and in the resulting simulated raffinate after solvent extraction.

FIG. 36 is a bar diagram showing free Tu equivalents in a simulated PLS and in the resulting simulated raffinate after solvent extraction. The percentage of recovery is calculated based on the input concentration. More Tu was recovered from the synthetic raffinate than from the synthetic PLS, indicated that Tu/FDS species were released copper-complexed Tu/FDS after removal of the copper ions from solution by SX.

Example 10.3

Synthetic solutions with different concentrations of ferric, cupric, chloride, bromide, iodide and ETu were prepared in acidic sulfate media (pH=1.7) to simulate pregnant leaching solutions. Treatments involving halogen species were included to simulate the PLS obtained from different halogen leaching systems. The compositions of the solutions are listed in Table 11.

TABLE 11

Synthetic ETu solution composition

| Solution # | pH | Iron (g/L) | Copper (g/L) | Cl (g/L) | ETU (mM) |
|---|---|---|---|---|---|
| 1 | 1.7 | 2.2 | 0 | 0 | 2 |
| 2 | 1.7 | 2.2 | 0.5 | 0 | 2 |
| 3 | 1.7 | 2.2 | 1 | 0 | 2 |
| 4 | 1.7 | 2.2 | 2 | 0 | 2 |
| 5 | 1.7 | 2.2 | 4 | 0 | 2 |
| 6 | 1.7 | 2.2 | 2 | 3 | 2 |

The ETu was then determined before and after solvent extraction of the synthetic PLS solutions with Acorga M5910 to form a synthetic raffinate. Elemental analysis was performed using ICP-AES. Thiocarbonyl compounds were analyzed using HPLC.

Figure 37:
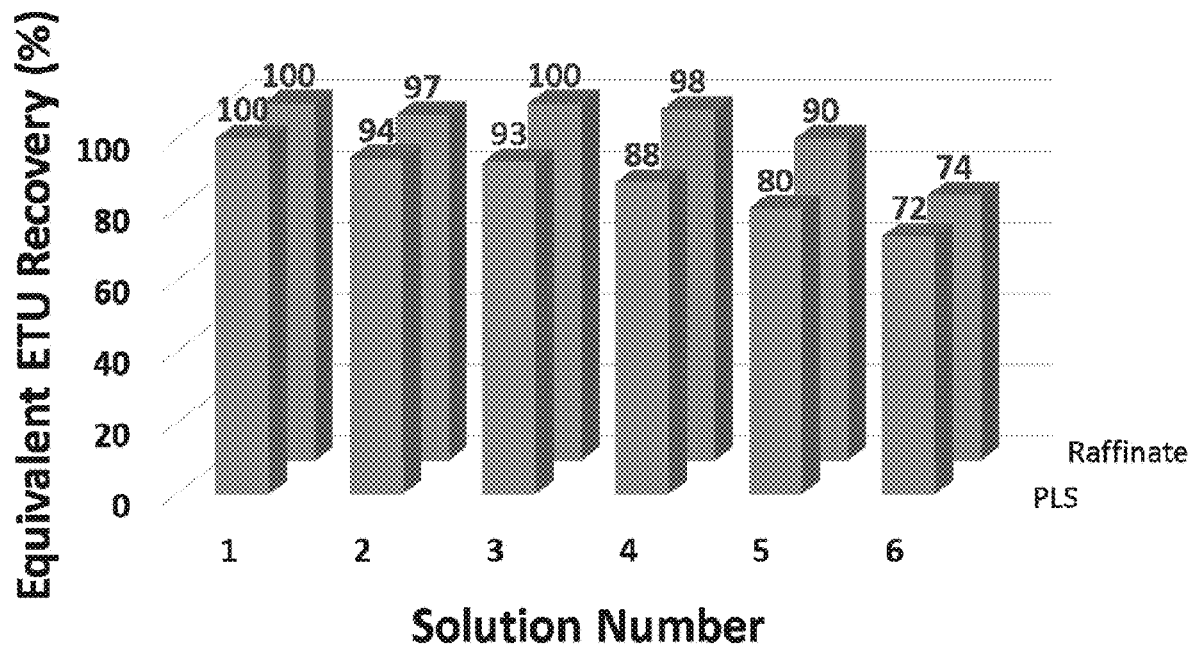
FIG. 37 is a bar diagram showing free ETu in a simulated PLS and in the resulting simulated raffinate after solvent extraction.

FIG. 37 is a bar diagram showing free ETu in a simulated PLS and in the resulting simulated raffinate after solvent extraction. The percentage of recovery is calculated based on the input concentration. More ETu was recovered from the synthetic raffinate than from the synthetic PLS, indicated that ETu species were released copper-complexed ETu after removal of the copper ions from solution by SX.

Example 11. Recovery to Reagents Comprising a Thiocarbonyl Functional Group from Spent Leach Materials Referring to FIGS. 38 and 39, the inventors have presently observed that some of the Tu provided to the material to be leached is sequestered within the materials during the initial stages of leaching. Columns of three different copper ore samples were irrigated with solutions containing Tu at a concentration of 2 mM (152 ppm). The effluent solutions were monitored for equivalent Tu concentration. When this concentration reached 2 mM, the irrigation was discontinued.

Figure 38:
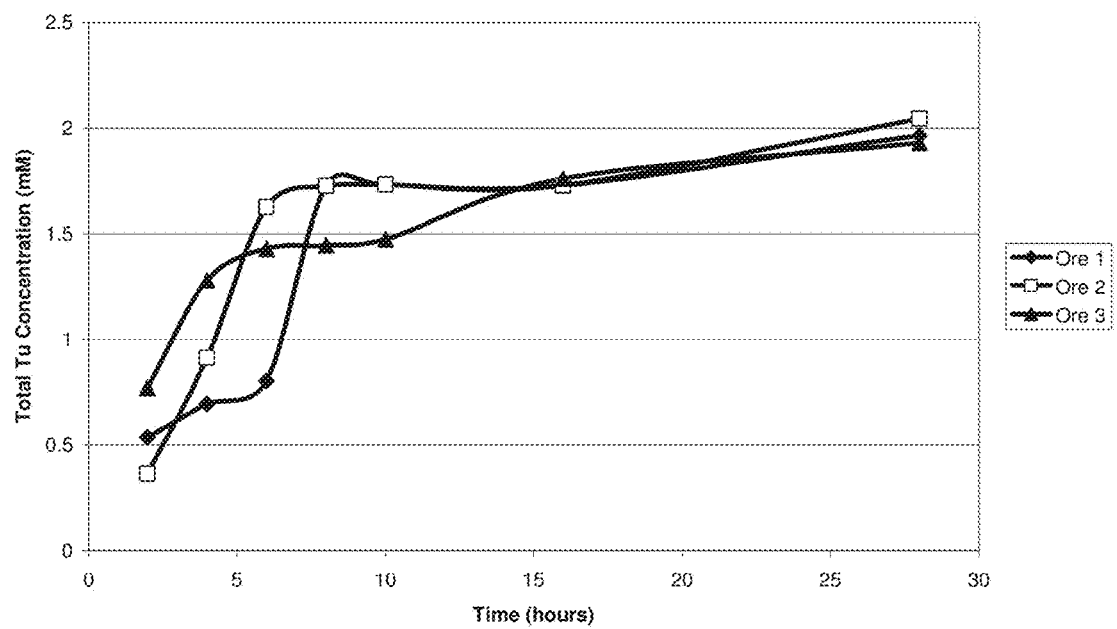
FIG. 38 is a graph of total thiourea concentration in effluent versus time for three ores during irrigation with a solution having an equivalent Tu concentration of 2 mM.
Figure 39:
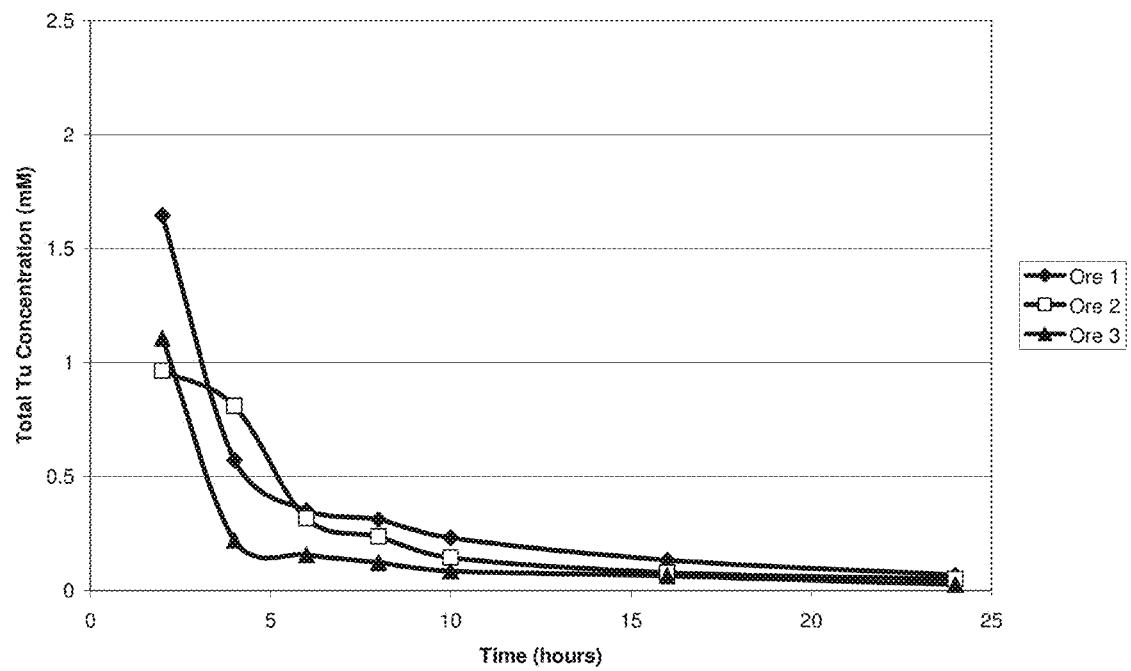
FIG. 39 is a graph of total thiourea equivalent concentration versus time for the three ore samples in FIG. 38 during washing with acidic water.

FIG. 38 shows graphs of the total Tu (i.e. equivalent Tu) concentrations in the effluent solutions. After roughly 28 hours of irrigation, the effluent concentrations were equal to the influent concentrations. FIG. 39 shows graphs of the effluent concentrations during the first of two acidic water (pH 1.8) rinsing stages for each ore sample. After 24 hours, the effluent concentrations of Tu fall to nearly zero in each case. However, as shown in Table 12, a significant amount of Tu remained sequestered in the columns, even after two such acidic washes.

TABLE 12

| Mass of total Tu (g) | Ore 1 | Ore 2 | Ore 3 |
|---|---|---|---|
| Fed during irrigation | 0.6477 | 0.6196 | 0.6151 |
| Left behind after irrigation | 0.1062 | 0.0971 | 0.0920 |
| Left after two acidic rinses | 0.0312 | 0.0311 | 0.0497 |
| Left after cupric rinsing | 0.0054 | 0.0031 | 0.0014 |
| [Cu] in rinsate, ppm | 100 | 500 | 1000 |
| Acidic rinsing only efficiency | 70.6% | 68.0% | 46.0% |
| Acidic + cupric rinsing efficiency | 94.9% | 96.9% | 98.4% |

Figure 40:
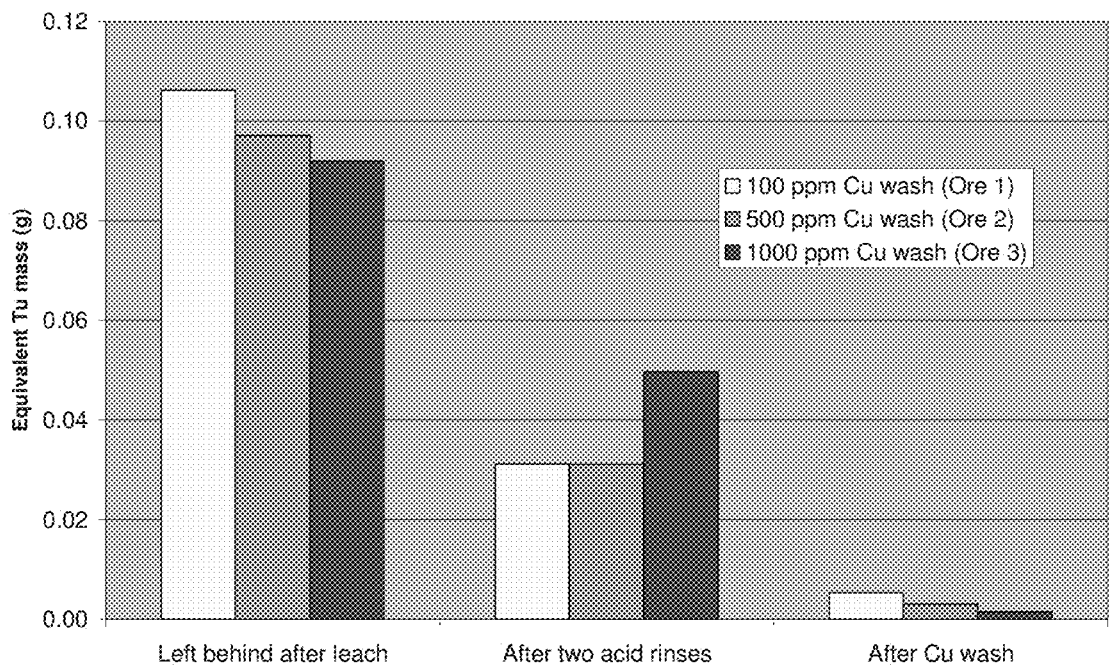
FIG. 40 is a bar diagram showing the amount of Tu equivalent remaining in columns of three ore samples after various treatments.

FIG. 40 is a bar diagram providing the data given in Table 12 in graphical form.

Without wishing to be bound by theory, sequestration may occur through the mechanisms of adsorption to the ore solid surfaces and/or by diffusion into the pore spaces of the ore solids. It would be desirable to recover this Tu from the spent leach material to minimize catalyst costs.

Accordingly, the inventors tested the ability of a dilute solution comprising base metal ions to recover Tu from the leach materials. More particularly, and referring to Table 12 and FIG. 38, rinsing the columns with dilute copper sulfate solutions (e.g. 100 ppm, 500 ppm, or 1000 ppm Cu) proved effective to recover Tu from the columns. Presuming that the interstitial and pore Tu is recovered during the acidic rinsing stages, dilute copper solutions would appear to be effective at recovering Tu adsorbed to ore surfaces. This is especially important given the highly variable performance of acidic rinsing alone with different ores. Furthermore, even though increasing the copper concentration in the rinse solution increased the amount of total Tu recovered, even the lowest concentration of 100 ppm provided significant results.

Indeed, the skilled person will understand that solutions comprising base metal ions other than copper ions may be useful in recovering, from depleted leach materials, catalyst reagents other than Tu that comprise a thiocarbonyl function group. "Depleted" or "spent", as used herein to refer to leach materials, may refer to materials, including ore or concentrate, that contain or contained at least one base metal sulfide that is amenable to leaching with acidic sulfate solutions comprising reagents having a thiocarbonyl functional group, and which has undergone some amount of leaching.

Thus, the skilled person will understand that this disclosure pertains to a general method of recovering a reagent comprising a thiocarbonyl functional group that is sequestered in leach materials from which at least one base metal sulfide has been leached. The method comprises rinsing the leach materials with a wash solution comprising base metal ions to produce a pregnant wash solution (PWS) comprising the reagent.

The skilled person will understand that the methods will work within a broad concentration range of base metal ion. In various embodiments. The concentration of base metal ions in the wash solution is at least 100 ppm, at least 500 ppm, or at least 1000 ppm.

Prior to rinsing the leach materials with the wash solution, the leach materials may be rinsed with an acidic solution. The acidic solution may have a pH of about 1.8.

In various embodiments, the base metal ions include copper ions. In various embodiments, the copper ions include cupric ions.

The PWS comprising base metal ions and recovered reagent may then be added to a lixiviant comprising an acidic sulfate solution for use in recovery of at least one base metal ion from materials comprising at least one base metal sulfide as discussed below and exemplified more thoroughly in PCT patent application no. PCT/CA2016/050444, filed Apr. 15, 2016, and which is incorporated herein by reference.

Alternatively, the PWS can be subjected to solvent extraction steps, as further discussed below to remove the base metal ions before the base metal ion-depleted solution is added to a lixiviant comprising an acidic sulfate solution for use in recovery of at least one base metal ion from materials comprising at least one base metal sulfide as discussed below. Since Tu has a stronger effect on enhancing leaching of base metals from materials containing base metal sulfides, subsequent leaches will be enhanced by the recirculation of a base metal ion-depleted solution with higher free Tu. Accordingly, more particular aspects of this disclosure relate to the addition of a reducing agent to a base metal ion-depleted solution comprising Tu and FDS to bias the equilibrium in favor of Tu prior to addition to a lixiviant.

The skilled person will understand that the recovered reagent may be used to supplement reagents having a thiocarbonyl functional group that are pre-existing in the lixiviant (i.e. have previously been added to the lixiviant). Alternatively, additional reagents having thiocarbonyl functional groups or FDS can be added to the lixiviant after the recovered reagent has been added.

The combination of acidic and cupric washes will allow for maximum recovery, perhaps complete recovery, of Tu from copper ore heaps, thus improving the economics of Tu-catalyzed heap leaching.

While specific embodiments of the invention have been described and illustrated, such embodiments should be considered illustrative of the invention only and not as limiting the invention as construed in accordance with the accompanying claims.

What is claimed is:

1. A method of recovering at least one base metal ion from a material comprising at least one base metal sulfide, the method comprising:
contacting the material with an acidic solution comprising halide ions, a reagent having a thiocarbonyl functional group wherein the reagent does not complex/precipitate with the at least one base metal ions and at least one oxidizing agent wherein the oxidizing agent comprises an oxidation-reduction potential of less than 900 mV, to produce a pregnant solution comprising the at least one base metal ion; and
recovering the at least one base metal ion from the pregnant solution.

2. The method of claim 1, wherein the concentration of the reagent in the acidic solution is sufficient to increase the rate of the at least one base metal ion recovery relative to an acidic solution that does not comprise the reagent.

3. The method of claim 1, wherein the at least one oxidizing agent comprises a source of ferric ions.

4. The method of claim 1, wherein the acidic solution comprises a ferric sulfate solution.

5. The method of claim 1 wherein the acidic solution comprises a sulfate solution.

6. The method of claim 1, wherein the acidic solution comprises a ferric solution.

7. The method of claim 1, wherein the acidic solution comprises a ferric media.

8. The method of claim 1, wherein the acidic solution is replaced with a ferrous sulfate solution after contacting the material with the acidic solution.

9. The method of claim 1, wherein the thiocarbonyl functional group of the reagent has a sulfur that bears a partial negative charge, bears a negative electrostatic potential surface, and has an empty $\pi^*$-antibonding orbital as its lowest unoccupied molecular orbital.

10. The method of claim 1, wherein the reagent is thiourea (Tu).

11. The method of claim 1, wherein the reagent is thioacetamide (TA).

12. The method of claim 1, wherein the reagent is sodium dimethyldithiocarbamate (SDDC).

13. The method of claim 1, wherein the reagent is ethylene trithiocarbonate (ETC).

14. The method of claim 1, wherein the reagent is thiosemicarbazide (TSCA).

15. The method of claim 1, wherein the reagent is ethylene thiourea (ETu).

16. The method of claim 1, wherein the reagent is not thiourea.

17. The method of claim 1, wherein the reagent is N—N' substituted thioureas; 2,5-Dithiobimea; Dithiobiuret; Thiosemicarbazide purum; Thiosemicarbazide; Thioacetamide; 2-Methyl-3-thiosemicarbazide; 4-Methyl-3-thiosemicarbazide; Vinylene trithiocarbonate purum; Vinylene trithiocarbonate; 2-Cyanothioacetamide; Ethylene trithiocarbonate; Potassium ethyl xanthogenate; Dimethylthiocarbamoyl chloride; Dimethyldithiocarbamate; Dimethyl trithiocarbonate; N,N-Dimethylthioformamide; 4,4-Dimethyl-3-thiosemicarbazide; 4-Ethyl-3-thiosemicarbazide; O-Isopropylxanthic acid; Ethyl thiooxamate; Ethyl dithioacetate; Pyrazine-2-thiocarboxamide; Diethylthiocarbamoyl chloride; Diethyldithiocarbamate; Tetramethylthiuram monosulfide; Tetramethylthiuram disulfide; Pentafluorophenyl chlorothionoformate; 4-Fluorophenyl chlorothionoformate; O-Phenyl chlorothionoformate; Phenyl chlorodithioformate; 3,4-Difluorothiobenzamide; 2-Bromothiobenzamide; 3-Bromothiobenzamide; 4-Bromothiobenzamide; 4-Chlorothiobenzamide; 4-Fluorothiobenzamide; Thiobenzoic acid; Thiobenzamide; 4-Phenylthiosemicarbazide; O-(p-Tolyl) chlorothionoformate; 4-Bromo-2-methylthiobenzamide; 3-Methoxythiobenzamide; 4-Methoxythiobenzamide; 4-Methylbenzenethioamide; Thioacetanilide; Salicylaldehyde thiosemicarbazone; Indole-3-thiocarboxamide;

S-(Thiobenzoyl)thioglycolic acid; 3-(Acetoxy)thiobenzamide; 4-(Acetoxy)thiobenzamide; Methyl N'-[(e)-(4-chlorophenyl)methylidene]hydrazonothiocarbamate; 3-Ethoxythiobenzamide; 4-Ethylbenzene-1-thiocarboxamide; Tert-butyl 3-[(methylsulfonyl)oxy]-1-azetanecarboxylate; Diethyldithiocarbamic acid; 2-(Phenylcarbonothioylthio) propanoic acid; 2-Hydroxybenzaldehyde; N-ethylthiosemicarbazone; (1R,4R)-1,7,7-Trimethylbicyclo[2.2.1]heptane-2-thione; Tetraethylthiuram disulfide; 4'-Hydroxybiphenyl-4-thiocarboxamide; 4-Biphenylthioamide; Dithizone; 4'-Methylbiphenyl-4-thiocarboxamide; Tetraisopropylthiuram disulfide; Anthracene-9-thiocarboxamide; Phenanthrene-9-thiocarboxamide; Sodium dibenzyldithiocarbamate; 4,4'-Bis(dimethylamino)thiobenzophenone; or any combination thereof.

18. The method of claim 1, wherein the concentration of the reagent in the acidic solution is in the range of 0.001 mM to 100 mM.

19. The method of claim 1, wherein the concentration of the reagent in the acidic solution is in the range of 0.001 mM to 60 mM.

20. The method of claim 1, wherein the halide ions comprise chloride ions.

21. The method of claim 1, wherein the halide ions comprise iodide ions.

22. The method of claim 1, wherein the halide ions comprise bromide ions.

23. The method of claim 1, wherein the at least one base metal comprises copper and the at least one base metal sulfide comprises chalcopyrite.

24. The method of claim 1, wherein recovering the at least one metal from the pregnant solution comprises solvent extraction and electrowinning.

25. The method of claim 1, further comprising maintaining the operating potential of the acidic solution above 500 mV vs Ag/AgCl.

* * * * *